(12) United States Patent
Iwai et al.

(10) Patent No.: US 11,897,581 B2
(45) Date of Patent: Feb. 13, 2024

(54) BICYCLE SPROCKET, SPROCKET ASSEMBLY, REAR SPROCKET ASSEMBLY, AND DRIVE TRAIN OF BICYCLE

(71) Applicant: SHIMANO INC., Sakai (JP)

(72) Inventors: Tooru Iwai, Sakai (JP); Tetsu Nonoshita, Sakai (JP); Toyoshi Yoshida, Sakai (JP)

(73) Assignee: SHIMANO INC., Sakai (JP)

(*) Notice: Subject to any disclaimer, the term of this patent is extended or adjusted under 35 U.S.C. 154(b) by 685 days.

(21) Appl. No.: 16/934,009

(22) Filed: Jul. 21, 2020

(65) Prior Publication Data

US 2020/0346713 A1 Nov. 5, 2020

Related U.S. Application Data

(62) Division of application No. 15/399,877, filed on Jan. 6, 2017, now abandoned.

(51) Int. Cl.
*B62M 9/10* (2006.01)
*F16H 55/06* (2006.01)
*F16H 55/30* (2006.01)

(52) U.S. Cl.
CPC .............. *B62M 9/10* (2013.01); *B62M 9/105* (2013.01); *F16H 55/06* (2013.01); *F16H 55/30* (2013.01)

(58) Field of Classification Search
CPC ........ F16H 55/06; F16H 55/30; B62M 9/105; B62M 9/12; B62M 9/10

(Continued)

(56) References Cited

U.S. PATENT DOCUMENTS 4,384,865 A * 5/1983 Ueno ................... B62M 9/10
74/448
4,589,860 A 5/1986 Brandenstein et al.
(Continued)

FOREIGN PATENT DOCUMENTS

CN 1342851 4/2002
CN 104802918 7/2015
(Continued)

OTHER PUBLICATIONS

Office Action issued by the U.S. Patent and Trademark Office for the U.S. Appl. No. 15/399,877, dated Apr. 5, 2019.
(Continued)

*Primary Examiner* — Michael R Mansen
*Assistant Examiner* — Mark K Buse
(74) *Attorney, Agent, or Firm* — MORI & WARD, LLP

(57) ABSTRACT

A bicycle sprocket comprises at least one chain engaging member constituting at least a part of at least one sprocket tooth of the bicycle sprocket. The at least one chain engaging member is configured to contact a bicycle chain in a state where the bicycle chain engages with the bicycle sprocket. The at least one chain engaging member is made of a first material. At least one bicycle attachment member constitutes at least a part of a sprocket body of the bicycle sprocket. The at least one bicycle attachment member is configured to be coupled to a bicycle. The at least one bicycle attachment member is made of a second material that is different from the first material. At least one shifting facilitation area is provided in the at least one chain engaging member to facilitate a shifting operation of a bicycle chain.

53 Claims, 41 Drawing Sheets

(58) Field of Classification Search
USPC .......................................................... 474/156
See application file for complete search history.

(56) References Cited

U.S. PATENT DOCUMENTS

| | | | |
|---|---|---|---|
| 6,340,338 B1* | 1/2002 | Kamada | B62M 9/122 |
| | | | 474/160 |
| 6,428,437 B1 | 8/2002 | Schlanger | |
| 8,764,594 B2 | 7/2014 | Dal Pra' et al. | |
| 8,821,330 B2 | 9/2014 | Dal Pra' et al. | |
| 8,905,878 B2 | 12/2014 | Loy et al. | |
| 9,415,835 B2 | 8/2016 | Tokuyama et al. | |
| 9,604,699 B2 | 3/2017 | Tsai et al. | |
| 9,932,090 B2 | 4/2018 | Yoshida et al. | |
| 10,053,186 B2 | 8/2018 | Braedt et al. | |
| 2005/0032596 A1* | 2/2005 | Nonoshita | B62K 19/16 |
| | | | 474/178 |
| 2007/0129193 A1* | 6/2007 | Nonoshita | B62M 9/10 |
| | | | 474/160 |
| 2007/0265122 A1* | 11/2007 | Emura | B62M 9/105 |
| | | | 474/152 |
| 2009/0042681 A1 | 2/2009 | Dal Pra' et al. | |
| 2009/0042682 A1 | 2/2009 | Dal Pra' et al. | |
| 2012/0202633 A1* | 8/2012 | Wickliffe | F16H 55/303 |
| | | | 474/160 |
| 2012/0225745 A1 | 9/2012 | Oishi et al. | |
| 2014/0335986 A1 | 11/2014 | Iwai et al. | |
| 2015/0080160 A1 | 3/2015 | Staples | |
| 2015/0093595 A1 | 4/2015 | Asakawa | |
| 2015/0210352 A1 | 7/2015 | Sugimoto | |
| 2015/0210353 A1* | 7/2015 | Tokuyama | B62M 9/12 |
| | | | 474/160 |
| 2015/0217834 A1* | 8/2015 | Iwai | B62M 9/105 |
| | | | 474/152 |
| 2015/0337943 A1 | 11/2015 | Sugimoto | |
| 2016/0114859 A1* | 4/2016 | Tsai | B62M 9/10 |
| | | | 474/160 |
| 2016/0121965 A1 | 5/2016 | Tsai et al. | |
| 2016/0167737 A1 | 6/2016 | Tokuyama et al. | |
| 2016/0280326 A1 | 9/2016 | Braedt et al. | |
| 2016/0339995 A1 | 11/2016 | Sugimoto | |
| 2016/0362159 A1 | 12/2016 | Braedt | |
| 2017/0043840 A1 | 2/2017 | Reinbold et al. | |

FOREIGN PATENT DOCUMENTS

| | | |
|---|---|---|
| DE | 10 2014 111 529 | 4/2015 |
| DE | 10 2015 000 911 | 7/2015 |
| DE | 10 2015 006 582 | 11/2015 |
| DE | 10 2016 004 822 | 11/2016 |
| EP | 1619417 | 1/2006 |
| JP | 2000-257699 | 9/2000 |
| TW | M434735 U1 | 8/2012 |

OTHER PUBLICATIONS

Office Action with Form PTO-892 Notice of References Cited issued by the U.S. Patent and Trademark Office for the U.S. Appl. No. 15/399,877, dated Aug. 9, 2019.

Office Action with Form PTO-892 Notice of References Cited issued by the U.S. Patent and Trademark Office for the U.S. Appl. No. 15/399,877, dated Feb. 21, 2020.

Office Action issued by the U.S. Patent and Trademark Office for the U.S. Appl. No. 15/399,877, dated Jun. 2, 2020.

* cited by examiner

BICYCLE SPROCKET, SPROCKET ASSEMBLY, REAR SPROCKET ASSEMBLY, AND DRIVE TRAIN OF BICYCLE

CROSS-REFERENCE TO RELATED APPLICATION

The present application is a divisional application of U.S. application Ser. No. 15/399,877, filed on Jan. 6, 2017, the entire contents of which are herein incorporated by reference.

BACKGROUND OF THE INVENTION

Field of the Invention

The present invention relates to a bicycle sprocket, a sprocket assembly, a rear sprocket assembly, and a drive train of a bicycle.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Bicycle components that have been extensively redesigned are a bicycle sprocket, a sprocket assembly, a rear sprocket assembly, and a drive train.

SUMMARY OF THE INVENTION

In accordance with a first aspect of the present invention, a bicycle sprocket comprises at least one chain engaging member, at least one bicycle attachment member, and at least one shifting facilitation area. The at least one chain engaging member constitutes at least a part of at least one sprocket tooth of the bicycle sprocket. The at least one chain engaging member is configured to contact a bicycle chain in a state where the bicycle chain engages with the bicycle sprocket. The at least one chain engaging member is made of a first material. The at least one bicycle attachment member constitutes at least a part of a sprocket body of the bicycle sprocket. The at least one bicycle attachment member is configured to be coupled to a bicycle. The at least one bicycle attachment member is made of a second material that is different from the first material. The at least one shifting facilitation area is provided in the at least one chain engaging member to facilitate a shifting operation of a bicycle chain.

With the bicycle sprocket according to the first aspect, it is possible to provide a lightweight bicycle sprocket which facilitates the shifting operation.

In accordance with a second aspect of the present invention, the bicycle sprocket according to the first aspect is configured so that the at least one shifting facilitation area extends between the at least one chain engaging member and the at least one bicycle attachment member.

With the bicycle sprocket according to the second aspect, it enhances shifting performance.

In accordance with a third aspect of the present invention, the bicycle sprocket according to any one of the first and the second aspects is configured so that the at least one shifting facilitation area is constituted by both the at least one chain engaging member and the at least one bicycle attachment member.

With the bicycle sprocket according to the third aspect, it further enhances shifting performance.

In accordance with a fourth aspect of the present invention, the bicycle sprocket according to any one of the first to third aspects is configured so that the at least one chain engaging member has at least a part of an annular shape.

With the bicycle sprocket according to the fourth aspect, it is possible to lighten the at least one chain engaging member.

In accordance with a fifth aspect of the present invention, the bicycle sprocket according to the fourth aspect is configured so that the at least one chain engaging member has an annular shape.

With the bicycle sprocket according to the fifth aspect, it is possible to lighten the at least one chain engaging member.

In accordance with a sixth aspect of the present invention, the bicycle sprocket according to any one of the first to fifth aspects is configured so that the second material has a second specific gravity smaller than a first specific gravity that the first material has.

With the bicycle sprocket according to the sixth aspect, it is possible to further lighten the at least one chain engaging member In accordance with a seventh aspect of the present invention, the bicycle sprocket according to any one of the first to sixth aspects is configured so that the first material has a first abrasion resistance larger than a second abrasion resistance that the second material has.

With the bicycle sprocket according to the seventh aspect, it is possible to enhance abrasion resistance of the at least one chain engaging member as well as to lighten the at least one chain engaging member.

In accordance with an eighth aspect of the present invention, the bicycle sprocket according to any one of the first to seventh aspects is configured so that the first material has a first rigidity larger than a second rigidity that the second material has.

With the bicycle sprocket according to the eighth aspect, it is possible to enhance rigidity of the at least one chain engaging member as well as to lighten the at least one chain engaging member.

In accordance with a ninth aspect of the present invention, the bicycle sprocket according to any one of the first and eighth aspects is configured so that the first material includes at least one of stainless steel, titanium, and aluminum.

With the bicycle sprocket according to the ninth aspect, it is possible to further enhance rigidity of the at least one chain engaging member as well as to further lighten the at least one chain engaging member.

In accordance with a tenth aspect of the present invention, the bicycle sprocket according to any one of the first to ninth aspects is configured so that the second material includes at least one of titanium, aluminum, and resin.

With the bicycle sprocket according to the tenth aspect, it is possible to lighten the at least one bicycle attachment member.

In accordance with an eleventh aspect of the present invention, the bicycle sprocket according to any one of the first to tenth aspects is configured so that the first material includes a metallic material. The second material includes a non-metallic material.

With the bicycle sprocket according to the eleventh aspect, it is possible to further lighten the bicycle sprocket.

In accordance with a twelfth aspect of the present invention, the bicycle sprocket according to the eleventh aspect is configured so that the second material includes a fiber reinforced plastic material.

With the bicycle sprocket according to the twelfth aspect, it is possible to further enhance rigidity of the at least one bicycle attachment member as well as to further lighten the at least one bicycle attachment member.

In accordance with a thirteenth aspect of the present invention, the bicycle sprocket according to any one of the first to twelfth aspects is configured so that the first material includes a first metallic material. The second material includes a second metallic material that is different from the first metallic material.

With the bicycle sprocket according to the thirteenth aspect, it is possible to further enhance rigidity of the bicycle sprocket.

In accordance with a fourteenth aspect of the present invention, the bicycle sprocket according to any one of the first to thirteenth aspects is configured so that the first material and the second material include same kinds of material components and have different metallic compositions.

With the bicycle sprocket according to the fourteenth aspect, it is possible to enhance adhesion between the at least one chain engaging member and the at least one bicycle attachment member as well as to further enhance rigidity of the bicycle sprocket.

In accordance with a fifteenth aspect of the present invention, the bicycle sprocket according to any one of the first to fourteenth aspects is configured so that the first material includes a first non-metallic material. The second material includes a second non-metallic material that is different from the first non-metallic material.

With the bicycle sprocket according to the fifteenth aspect, it is possible to enhance adhesion between the at least one chain engaging member and the at least one bicycle attachment member as well as to further lighten the bicycle sprocket.

In accordance with a sixteenth aspect of the present invention, the bicycle sprocket according to any one of the first to fifteenth aspects is configured so that the first material and the second material have different resin compositions.

With the bicycle sprocket according to the sixteenth aspect, it is possible to enhance adhesion between the at least one chain engaging member and the at least one bicycle attachment member as well as to further lighten the bicycle sprocket.

In accordance with a seventeenth aspect of the present invention, the bicycle sprocket according to any one of the first to sixteenth aspects is configured so that the at least one shifting facilitation area includes at least one downshifting facilitation area.

With the bicycle sprocket according to the seventeenth aspect, it is possible to provide a lightweight bicycle sprocket with which a downshifting is smoothly performed.

In accordance with an eighteenth aspect of the present invention, the bicycle sprocket according to any one of the first to seventeenth aspects is configured so that the at least one shifting facilitation area includes at least one upshifting facilitation area.

With the bicycle sprocket according to the eighteenth aspect, it is possible to provide a lightweight bicycle sprocket with which an upshifting is smoothly performed.

In accordance with a nineteenth aspect of the present invention, the bicycle sprocket according to any one of the first to eighteenth aspects is configured so that the at least one shifting facilitation area includes both of at least one downshifting facilitation area and at least one upshifting facilitation area.

With the bicycle sprocket according to the nineteenth aspect, it is possible to provide a lightweight bicycle sprocket with which both a downshifting and an upshifting are smoothly performed.

In accordance with a twentieth aspect of the present invention, the bicycle sprocket according to the nineteenth aspects is configured so that the at least one sprocket tooth includes at least one facilitation tooth in the at least one shifting facilitation area.

With the bicycle sprocket according to the twentieth aspect, it is possible to provide a lightweight bicycle sprocket which further facilitates the shifting operation.

In accordance with a twenty-first aspect of the present invention, the bicycle sprocket according to the twentieth aspect is configured so that the at least one facilitation tooth includes at least one axially recessed tooth with respect to a rotational center axis of the bicycle sprocket.

With the bicycle sprocket according to the twenty-first aspect, it is possible to provide a lightweight bicycle sprocket which further facilitates the shifting operation.

In accordance with a twenty-second aspect of the present invention, the bicycle sprocket according to any one of the twentieth and twenty-first aspects is configured so that the at least one facilitation tooth facilitates downshifting.

With the bicycle sprocket according to the twenty-second aspect, it is possible to provide a lightweight bicycle sprocket which further facilitates the downshifting operation.

In accordance with a twenty-third aspect of the present invention, the bicycle sprocket according to any one of the twentieth and twenty-first aspects is configured so that the at least one facilitation tooth facilitates upshifting.

With the bicycle sprocket according to the twenty-third aspect, it is possible to provide a lightweight bicycle sprocket which further facilitates the upshifting operation.

In accordance with a twenty-fourth aspect of the present invention, the bicycle sprocket according to any one of the first to nineteenth aspects further comprises at least one shifting facilitation projection in the at least one shifting facilitation area.

With the bicycle sprocket according to the twenty-fourth aspect, it is possible to facilitate the shifting operation between two sprockets whose numbers of teeth are largely different from each other.

In accordance with a twenty-fifth aspect of the present invention, the bicycle sprocket according to the twenty-fourth aspect is configured so that the at least one shifting facilitation projection facilitates upshifting.

With the bicycle sprocket according to the twenty-fifth aspect, it is possible to facilitate the upshifting operation between two sprockets whose numbers of teeth are largely different from each other.

In accordance with a twenty-sixth aspect of the present invention, the bicycle sprocket according to any one of the first to twenty-fifth aspects is configured so that the at least one sprocket tooth includes at least one first tooth and at least one second tooth. The at least one first tooth has a first chain engaging width. The at least one second tooth has a second chain engaging width that is smaller than the first chain engaging width.

With the bicycle sprocket according to the twenty-sixth aspect, it is possible to improve chain-holding performance of the bicycle sprocket.

In accordance with a twenty-seventh aspect of the present invention, the bicycle sprocket according to the twenty-sixth aspect is configured so that the first chain engaging width is larger than an inner link space defined between an opposed pair of inner link plates of the bicycle chain in an axial direction parallel to the rotational center axis of the bicycle sprocket and is smaller than an outer link space defined between an opposed pair of outer link plates of the bicycle chain in the axial direction. The second chain engaging width is smaller than the inner link space.

With the bicycle sprocket according to the twenty-seventh aspect, it is possible to further improve chain-holding performance of the bicycle sprocket.

In accordance with a twenty-eighth aspect of the present invention, the bicycle sprocket according to any one of the first to twenty-seventh aspects is configured so that the at least one sprocket tooth is circumferentially arranged on an outer periphery of the sprocket body. The at least one sprocket tooth includes at least one first tooth and at least one second tooth. The at least one first tooth is arranged on the outer periphery to be received within an outer link space defined between a pair of outer link plates of the bicycle chain and has a first axially tooth center plane. The at least one second tooth is arranged on the outer periphery to be received within an inner link space defined between a pair of inner link plates of the bicycle chain and has a second axially tooth center plane. The first axially tooth center plane is offset from the second axially tooth center plane in an axial direction parallel to a rotational center axis of the bicycle sprocket.

With the bicycle sprocket according to the twenty-eighth aspect, it is possible to improve chain-holding performance of the bicycle sprocket.

In accordance with a twenty-ninth aspect of the present invention, the bicycle sprocket according to any one of the first to twenty-eighth aspects is configured so that the sprocket body includes a sprocket carrier to be coupled to the bicycle.

With the bicycle sprocket according to the twenty-ninth aspect, it is possible to provide a bicycle sprocket including a lightweight sprocket carrier.

In accordance with a thirtieth aspect of the present invention, the bicycle sprocket according to the twenty-ninth aspect is configured so that the sprocket carrier is made of a non-metallic material.

With the bicycle sprocket according to the thirtieth aspect, it is possible to provide a bicycle sprocket including a further lightweight sprocket carrier.

In accordance with a thirty-first aspect of the present invention, the bicycle sprocket according to the twenty-ninth aspect is configured so that the at least one bicycle attachment member and the sprocket carrier are integrated into a one-piece unitary member.

With the bicycle sprocket according to the thirty-first aspect, it is possible to enhance rigidity of the sprocket carrier as well as to lighten the sprocket carrier.

In accordance with a thirty-second aspect of the present invention, the bicycle sprocket according to any one of the twenty-ninth to thirty-first aspects is configured so that the sprocket carrier includes a plurality of supporting arms.

With the bicycle sprocket according to the thirty-second aspect, it is possible to provide a bicycle sprocket including a lightweight sprocket carrier.

In accordance with a thirty-third aspect of the present invention, the bicycle sprocket according to the thirty-second aspect is configured so that each of the plurality of supporting arms includes a reinforcing part.

With the bicycle sprocket according to the thirty-third aspect, it is possible to enhance rigidity of the sprocket carrier as well as to lighten the sprocket carrier.

In accordance with a thirty-fourth aspect of the present invention, the bicycle sprocket according to the thirty-third aspect is configured so that each of the supporting arms includes a first edge part and a second edge part opposite to the first edge part in the circumferential direction. The reinforcing part is arranged between the first edge part and the second edge part in the circumferential direction.

With the bicycle sprocket according to the thirty-fourth aspect, it is possible to further enhance rigidity of the sprocket carrier as well as to lighten the sprocket carrier.

In accordance with a thirty-fifth aspect of the present invention, a rear sprocket assembly comprises sprockets at least one of which is the bicycle sprocket according to any one of the first to thirty-fourth aspects.

With the rear sprocket assembly according to the thirty-fifth aspect, it is possible to provide a rear sprocket assembly which facilitates the shifting operation.

In accordance with a thirty-sixth aspect of the present invention, the rear sprocket assembly according to the thirty-fifth aspect is configured so that a total number of the sprockets is equal to or larger than nine.

With the rear sprocket assembly according to the thirty-sixth aspect, it is possible to provide a lightweight rear sprocket assembly which has a wide gear range and which facilitates the shifting operation.

In accordance with a thirty-seventh aspect of the present invention, the rear sprocket assembly according to any one of the thirty-fifth and thirty-sixth aspects is configured so that a tooth-number difference between a smallest sprocket and a largest sprocket of the sprockets is equal to or larger than twenty-five.

With the rear sprocket assembly according to the thirty-seventh aspect, it is possible to provide a lightweight rear sprocket assembly which has a further wide gear range and which facilitates the shifting operation.

In accordance with a thirty-eighth aspect of the present invention, the rear sprocket assembly according to any one of the thirty-fifth to thirty-seventh aspects is configured so that a tooth-number difference between a smallest sprocket and a largest sprocket of the sprockets is equal to or larger than thirty-five.

With the rear sprocket assembly according to the thirty-eighth aspect, it is possible to provide a lightweight rear sprocket assembly which has a further wide gear range and which facilitates the shifting operation.

In accordance with a thirty-ninth aspect of the present invention, the rear sprocket assembly according to any one of the thirty-fifth to thirty-eighth aspects is configured so that a total number of tooth that a largest sprocket of the sprockets has is equal to or larger than forty-four.

With the rear sprocket assembly according to the thirty-ninth aspect, it is possible to provide a lightweight rear sprocket assembly which has a further wide gear range and which facilitates the shifting operation.

In accordance with a fortieth aspect of the present invention, the rear sprocket assembly according to any one of the thirty-fifth to thirty-ninth aspects is configured so that a total number of tooth that a smallest sprocket of the sprockets has is equal to or smaller than ten.

With the rear sprocket assembly according to the fortieth aspect, it is possible to provide a lightweight rear sprocket assembly which has a further wide gear range and which facilitates the shifting operation.

In accordance with a forty-first aspect of the present invention, a drive train of a bicycle comprises a single front sprocket and the rear sprocket assembly according to any one of the thirty-fifth to fortieth aspects.

With the drive train according to the forty-first aspect, it is possible to provide a lightweight drive train of a bicycle.

In accordance with a forty-second aspect of the present invention, the drive train according to the forty-first aspect is configured so that the at least one sprocket tooth of the single front sprocket is circumferentially arranged on an outer periphery of the sprocket body of the single front sprocket. The at least one sprocket tooth of the single front sprocket includes at least one first tooth and at least one second tooth. The at least one first tooth has a first chain engaging width. The at least one second tooth has a second chain engaging width that is smaller than the first chain engaging width.

With the drive train according to the forty-second aspect, it is possible to improve chain-holding performance of the lightweight drive train of the bicycle.

In accordance with a forty-third aspect of the present invention, the drive train according to the forty-second aspect is configured so that the at least one first tooth is configured to be received within an outer link space defined between a pair of outer link plates of the bicycle chain. The at least one second tooth is configured to be received within an inner link space defined between a pair of inner link plates of the bicycle chain.

With the drive train according to the forty-third aspect, it is possible to further improve chain-holding performance of the lightweight drive train of the bicycle.

In accordance with a forty-fourth aspect of the present invention, the drive train according to any one of the forty-second and forty-third aspects is configured so that the first chain engaging width is larger than an inner link space defined between an opposed pair of inner link plates of the bicycle chain in an axial direction parallel to the rotational center axis of the bicycle sprocket and is smaller than an outer link space defined between an opposed pair of outer link plates of the bicycle chain in the axial direction. The second chain engaging width is smaller than the inner link space.

With the drive train according to the forty-fourth aspect, it is possible to further improve chain-holding performance of the lightweight drive train of the bicycle.

In accordance with a forty-fifth aspect of the present invention, a sprocket assembly comprises a first bicycle sprocket and a second bicycle sprocket. The first bicycle sprocket is the bicycle sprocket according to any one of the first to thirty-first aspects. The first bicycle sprocket has a first total number of teeth. The second bicycle sprocket is the bicycle sprocket according to any one of the first to thirty-first aspects. The second bicycle sprocket has a second total number of teeth. The second total number is different from the first total number. The at least one bicycle attachment member of the first bicycle sprocket and the at least one bicycle attachment member of the second bicycle sprocket are integrated into a one-piece unitary member.

With the sprocket assembly according to the forty-fifth aspect, it is possible to provide a lightweight sprocket assembly.

In accordance with a forty-sixth aspect of the present invention, the bicycle sprocket according to any one of the first to thirty-fourth aspects is configured so that a radial tooth length between a root circle and a tooth tip of the at least one sprocket tooth in a radial direction with respect to a rotational center axis of the bicycle sprocket is longer than an axial tooth length of the at least one sprocket tooth in an axial direction parallel to the rotational center axis of the bicycle sprocket.

With the bicycle sprocket according to the forty-sixth aspect, it is possible to provide a further lightweight bicycle sprocket.

In accordance with a forty-seventh aspect of the present invention, the bicycle sprocket according to any one of the first to twenty-eighth aspects is configured so that the at least one bicycle attachment member has a hub engagement profile to engage with a bicycle hub.

With the bicycle sprocket according to the forty-seventh aspect, it is possible to provide a lightweight bicycle rear sprocket.

In accordance with a forty-eighth aspect of the present invention, the bicycle sprocket according to any one of the first to thirty-fourth aspects is configured so that the at least one bicycle attachment member has a crank attachment portion to which a bicycle crank is attached.

With the bicycle sprocket according to the forty-eighth aspect, it is possible to provide a lightweight bicycle front sprocket.

In accordance with a forty-ninth aspect of the present invention, a bicycle sprocket comprises at least one chain engaging member and at least one bicycle attachment member. The at least one chain engaging member constitutes at least a part of at least one sprocket tooth of the bicycle sprocket and configured to contact a bicycle chain in a state where the bicycle chain engages with the bicycle sprocket. The at least one chain engaging member is made of a first metallic material and has a first torque transmitting profile. The at least one bicycle attachment member constitutes at least a part of a sprocket body of the bicycle sprocket and configured to be coupled to a bicycle. The at least one bicycle attachment member is made of a second metallic material and has a second torque transmitting profile to engage with the first torque transmitting profile.

With the bicycle sprocket according to the forty-ninth aspect, it is possible to provide a lightweight bicycle sprocket to securely transmit driving torque from or to the bicycle chain.

In accordance with a fiftieth aspect of the present invention, the bicycle sprocket according to the forty-ninth aspect is configured so that the first torque transmitting profile does not overlap with the second torque transmitting profile as viewed in an axial direction parallel to a rotational center axis of the bicycle sprocket.

With the bicycle sprocket according to the fiftieth aspect, it is possible to provide a lightweight bicycle sprocket with a thin sprocket structure to securely transmit driving torque from or to the bicycle chain.

In accordance with a fifty-first aspect of the present invention, the bicycle sprocket according to any one of the forty-ninth and fiftieth aspects is configured so that the first torque transmitting profile has a first surface non-parallel to a rotational direction of the bicycle sprocket around a rotational center axis of the bicycle sprocket.

With the bicycle sprocket according to the fifty-first aspect, it is possible to provide a lightweight bicycle sprocket to further securely transmit driving torque from or to the bicycle chain.

In accordance with a fifty-second aspect of the present invention, the bicycle sprocket according to any one of the forty-ninth to fifty-first aspects is configured so that the first torque transmitting profile includes a first spline along the rotational center axis. The second torque transmitting profile includes a second spline along a rotational center axis of the bicycle sprocket. The second spline is configured to engage with the first spline.

With the bicycle sprocket according to the fifty-second aspect, it is possible to provide a lightweight bicycle sprocket to further securely transmit driving torque from or to the bicycle chain.

In accordance with a fifty-third aspect of the present invention, a bicycle sprocket comprises at least one chain engaging member and at least one bicycle attachment member. The at least one chain engaging member constitutes at least a tooth tip and a driving surface of at least one sprocket tooth of the bicycle sprocket and configured to contact with a bicycle chain in a state where the bicycle chain engages with the bicycle sprocket. The at least one chain engaging member is made of a metallic material. The at least one bicycle attachment member constitutes at least a part of a sprocket body of the bicycle sprocket and configured to be coupled to a bicycle. The at least one bicycle attachment member partly extends radially outwardly from a root circle of the at least one sprocket tooth and is disposed radially inwardly from the tooth tip of the at least one sprocket tooth of the bicycle sprocket. The at least one bicycle attachment member is made of a non-metallic material.

With the bicycle sprocket according to the fifty-third aspect, it is possible to provide a lightweight bicycle sprocket.

In accordance with a fifty-fourth aspect of the present invention, the bicycle sprocket according to the fifty-third aspect is configured so that at least one chain engaging member further constitutes a non-driving surface of the at least one sprocket tooth of the bicycle sprocket.

With the bicycle sprocket according to the fifty-fourth aspect, it is possible to provide a further lightweight bicycle sprocket.

In accordance with a fifty-fifth aspect of the present invention, the bicycle sprocket according to any one of the fifty-third and fifty-fourth aspects is configured so that the at least one bicycle attachment member has a tip end. The tip end is disposed radially outwardly from the root circle of the sprocket teeth by a distance that is equal to or larger than 0.1 mm.

With the bicycle sprocket according to the fifty-fifth aspect, it is possible to provide a further lightweight bicycle sprocket.

In accordance with a fifty-sixth aspect of the present invention, the bicycle sprocket according to the fifty-fifth aspect is configured so that the tip end is disposed radially outwardly from the root circle of the sprocket teeth by a distance that is equal to or larger than 1.1 mm.

With the bicycle sprocket according to the fifty-sixth aspect, it is possible to provide a further lightweight bicycle sprocket.

In accordance with a fifty-seventh aspect of the present invention, the bicycle sprocket according to any one of the first to thirty-fourth and forty-sixth to fifty-sixth aspects is configured so that the at least one bicycle attachment member constituting at least a part of at least one concavo-convex portion positioned radially inwardly from the at least one sprocket tooth and extending from the sprocket body in an axial direction parallel to a rotational center axis of the bicycle sprocket.

With the bicycle sprocket according to the fifty-seventh aspect, it is possible to enhance rigidity of the at least one bicycle attachment member as well as to further lighten the at least one bicycle attachment member.

In accordance with a fifty-eighth aspect of the present invention, the bicycle sprocket according to the fifty-seventh aspect is configured so that the at least one concavo-convex portion includes at least one first concavo-convex portion extending in a circumferential direction with respect to the rotational center axis of the bicycle sprocket.

With the bicycle sprocket according to the fifty-eighth aspect, it is possible to further enhance rigidity of the at least one bicycle attachment member.

In accordance with a fifty-ninth aspect of the present invention, the bicycle sprocket according to any one of the fifty-seventh and fifty-eighth aspects is configured so that the at least one concavo-convex portion includes at least one second concavo-convex portion extending generally in a radial direction with respect to the rotational center axis of the bicycle sprocket.

With the bicycle sprocket according to the fifty-ninth aspect, it is possible to further enhance rigidity of the at least one bicycle attachment member.

In accordance with a sixtieth aspect of the present invention, the bicycle sprocket according to any one of the fifty-seventh to fifty-ninth aspects is configured so that the at least one concavo-convex portion includes second concavo-convex portions, a number of which is equal to a number of the at least one sprocket tooth of the bicycle sprocket.

With the bicycle sprocket according to the sixtieth aspect, it is possible to further enhance rigidity of the at least one bicycle attachment member.

In accordance with a sixty-first aspect of the present invention, the bicycle sprocket according to any one of the fifty-seventh to sixtieth aspects is configured so that the at least one second concavo-convex portion inclines in a range of zero degrees to thirty-five degrees with respect to a radial line from the rotational center axis of the bicycle sprocket.

With the bicycle sprocket according to the sixty-first aspect, it is possible to further enhance rigidity of the at least one bicycle attachment member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
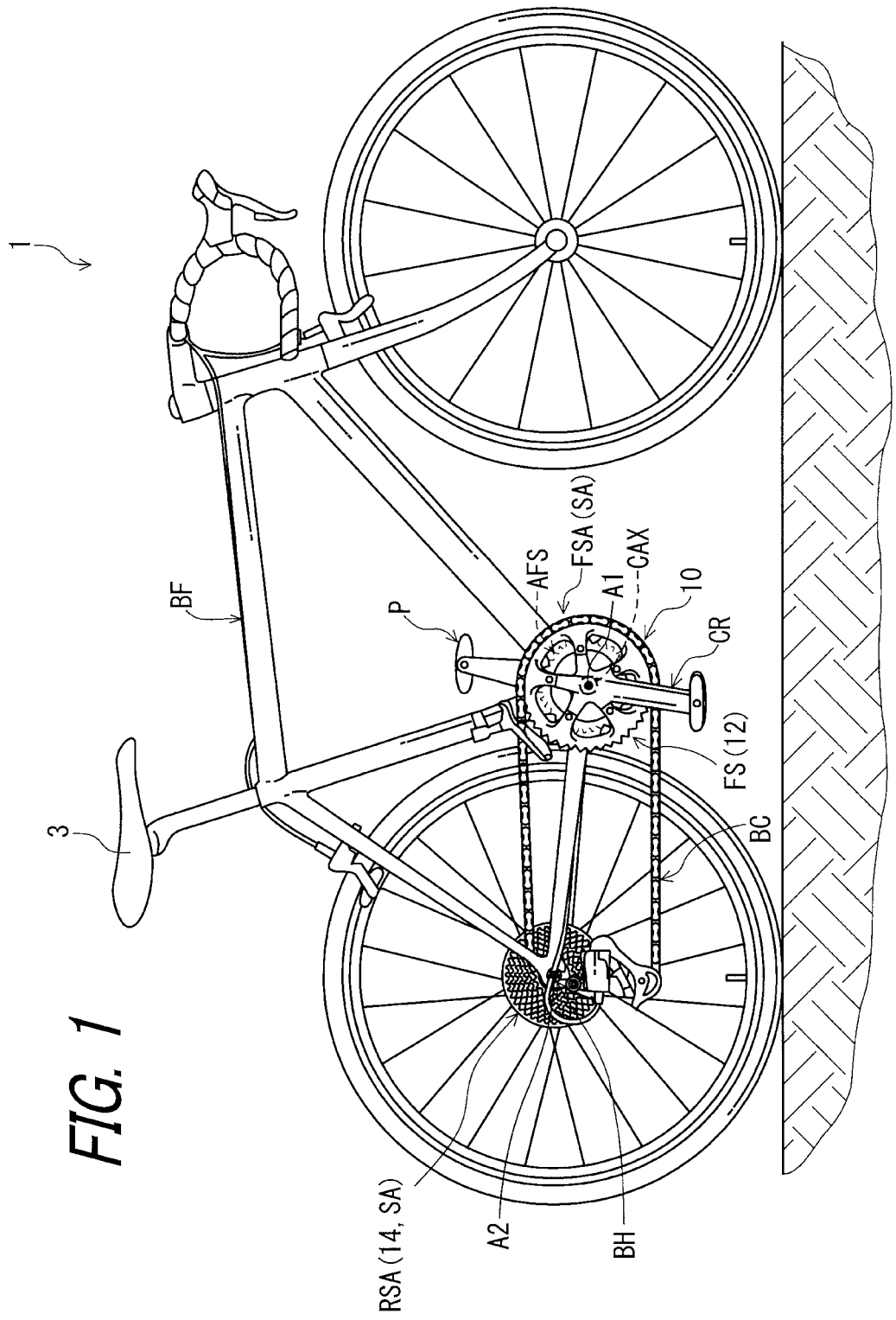
FIG. 1 a side elevational view of a bicycle including a drive train of a bicycle in accordance with a first embodiment.

The embodiments will now be described with reference to the accompanying drawings, wherein like reference numerals designate corresponding or identical elements throughout the various drawings.

First Embodiment

Referring initially to FIG. 1, a drive train 10 of a bicycle in accordance with an embodiment is mounted to a bicycle 1. In the illustrated embodiment, for example, the drive train 10 comprises a single front sprocket FS and a rear sprocket assembly RSA. However, this is a mere example, and the drive train 10 may further comprise an additional front sprocket AFS to constitute a front sprocket assembly FSA (see second and third embodiments). The front sprocket FS can be referred to as a bicycle sprocket 12 according to this embodiment. The front sprocket FS is attached to a crank axle CAX. A bicycle crank CR is attached to the front sprocket FS. A pedal P is attached to the bicycle crank CR. The front sprocket FS has a rotational center axis A1. The front sprocket FS is rotatable about the rotational center axis A1 relative to a bicycle frame BF. The front sprocket FS is engaged with a bicycle chain BC to transmit a rotational driving force F1 (See FIGS. 2 and 3) to the bicycle chain BC. The bicycle chain BC is engaged with the front sprocket FS and the rear sprocket assembly RSA. The rear sprocket assembly RSA can be referred to as a rear sprocket assembly 14 according to this embodiment. The rear sprocket assembly RSA is attached to a bicycle hub BH. The rear sprocket assembly RSA has a rotational center axis A2. The rear sprocket assembly RSA is engaged with the bicycle chain BC to receive the rotational driving force F1 (see FIGS. 11 and 15) from the bicycle chain BC. The rear sprocket assembly RSA is rotatable about the rotational center axis A2 relative to the bicycle frame BF. The front sprocket assembly FSA and the rear sprocket assembly RSA can be simply referred to as a sprocket assembly SA in this embodiment.

In the present application, the following directional terms "front", "rear", "forward", "rearward", "left", "right", "transverse", "upward" and "downward" as well as any other similar directional terms refer to those directions which are determined on the basis of the user who sits on a saddle 3 of the bicycle 1 with facing a handlebar 5. Accordingly, these terms, as utilized to describe the front sprocket FS and the rear sprocket assembly RSA, should be interpreted relative to the bicycle equipped with the drive train 10 as used in an upright riding position on a horizontal surface.

Figure 2:
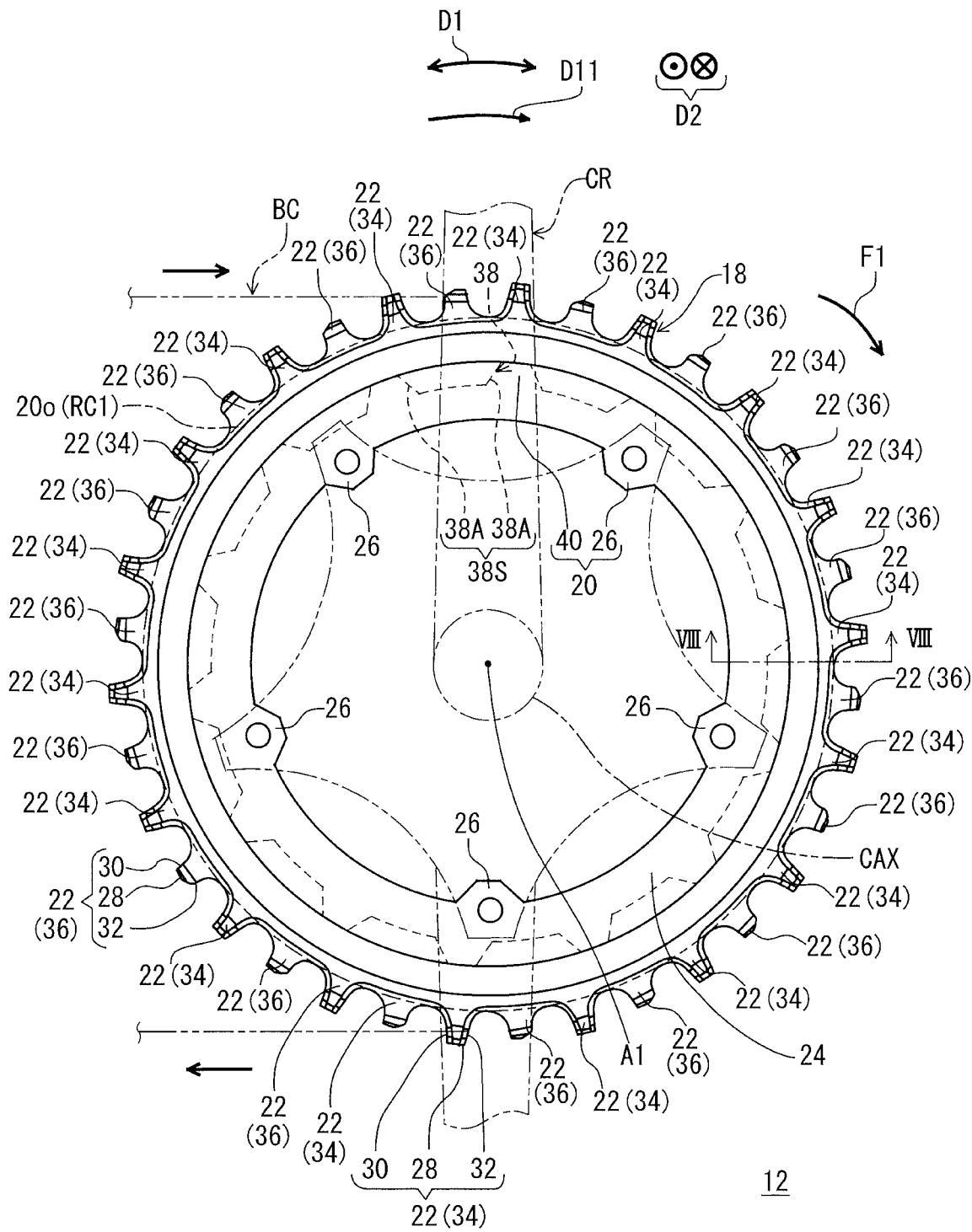
FIG. 2 is a side elevational view of a bicycle sprocket in accordance with the first embodiment.
Figure 3:
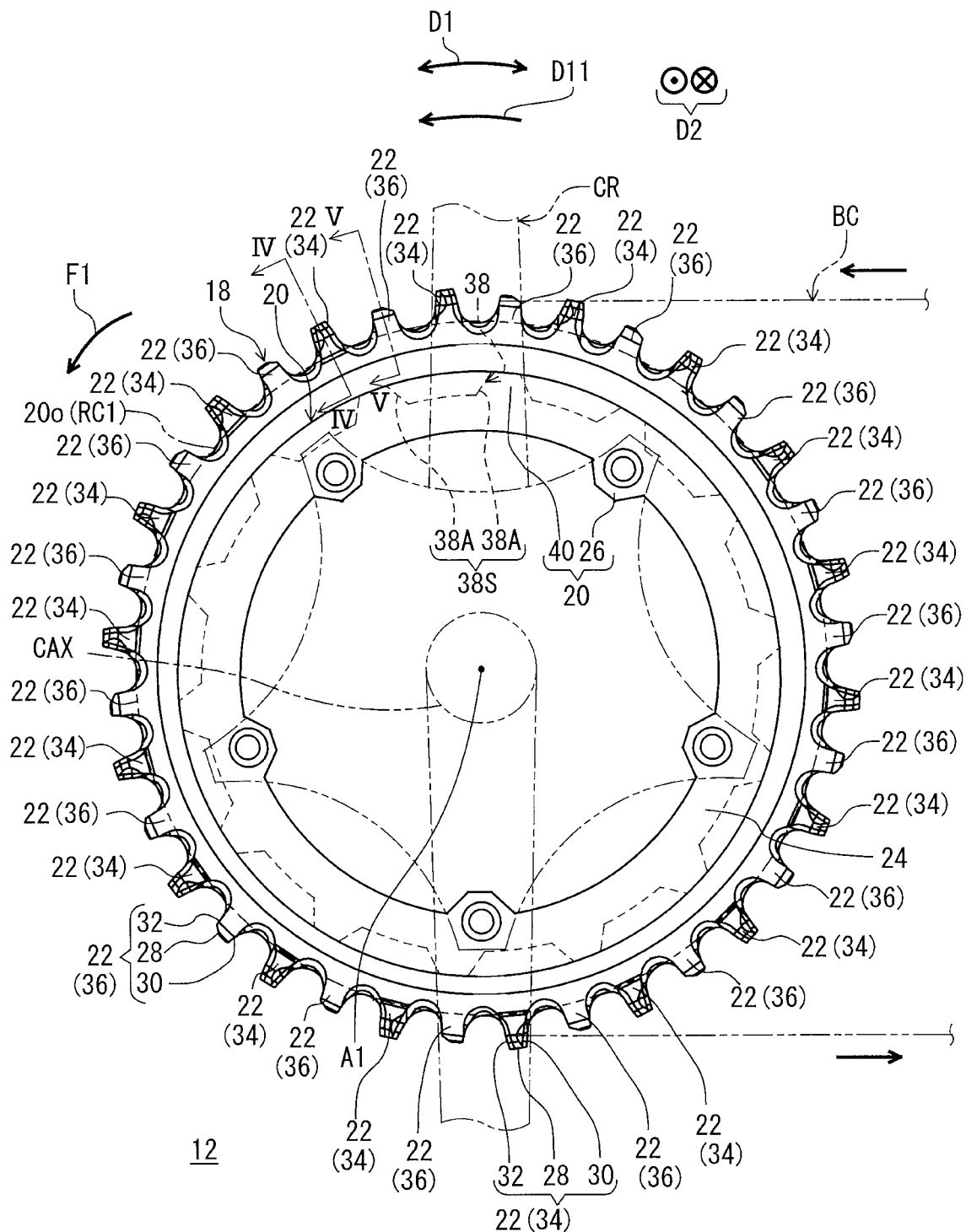
FIG. 3 is another side elevational view of the bicycle sprocket illustrated in FIG. 1.

As seen in FIGS. 2 and 3, the bicycle sprocket 12 comprises at least one chain engaging member 18 and at least one bicycle attachment member 20. In the illustrated embodiment, the bicycle sprocket 12 includes one chain engaging member 18 and one bicycle attachment member 20. However, the illustrated one chain engaging member 18 may be divided into several pieces to constitute the at least one chain engaging member 18, and the illustrated one bicycle attachment member 20 may be divided into several pieces to constitute the at least one bicycle attachment member 20. Therefore, the at least one chain engaging member 18 has at least a part of an annular shape. In the illustrated embodiment, the at least one chain engaging member 18 has an annular shape. The bicycle sprocket 12 includes at least one sprocket tooth 22 and a sprocket body 24. The at least one sprocket tooth 22 of the bicycle sprocket 12 (the single front sprocket FS) is circumferentially arranged on an outer periphery 20o of the sprocket body 24 of the bicycle sprocket 12 (the single front sprocket FS). The outer periphery 20o of the sprocket body 24 can be identical to a root circle RC1 of the at least one sprocket tooth 22. The sprocket body 24 has a crank attachment portion 26 to which the bicycle crank CR is attached. Specifically, the at least one bicycle attachment member 20 has the crank attachment portion 26 to which the bicycle crank CR is attached. The bicycle crank CR is attached to the crank attachment portion 26 with an attachment member (e.g. a bolt and a nut) which is not illustrated in the drawings.

Each of the at least one sprocket tooth 22 includes a tooth tip 28, a driving surface 30, and a non-driving surface 32. The driving surface 30 is configured to contact the bicycle chain BC in a state where the bicycle chain BC engages with the bicycle sprocket 12. The non-driving surface 32 is a surface of each of the at least one sprocket tooth 22 other than the driving surface 30. The at least one chain engaging member 18 constitutes at least a part of the at least one sprocket tooth 22 of the bicycle sprocket 12. Specifically, the at least one chain engaging member 18 constitutes at least the tooth tip 28 and the driving surface 30 of the at least one sprocket tooth 22 of the bicycle sprocket 12. The at least one chain engaging member 18 is configured to contact the bicycle chain BC in a state where the bicycle chain BC engages with the bicycle sprocket 12. The at least one bicycle attachment member 20 constitutes at least a part of the sprocket body 24 of the bicycle sprocket 12 and is configured to be coupled to the bicycle 1. The at least one bicycle attachment member 20 is disposed radially inwardly from the tooth tip 28 of the at least one sprocket tooth 22 of the bicycle sprocket 12. In the illustrated embodiment, the at least one chain engaging member 18 further constitutes the non-driving surface 32 of the at least one sprocket tooth 22 of the bicycle sprocket 12. However, the at least one bicycle attachment member 20 may further constitute the non-driving surface 32 of the at least one sprocket tooth 22 of the bicycle sprocket 12.

In this embodiment, the at least one sprocket tooth 22 of the bicycle sprocket 12 (the single front sprocket FS) includes at least one first tooth 34 and at least one second tooth 36. Specifically, the bicycle sprocket 12 (the single front sprocket FS) includes a plurality of sprocket teeth 22, and the plurality of sprocket teeth 22 include a plurality of first teeth 34 and a plurality of second teeth 36. Preferably, the first teeth 34 and the second teeth 36 are alternately arranged in the circumferential direction D1 of the bicycle sprocket 12.

Figure 4:
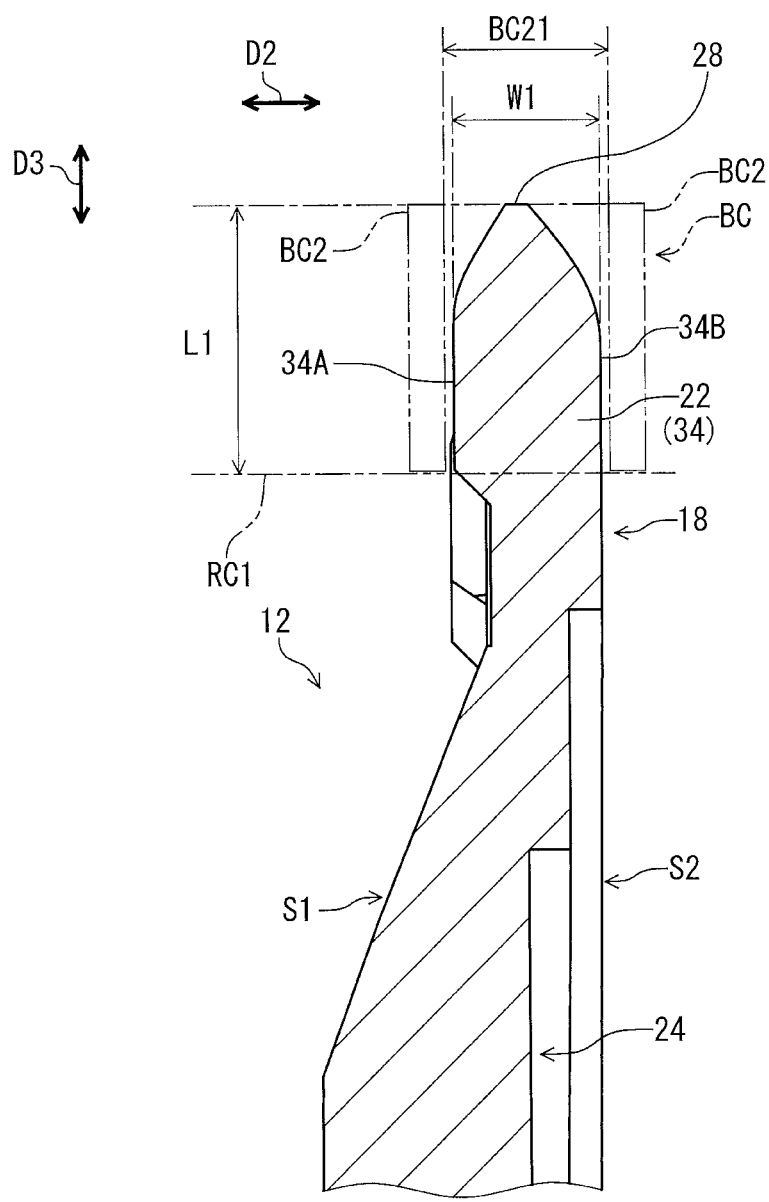
FIG. 4 is a cross-sectional view of the bicycle sprocket taken along line IV-IV of FIG. 3.
Figure 5:
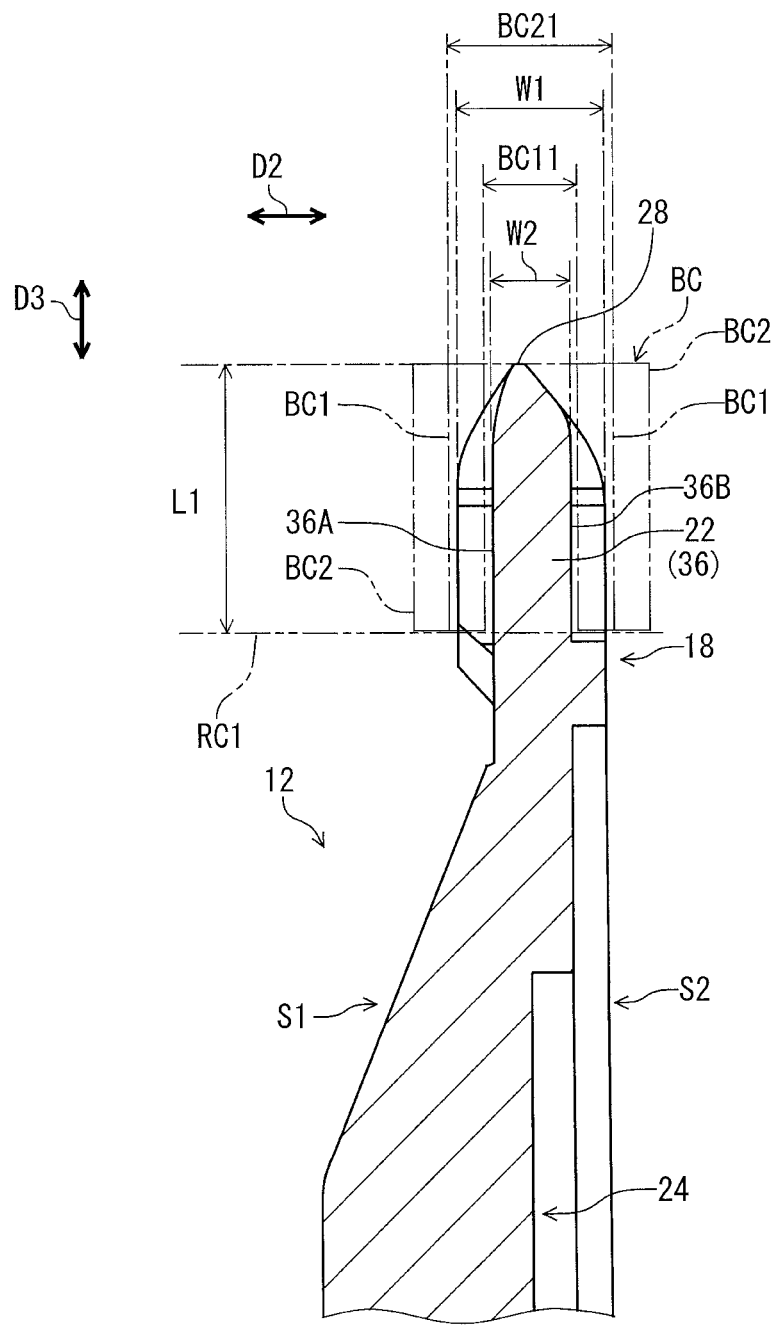
FIG. 5 is a cross-sectional view of the bicycle sprocket taken along line V-V of FIG. 3.

As seen in FIG. 4, the at least one first tooth 34 is configured to be received within an outer link space BC21 defined between a pair of outer link plates BC2 of the bicycle chain BC. The at least one first tooth 34 has a first chain engaging width W1. The first chain engaging width W1 is defined in the axial direction D2. Each of the first teeth 34 has the first chain engaging width W1. As seen in FIG. 5, the at least one second tooth 36 is configured to be received within an inner link space BC11 defined between a pair of inner link plates BC1 of the bicycle chain BC. The at least one second tooth 36 has a second chain engaging width W2 that is smaller than the first chain engaging width W1. The second chain engaging width W2 is defined in the axial direction D2. Each of the second teeth 36 has the second chain engaging width W2. As seen in FIGS. 4 and 5, the first chain engaging width W1 is larger than the inner link space BC11 defined between an opposed pair of inner link plates BC1 of the bicycle chain BC in the axial direction D2 parallel to the rotational center axis A1 of the bicycle sprocket 12. The first chain engaging width W1 is smaller than the outer link space BC21 defined between an opposed pair of outer link plates BC2 of the bicycle chain BC in the axial direction D2. The second chain engaging width W2 is smaller than the inner link space BC11. A radial tooth length L1 between the root circle RC1 and the tooth tip 28 of the at least one sprocket tooth 22 in a radial direction D3 with respect to the rotational center axis A1 of the bicycle sprocket 12 is longer than an axial tooth length W1 of the at least one sprocket tooth 22 in the axial direction D2 parallel to the rotational center axis A1 of the bicycle sprocket 12.

As seen in FIG. 4, the at least one first tooth 34 includes a first axial end 34A and a first opposite axial end 34B opposite to the first axial end 34A in the axial direction D2. The first axial end 34A and the first opposite axial end 34B are contactable with the outer link plate BC2 of the bicycle chain BC. The first chain engaging width W1 is defined between the first axial end 34A and the first opposite axial end 34B in the axial direction D2. In this embodiment, each of the first teeth 34 includes the first axial end 34A and the first opposite axial end 34B opposite to the first axial end 34A in the axial direction D2. In each of the first teeth 34, the first chain engaging width W1 is defined between the first axial end 34A and the first opposite axial end 34B in the axial direction D2.

As seen in FIG. 5, the at least one second tooth 36 includes a second axial end 36A and a second opposite axial end 36B opposite to the second axial end 36A in the axial direction D2. The second axial end 36A and the second opposite axial end 36B are contactable with the inner link plate BC1 of the bicycle chain BC. The second chain engaging width W2 is defined between the second axial end 36A and the second opposite axial end 36B in the axial direction D2. In this embodiment, each of the second teeth 36 includes the second axial end 36A and the second opposite axial end 36B opposite to the second axial end 36A in the axial direction D2. In each of the second teeth 36, the second chain engaging width W2 is defined between the second axial end 36A and the second opposite axial end 36B in the axial direction D2.

Figure 6:
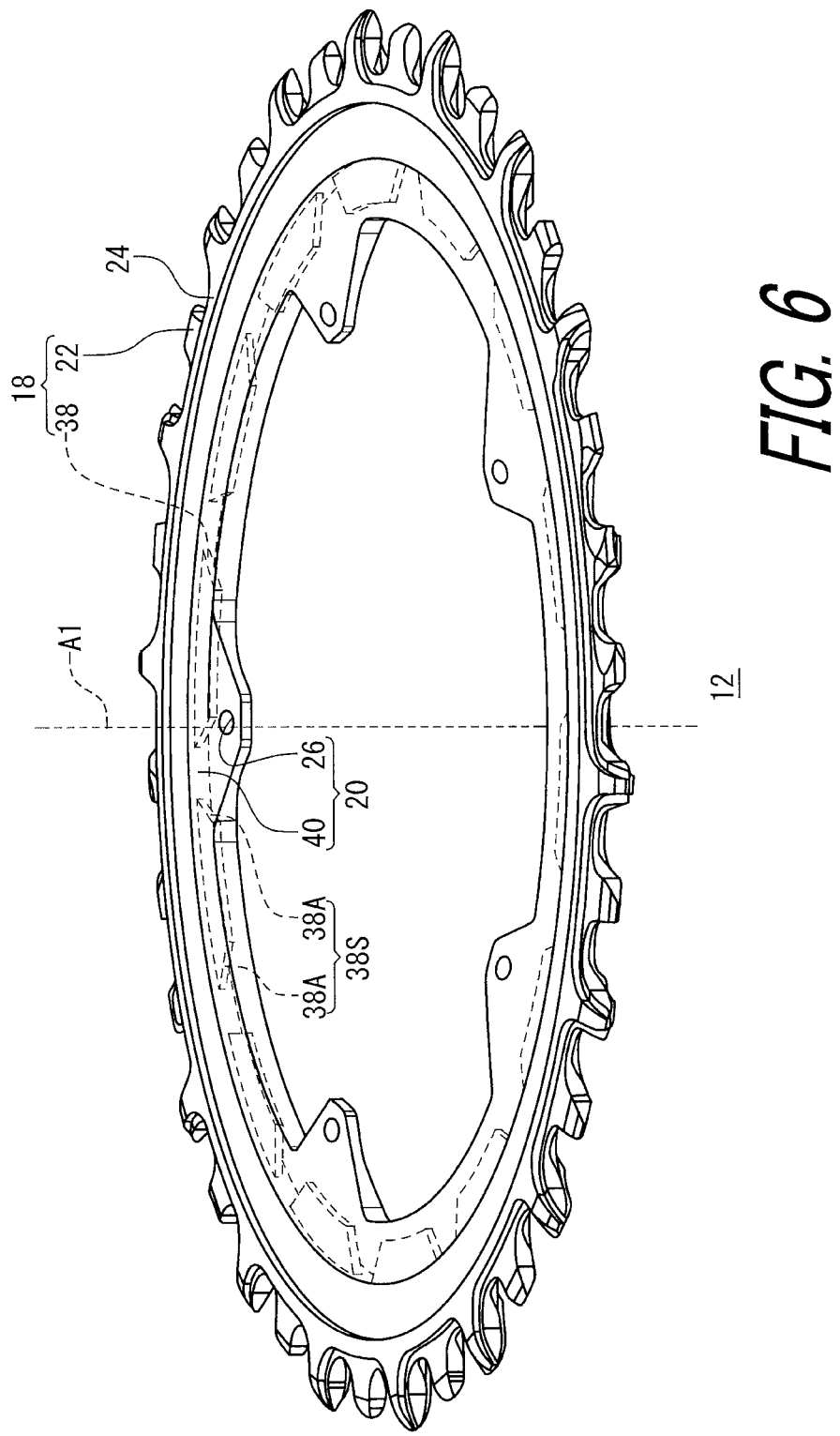
FIG. 6 is a perspective view of the bicycle sprocket illustrated in FIGS. 2 and 3.

As seen in FIG. 6, the at least one chain engaging member 18 has a first torque transmitting profile 38. In the illustrated embodiment, the chain engaging member 18 has a plurality of first torque transmitting profiles 38, but the chain engaging member 18 can have only one first torque transmitting profile 38. When the illustrated one chain engaging member 18 is divided into several pieces to constitute the at least one chain engaging member 18, at least one of the several pieces can have an individual first torque transmitting profile 38.

Figure 7:
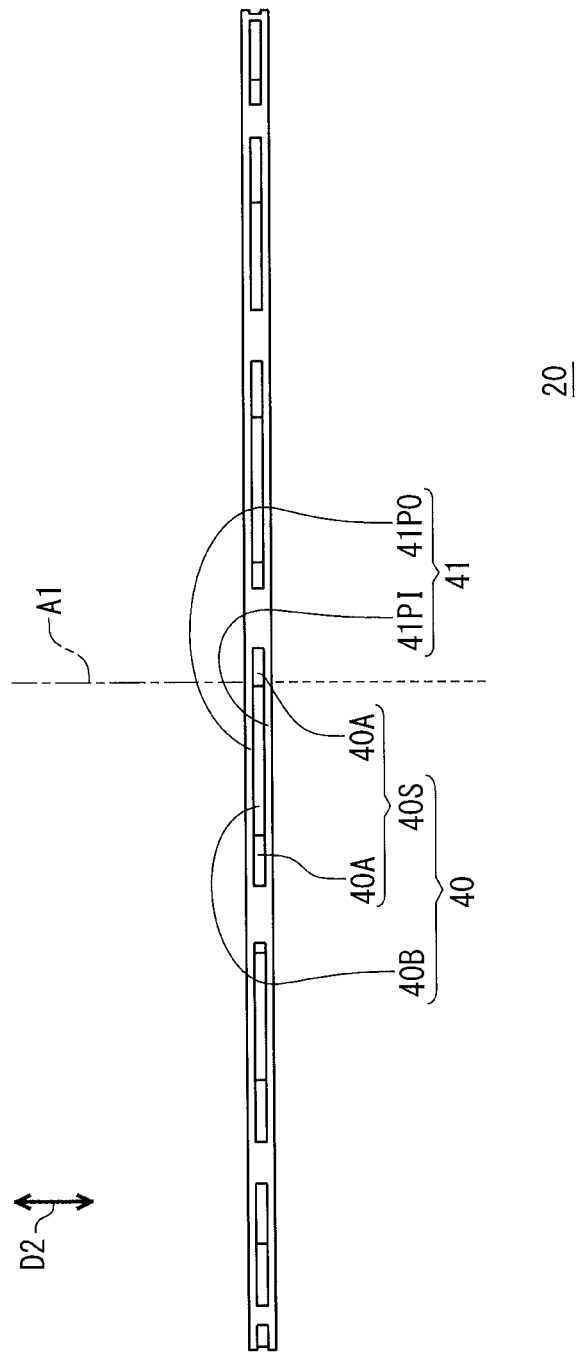
FIG. 7 is a front view of the bicycle attachment member illustrated in FIG. 6.

As seen in FIGS. 6 and 7, the at least one bicycle attachment member 20 has a second torque transmitting profile 40 to engage with the first torque transmitting profile 38. In the illustrated embodiment, the bicycle attachment member 20 has a plurality of second torque transmitting profiles 40, but the bicycle attachment member 20 can have only one second torque transmitting profile 40. When the illustrated one bicycle attachment member 20 is divided into several pieces to constitute the at least one bicycle attachment member 20, at least one of the several pieces can have an individual second torque transmitting profile 40.

As seen in FIGS. 2 and 3, the first torque transmitting profile 38 does not overlap with the second torque transmitting profile 40 as viewed in the axial direction D2 parallel to the rotational center axis A1 of the bicycle sprocket 12. The first torque transmitting profile 38 has a first surface 38A non-parallel to a driving rotational direction D11 of the bicycle sprocket 12 around the rotational center axis A1.

Figure 8:
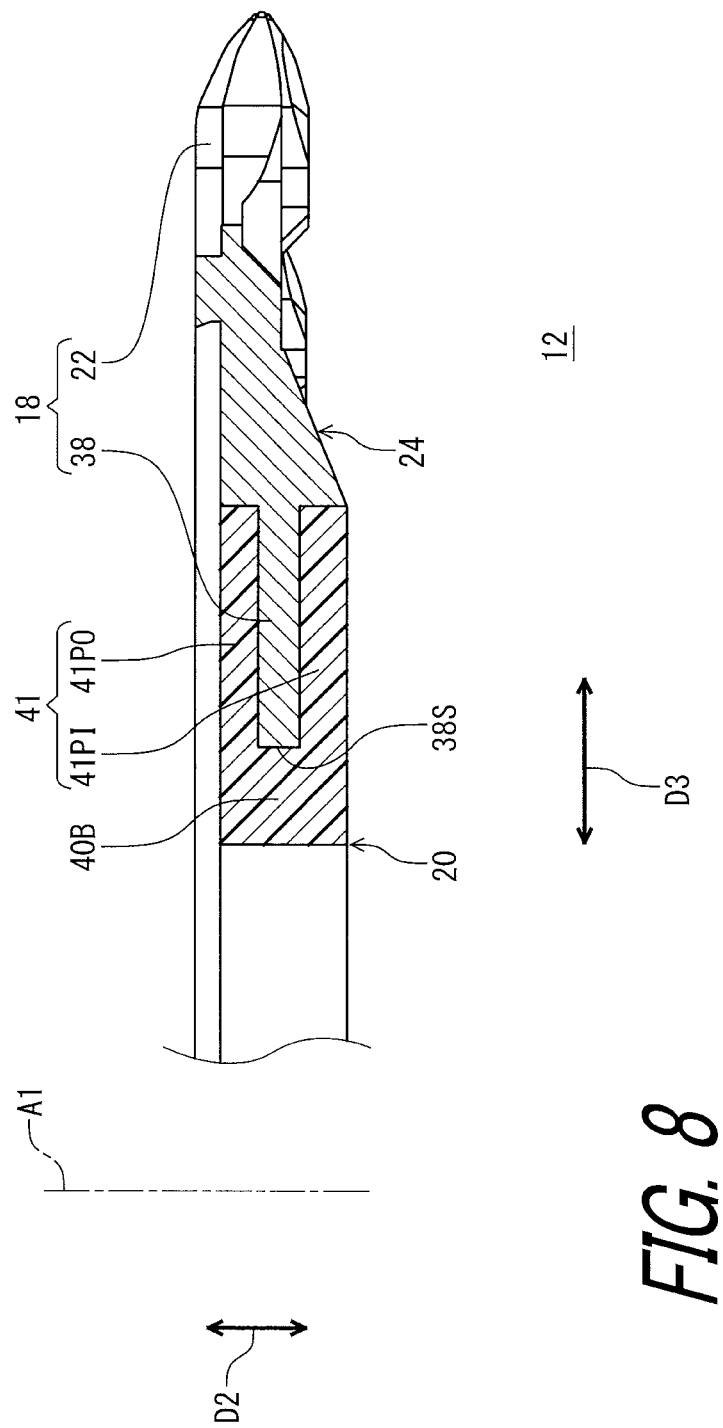
FIG. 8 is a cross-sectional view of the bicycle sprocket taken along line XIII-XIII of FIG. 2.

As seen in FIGS. 6 and 8, the first torque transmitting profile 38 includes a first spline 38S along the rotational center axis A1. The first spline 38S includes the first surfaces 38A. As seen in FIGS. 2, 3, 6, and 7, the second torque transmitting profile 40 includes a second spline 40S along the rotational center axis A1. The second spline 40S is configured to engage with the first spline 38S. The second spline 40S includes second surfaces 40A to contact the first surfaces 38A. The second surfaces 40A are non-parallel to the driving rotational direction D11 of the bicycle sprocket 12 around the rotational center axis A1. That is, the second torque transmitting profile 40 has a second surface 40A non-parallel to the driving rotational direction D11 of the bicycle sprocket 12 around the rotational center axis A1. As seen in FIGS. 7 and 8, the second torque transmitting profile 40 includes an inner base 40B. The second surfaces 40A extend radially outwardly from the inner base 40B.

As seen in FIGS. 7 and 8, the at least one bicycle attachment member 20 includes a clamping profile 41. The clamping profile 41 includes an inner protrusion 41PI and an outer protrusion 41PO. The inner protrusion 41PI and the outer protrusion 41PO outwardly extend from the inner base 40B in the radial direction D3 of the bicycle sprocket 12 perpendicular to the rotational center axis A1 of the bicycle sprocket 12. In other words, the inner protrusion 41PI and the outer protrusion 41PO radially outwardly extend from the inner base 40B. As seen in FIG. 8, the first torque transmitting profile 38 is sandwiched between the inner protrusion 41PI and the outer protrusion 41PO in the axial direction D2 parallel to the rotational center axis A1 of the bicycle sprocket 12. Therefore, the at least one chain engaging member 18 is secured with the at least one bicycle attachment member 20 in the axial direction D2.

As seen in FIG. 8, the at least one chain engaging member 18 is made of a first material. The at least one bicycle attachment member 20 is made of a second material that is different from the first material. The first material includes metallic material, and the second material includes a non-metallic material. Preferably, the second material has a second specific gravity smaller than a first specific gravity that the first material has. More preferably, the first material has a first abrasion resistance larger than a second abrasion resistance that the second material has. Even more preferably, the first material has a first rigidity larger than a second rigidity that the second material has. Therefore, preferably, the first material includes at least one of stainless steel, titanium, and aluminum. The second material includes a fiber reinforced plastic material. Preferably, the at least one bicycle attachment member 20 is integrally molded with the at least one chain engaging member 18 using a metal die. Alternatively, the at least one bicycle attachment member 20 is made by hot-pressing prepreg sheets which are piled on the at least one chain engaging member 18.

Figure 9:
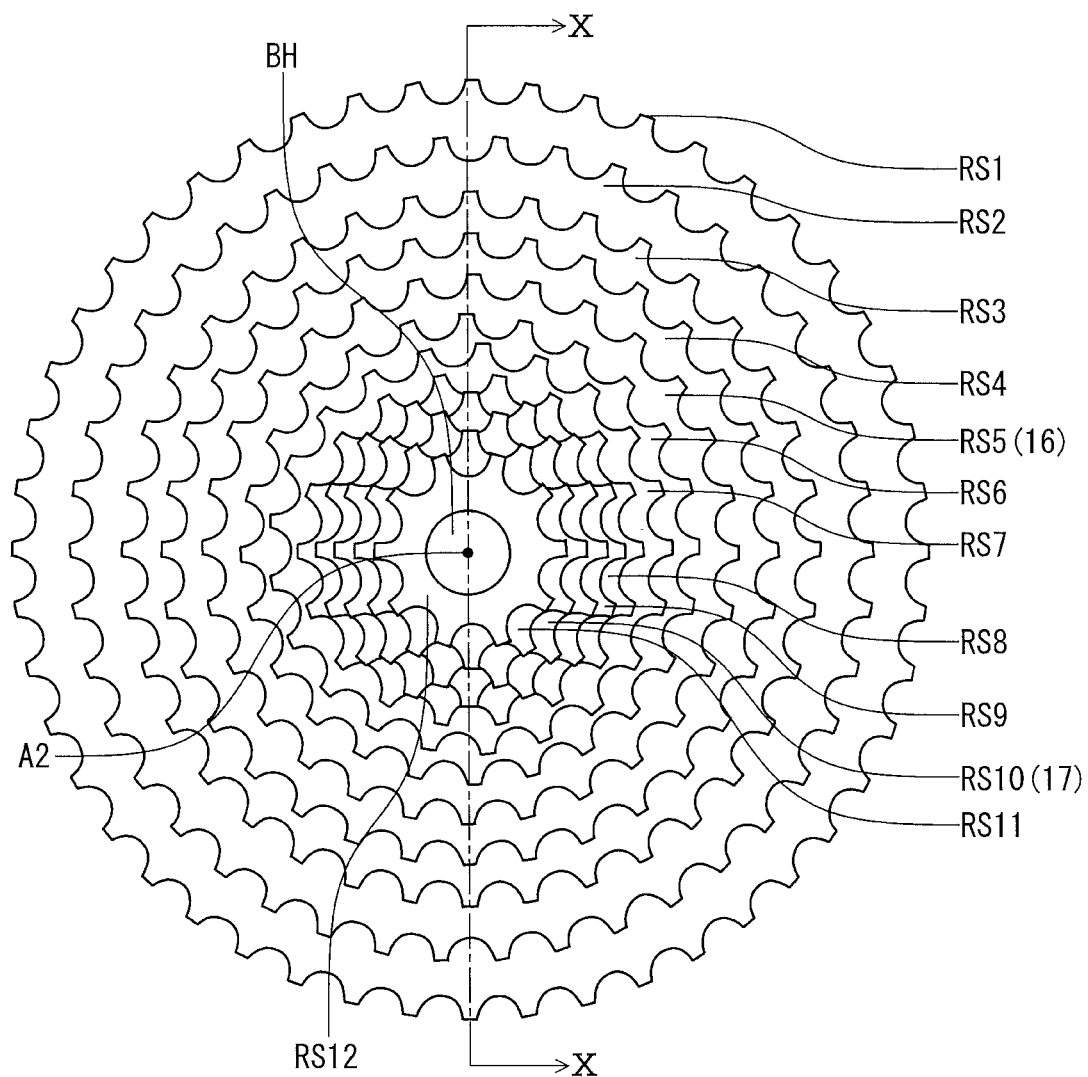
FIG. 9 is a side elevational view of a rear sprocket assembly in accordance with the first embodiment.

FIG. 9 shows one example of the rear sprocket assembly 14. In the illustrated embodiment, the rear sprocket assembly 14 includes sprockets RS1 to RS12. In the illustrated embodiment, a total number of the sprockets RS1 to RS12 is twelve. However, the total number of the sprockets is not limited to twelve, but preferably, the total number of the sprockets is equal to or larger than nine. At least one of the sprockets RS1 to RS12 can be referred to as a bicycle sprocket 16 according to this embodiment. At least one of the sprockets RS1 to RS12 can be referred to as a bicycle sprocket 17 according to this embodiment. In the illustrated embodiment, the sprocket RS5 can be referred to as the bicycle sprocket 16, but the bicycle sprocket 16 is not limited to the sprocket RS5. In the illustrated embodiment, the sprocket RS10 can be referred to as the bicycle sprocket 17, but the bicycle sprocket 17 is not limited to the sprocket RS10. Accordingly, the rear sprocket assembly 14 comprises the sprockets RS1 to RS12 at least one of which is the bicycle sprocket 16. The rear sprocket assembly 14 comprises the sprockets RS1 to RS12 at least one of which is the bicycle sprocket 17. In the illustrated embodiment, the smallest sprocket RS12 of the sprockets RS1 to RS12 has ten teeth. The largest sprocket RS1 of the sprockets RS1 to RS12 has forty-eight teeth. Therefore, a tooth-number difference between the smallest sprocket RS12 and the largest sprocket RS1 of the sprockets RS1 to RS12 is thirty-eight. In this embodiment, preferably, a tooth-number difference between a smallest sprocket and a largest sprocket of the sprockets is equal to or larger than twenty-five. More preferably, a tooth-number difference between a smallest sprocket and a largest sprocket of the sprockets is equal to or larger than thirty-five. A total number of tooth that a largest sprocket of the sprockets has is equal to or larger than forty-four. A total number of tooth that a smallest sprocket of the sprockets has is equal to or smaller than ten.

Figure 10:
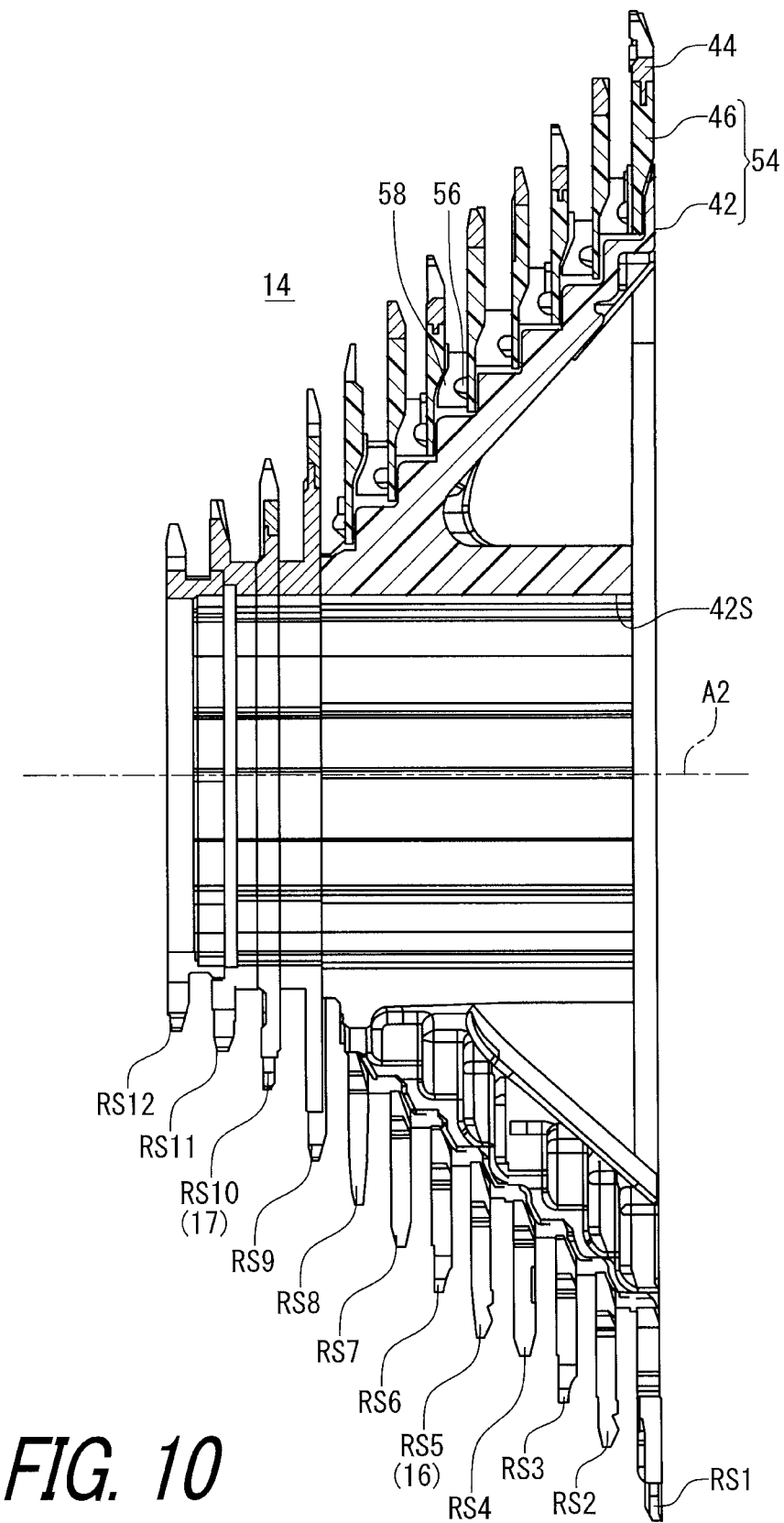
FIG. 10 is a cross-sectional view of the rear sprocket assembly taken along line X-X of FIG. 9.

As seen in FIG. 10, the rear sprocket assembly 14 includes a sprocket carrier 42. The sprockets RS1 to RS8 are attached to the sprocket carrier 42 to be coupled to the bicycle hub BH. Preferably, the sprocket carrier 42 is made of a non-metallic material. More preferably, the sprocket carrier 42 is made of a fiber reinforced plastic material. Further, the bicycle hub BH has a spline around its center axis, and the sprocket carrier 42 has a hub engagement profile (e.g. a spline) 42S to engage with the bicycle hub BH in a state where the rear sprocket assembly 14 is coupled to the bicycle 1. Each of the sprockets RS9 to RS12 has an individual hub engagement profile to engage with the bicycle hub BH. However, this is a mere example. At least one of the sprockets RS1 to RS8 can have an individual hub engagement profile to engage with the bicycle hub BH, and at least one the sprockets RS9 to RS12 may be attached to the sprocket carrier 42. Further, the rear sprocket assembly 14 may not include the sprocket carrier 42, and all the sprockets RS1 to RS12 can have an individual hub engagement profile to engage with the bicycle hub BH.

Figure 11:
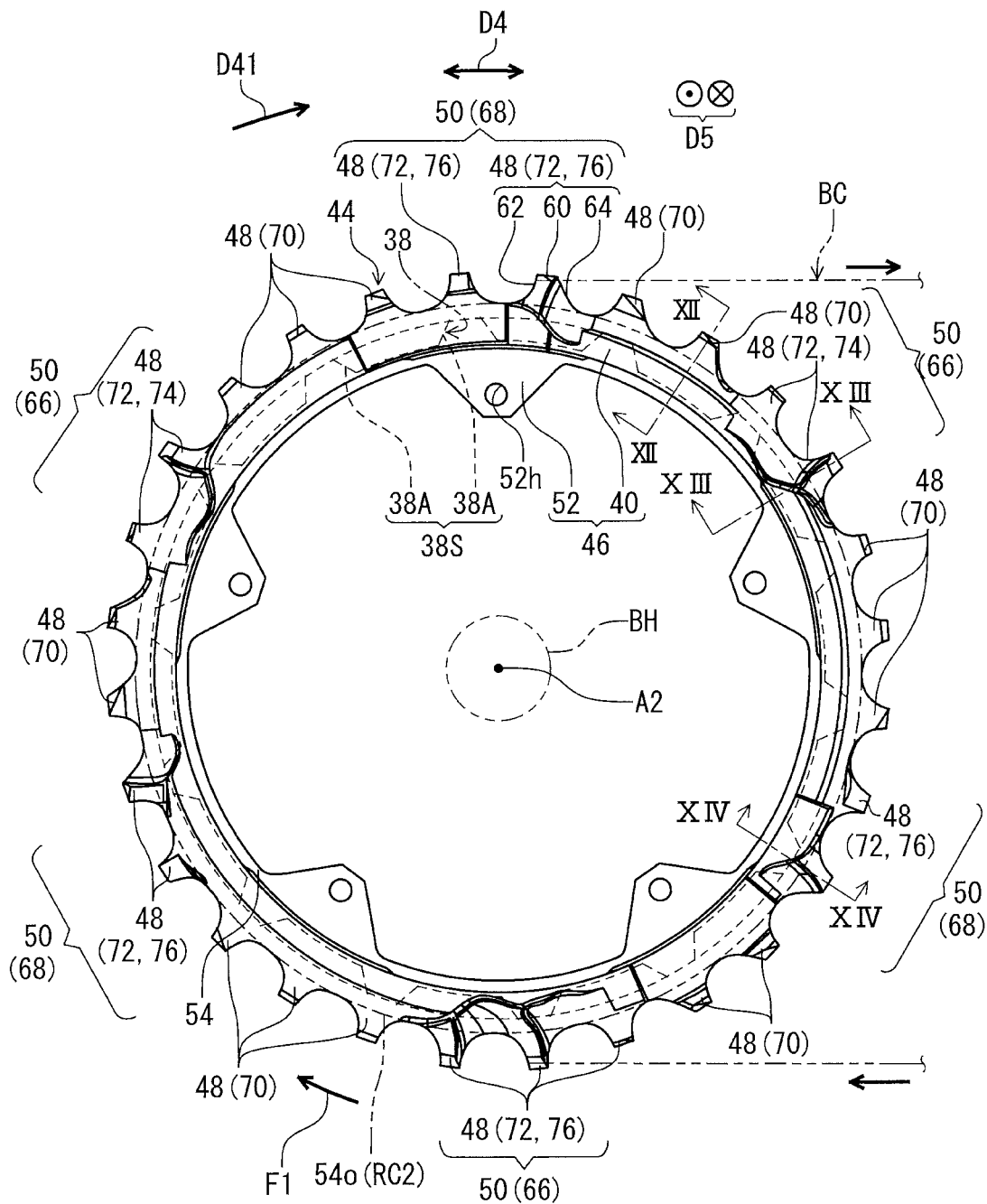
FIG. 11 is a side elevational view of another bicycle sprocket in accordance with the first embodiment.

FIG. 11 illustrates the bicycle sprocket RS5 as a bicycle sprocket 16. However, at least one of the other sprockets RS1 to RS4 and RS6 to RS8 may have substantially the same structure as the bicycle sprocket 16 for except an individual size and a total number of tooth. As seen in FIG. 11, the bicycle sprocket 16 comprises at least one chain engaging member 44 and at least one bicycle attachment member 46. The at least one chain engaging member 44 has substantially the same structure as the at least one chain engaging member 18 except for a shape of at least one sprocket tooth 48 and at least one shifting facilitation area 50. The at least one bicycle attachment member 46 has substantially the same structure as the at least one bicycle attachment member 20 except for the at least one shifting facilitation area 50 and a sprocket carrier attachment portion 52 in place of the crank attachment portion 26. Thus, elements in the at least one chain engaging member 44 and the at least one bicycle attachment member 46 having substantially the same function as those in at least one chain engaging member 18 and the at least one bicycle attachment member 20, respectively will be numbered the same here, and will not be described and/or illustrated again in detail here for the sake of brevity.

In the illustrated embodiment, the bicycle sprocket 16 includes one chain engaging member 44 and one bicycle attachment member 46. However, the illustrated one chain engaging member 44 may be divided into several pieces to constitute the at least one chain engaging member 44, and the illustrated one bicycle attachment member 46 may be divided into several pieces to constitute the at least one bicycle attachment member 46. Therefore, the at least one chain engaging member 44 has at least a part of an annular shape. In the illustrated embodiment, the at least one chain engaging member 44 has an annular shape. The bicycle sprocket 16 includes at least one sprocket tooth 48 and a sprocket body 54. The at least one sprocket tooth 48 of the bicycle sprocket 16 is circumferentially arranged on an outer periphery 54o of the sprocket body 54. The outer periphery 54o of the sprocket body 54 can be identical to a root circle RC2 of the at least one sprocket tooth 48. The sprocket body 54 has the sprocket carrier attachment portion 52 to which the sprocket carrier 42 is attached. Further, the at least one bicycle attachment member 46 has the sprocket carrier attachment portion 52 to which the sprocket carrier 42 is attached. In the illustrated embodiment, the sprocket carrier attachment portion 52 has an attachment hole 52h though which a protrusion 56 of the sprocket carrier 42 is inserted (See FIG. 10). A fastening member 58 is attached to the protrusion 56 and a part of the bicycle sprocket 16 to fasten the bicycle sprocket 16 to the sprocket carrier 42.

Each of the at least one sprocket tooth 48 includes a tooth tip 60, a driving surface 62, and a non-driving surface 64. The driving surface 62 is configured to contact the bicycle chain BC in a state where the bicycle chain BC engages with the bicycle sprocket 16. The non-driving surface 64 is a surface of each of the at least one sprocket tooth 48 other than the driving surface 62. The at least one chain engaging member 44 constitutes at least a part of the at least one sprocket tooth 48 of the bicycle sprocket 16. Specifically, the at least one chain engaging member 44 constitutes at least the tooth tip 60 and the driving surface 62 of the at least one sprocket tooth 48 of the bicycle sprocket 16. The at least one chain engaging member 44 is configured to contact the bicycle chain BC in a state where the bicycle chain BC engages with the bicycle sprocket 16. The at least one bicycle attachment member 46 constitutes at least a part of the sprocket body 54 of the bicycle sprocket 16 and is configured to be coupled to the bicycle 1. The at least one bicycle attachment member 46 is disposed radially inwardly from the tooth tip 60 of the at least one sprocket tooth 48 of the bicycle sprocket 16. In the illustrated embodiment, the at least one chain engaging member 44 further constitutes the non-driving surface 64 of the at least one sprocket tooth 48 of the bicycle sprocket 16. However, the at least one bicycle attachment member 46 may further constitute the non-driving surface 64 of the at least one sprocket tooth 48 of the bicycle sprocket 16.

As seen in FIG. 11, the bicycle sprocket 16 comprises the at least one shifting facilitation area 50 provided in the at least one chain engaging member 44 to facilitate a shifting operation of the bicycle chain BC. The at least one shifting facilitation area 50 includes at least one upshifting facilitation area 66. The at least one shifting facilitation area 50 includes at least one downshifting facilitation area 68. In this embodiment, an upshifting means the bicycle chain BC moves from a larger bicycle sprocket to a smaller bicycle sprocket and a downshifting means the bicycle chain BC moves from a smaller bicycle sprocket to a large bicycle sprocket. In the illustrated embodiment, the at least one shifting facilitation area 50 includes both of the at least one upshifting facilitation area 66 and the at least one downshifting facilitation area 68. In the illustrated embodiment, the bicycle sprocket 16 includes three upshifting facilitation areas 66 and three downshifting facilitation areas 68. However, either of the at least one upshifting facilitation area 66 and the at least one downshifting facilitation area 68 may be omitted in this embodiment. The at least one shifting facilitation area 50 extends between the at least one chain engaging member 44 and the at least one bicycle attachment member 46. Specifically, the at least one shifting facilitation area 50 is constituted by both the at least one chain engaging member 44 and the at least one bicycle attachment member 46.

In this embodiment, the at least one sprocket tooth 48 includes at least one regular tooth 70. Further, the at least one sprocket tooth 48 includes at least one facilitation tooth 72 in the at least one shifting facilitation area 50. Specifically, the bicycle sprocket 16 includes a plurality of sprocket teeth 48, and the plurality of the sprocket teeth 48 include a plurality of facilitation teeth 72. The plurality of facilitation teeth 72 includes at least one upshifting facilitation tooth 74 and at least one downshifting facilitation tooth 76. Preferably, the at least one upshifting facilitation tooth 74, at least one downshifting facilitation tooth 76, (the plurality of facilitation teeth 72) and the at least one regular tooth 70 are arranged in the circumferential direction D4 of the bicycle sprocket 16. The at least one facilitation tooth 72 facilitates upshifting. Specifically, the at least one upshifting facilitation tooth 74 facilitates upshifting. The at least one facilitation tooth 72 facilitates downshifting. Specifically, at least one downshifting facilitation tooth 76 facilitates downshifting.

Figure 12:
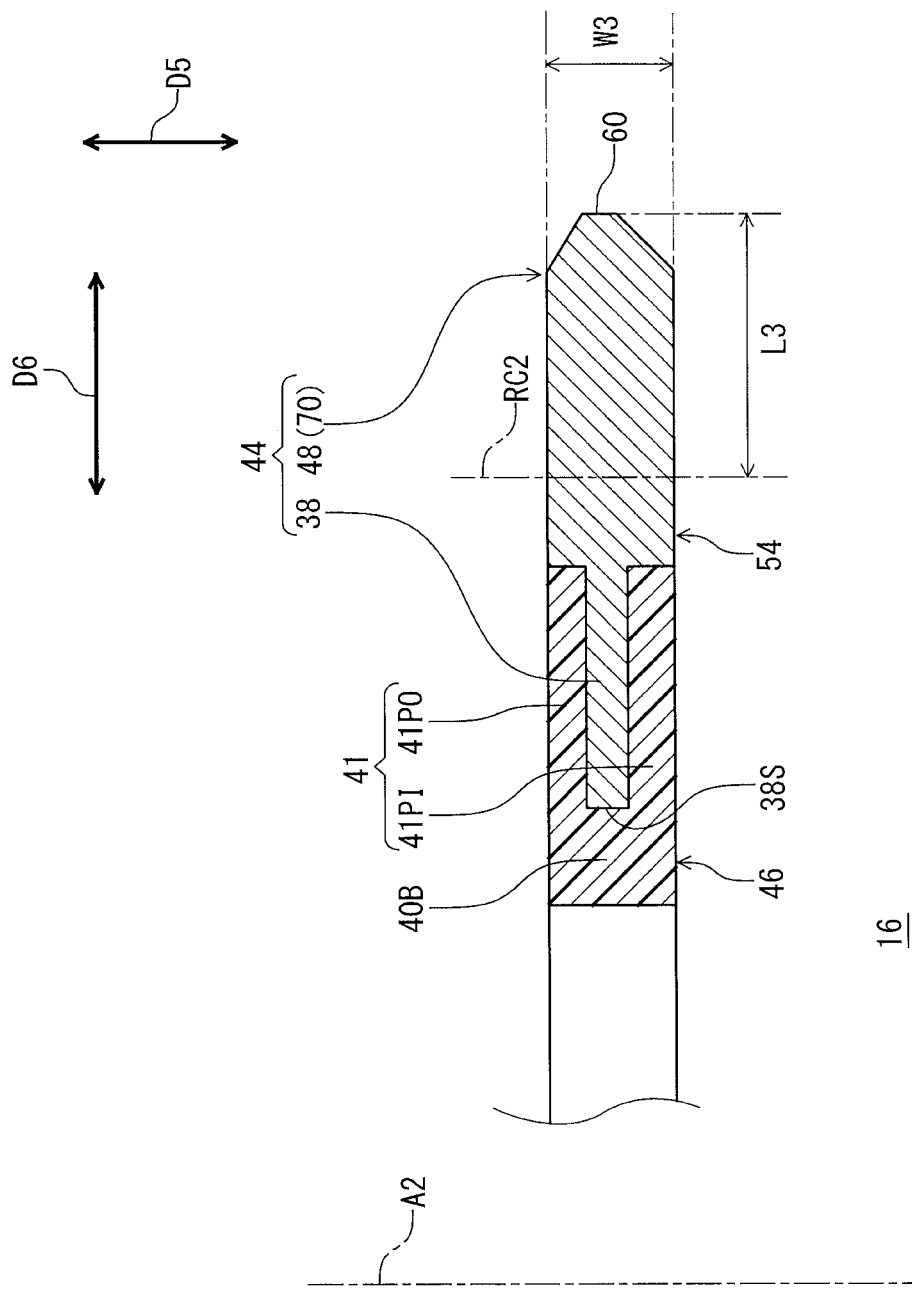
FIG. 12 is a cross-sectional view of the bicycle sprocket taken along line XII-XII of FIG. 11.
Figure 13:
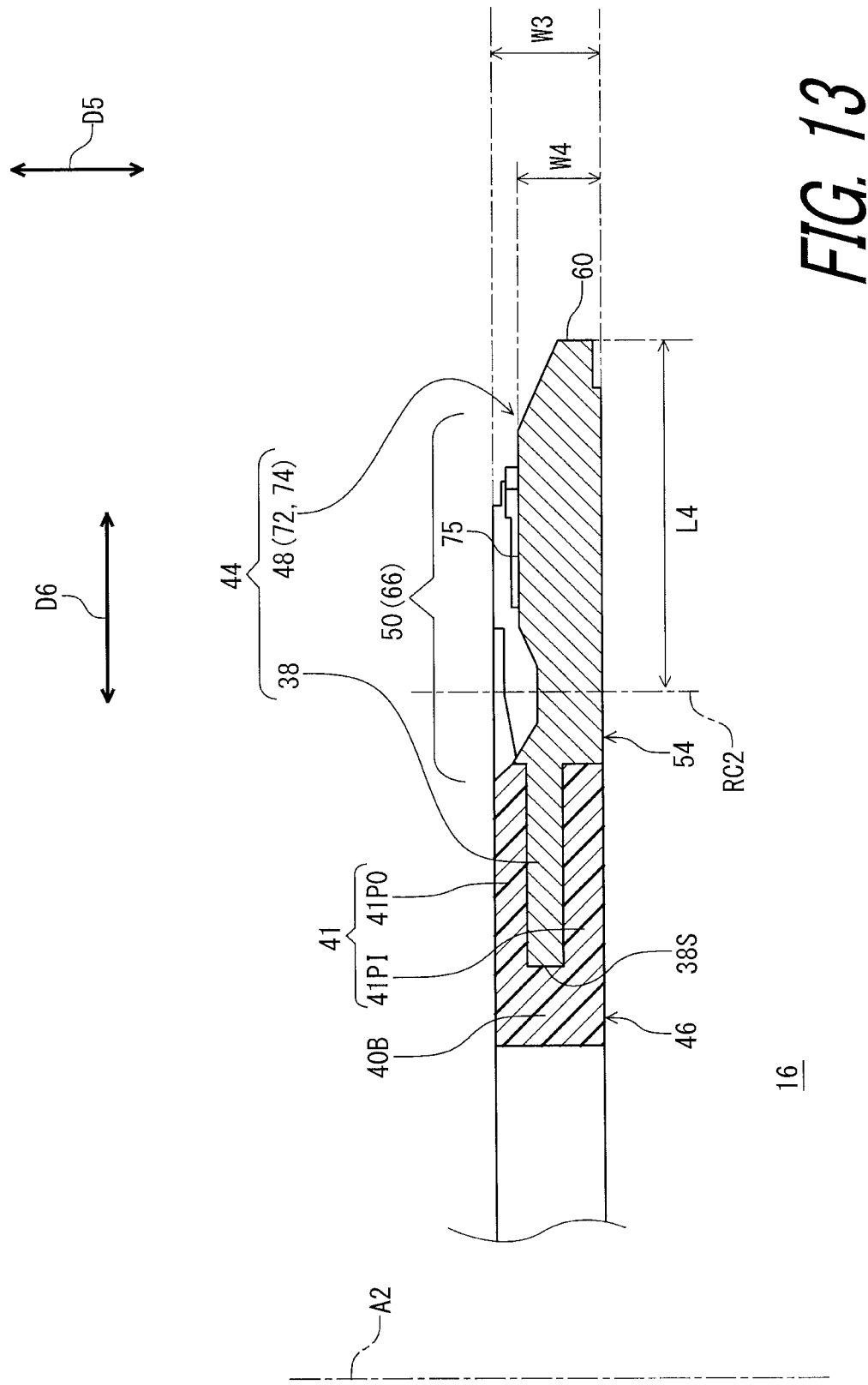
FIG. 13 is a cross-sectional view of the bicycle sprocket taken along line XIII-XIII of FIG. 11.
Figure 14:
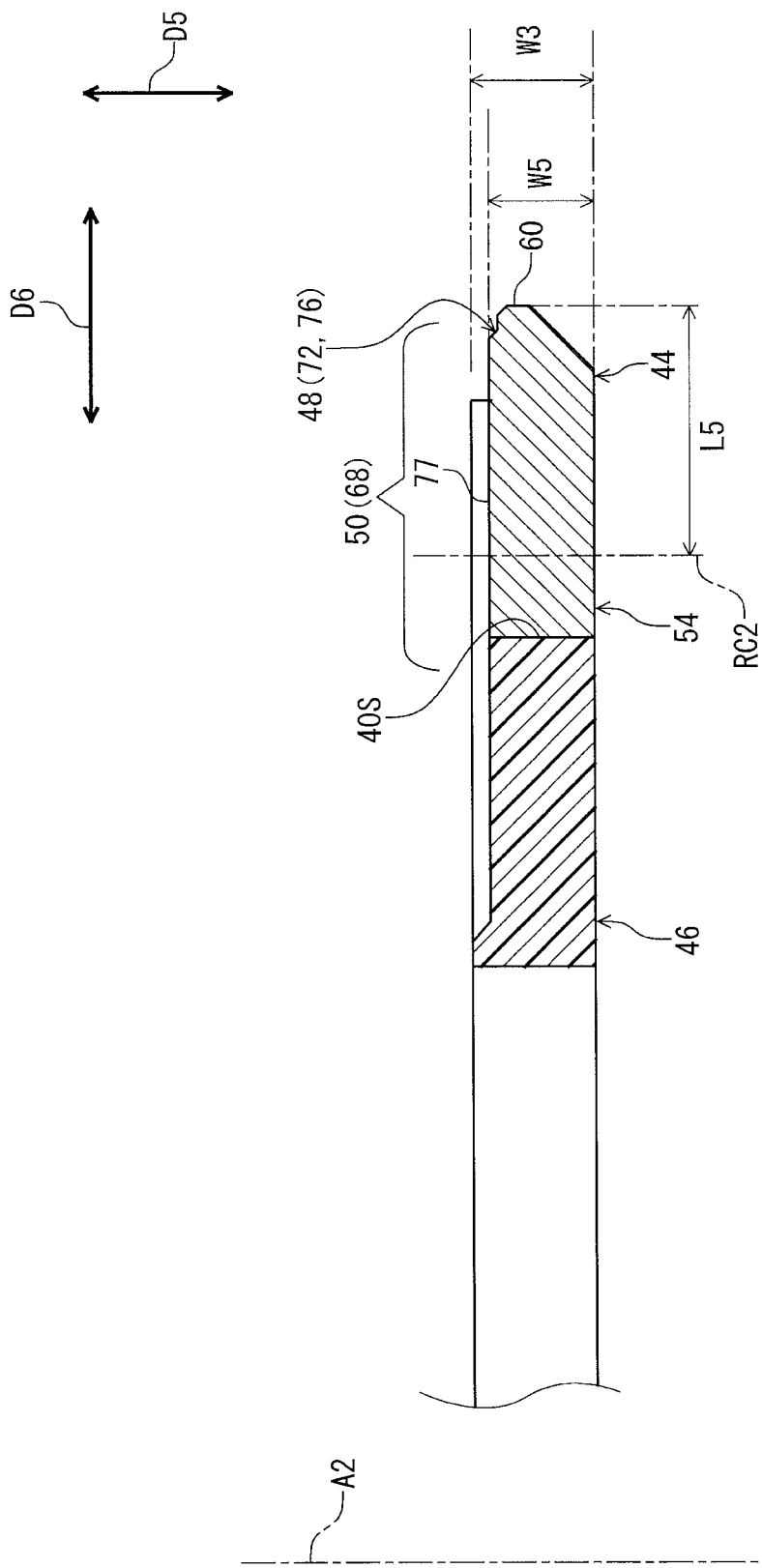
FIG. 14 is a cross-sectional view of the bicycle sprocket taken along line XIV-XIV of FIG. 11.

As seen in FIG. 12, the at least one regular tooth 70 has a third chain engaging width W3. As seen in FIG. 13, the at least one upshifting facilitation tooth 74 has a recess 75 in the axial direction D5 to facilitate the upshifting operation from the bicycle sprocket 16 to a smaller bicycle sprocket (e.g. RS6). The recess 75 is to avoid excessive interference with the bicycle chain BC so as to facilitate engagement of the bicycle chain BC with the at least one upshifting facilitation tooth 74 during upshifting operation. Accordingly, the at least one upshifting facilitation tooth 74 has a fourth chain engaging width W4 shorter than the third chain engaging width W3. Therefore, the at least one facilitation tooth 72 includes at least one axially recessed tooth 74 with respect to the rotational center axis A2 of the bicycle sprocket 16. In addition, as seen in FIG. 14, the at least one downshifting facilitation tooth 76 has a recess 77 in the axial direction D5 to facilitate the downshifting operation from the smaller bicycle sprocket (e.g. RS6) to the bicycle sprocket 16. The recess 77 is to guide the bicycle chain BC toward the bicycle sprocket 16 to facilitate engagement of the bicycle chain BC with one of sprocket teeth of the bicycle sprocket 16 during a downshifting operation. Accordingly, the at least one downshifting facilitation tooth 76 has a fifth chain engaging width W5 shorter than the third chain engaging width W3. Therefore, the at least one facilitation tooth 72 includes at least one axially recessed tooth 76 with respect to the rotational center axis A2 of the bicycle sprocket 16.

Further, as seen in FIG. 12, a radial tooth length L3 between the root circle RC2 and the tooth tip 60 of the at least one sprocket tooth 48 (the at least one regular tooth 70) in the radial direction D6 with respect to the rotational center axis A2 of the bicycle sprocket 16 is longer than an axial tooth length W3 of the at least one sprocket tooth 48 (the at least one regular tooth 70) in the axial direction D5 parallel to the rotational center axis A2 of the bicycle sprocket 16. As seen in FIG. 13, a radial tooth length L4 between the root circle RC2 and the tooth tip 60 of the at least one sprocket tooth 48 (the at least one facilitation tooth 72, the at least one upshifting facilitation tooth 74) in the radial direction D6 with respect to the rotational center axis A2 of the bicycle sprocket 16 is longer than an axial tooth length W4 of the at least one sprocket tooth 48 (the at least one facilitation tooth 72, the at least one upshifting facilitation tooth 74) in the axial direction D5 parallel to the rotational center axis A2 of the bicycle sprocket 16. As seen in FIG. 14, a radial tooth length L5 between the root circle RC2 and the tooth tip 60 of the at least one sprocket tooth 48 (the at least one facilitation tooth 72, the at least one downshifting facilitation tooth 76) in the radial direction D6 with respect to the rotational center axis A2 of the bicycle sprocket 16 is longer than an axial tooth length W5 of the at least one sprocket tooth 48 (the at least one facilitation tooth 72, the at least one downshifting facilitation tooth 76) in the axial direction D5 parallel to the rotational center axis A2 of the bicycle sprocket 16.

As seen in FIGS. 11 to 13, the at least one chain engaging member 44 has the first torque transmitting profile 38 which is described above. In the illustrated embodiment, the chain engaging member 44 has a plurality of the first torque transmitting profiles 38, but the chain engaging member 18 can have only one first torque transmitting profile 38. When the illustrated one chain engaging member 44 is divided into several pieces to constitute the at least one chain engaging member 44, at least one of the several pieces can have an individual first torque transmitting profile 38.

As seen in FIGS. 11 to 14, the at least one bicycle attachment member 46 has the second torque transmitting profile 40 to engage with the first torque transmitting profile 38. When the illustrated one bicycle attachment member 46 is divided into several pieces to constitute the at least one bicycle attachment member 46, at least one of the several pieces can have an individual second torque transmitting profile 40. Features of the first torque transmitting profile 38, the second torque transmitting profile 40 and the clamping profile 41 and a manufacturing method of the at least one bicycle attachment member 46 are same as those of the bicycle sprocket 12. Specifically, as seen in FIG. 11, the first torque transmitting profile 38 does not overlap with the second torque transmitting profile 40 as viewed in the axial direction D5 parallel to the rotational center axis A2 of the bicycle sprocket 16. The first torque transmitting profile 38 has a first surface 38A non-parallel to a rotational direction D41 of the bicycle sprocket 16 around the rotational center axis A2. As seen in FIGS. 12 to 14, the first torque transmitting profile 38 includes the first spline 38S along the rotational center axis A2. As with the second torque transmitting profile 40 of the bicycle sprocket 12, the second torque transmitting profile 40 includes a second spline 40S along the rotational center axis A2.

Further, as seen in FIGS. 12 to 14, the at least one chain engaging member 44 is made of the first material that the at least one chain engaging member 18 is made of. The at least one bicycle attachment member 46 is made of the second material that the at least one bicycle attachment member 20 is made of.

Figure 15:
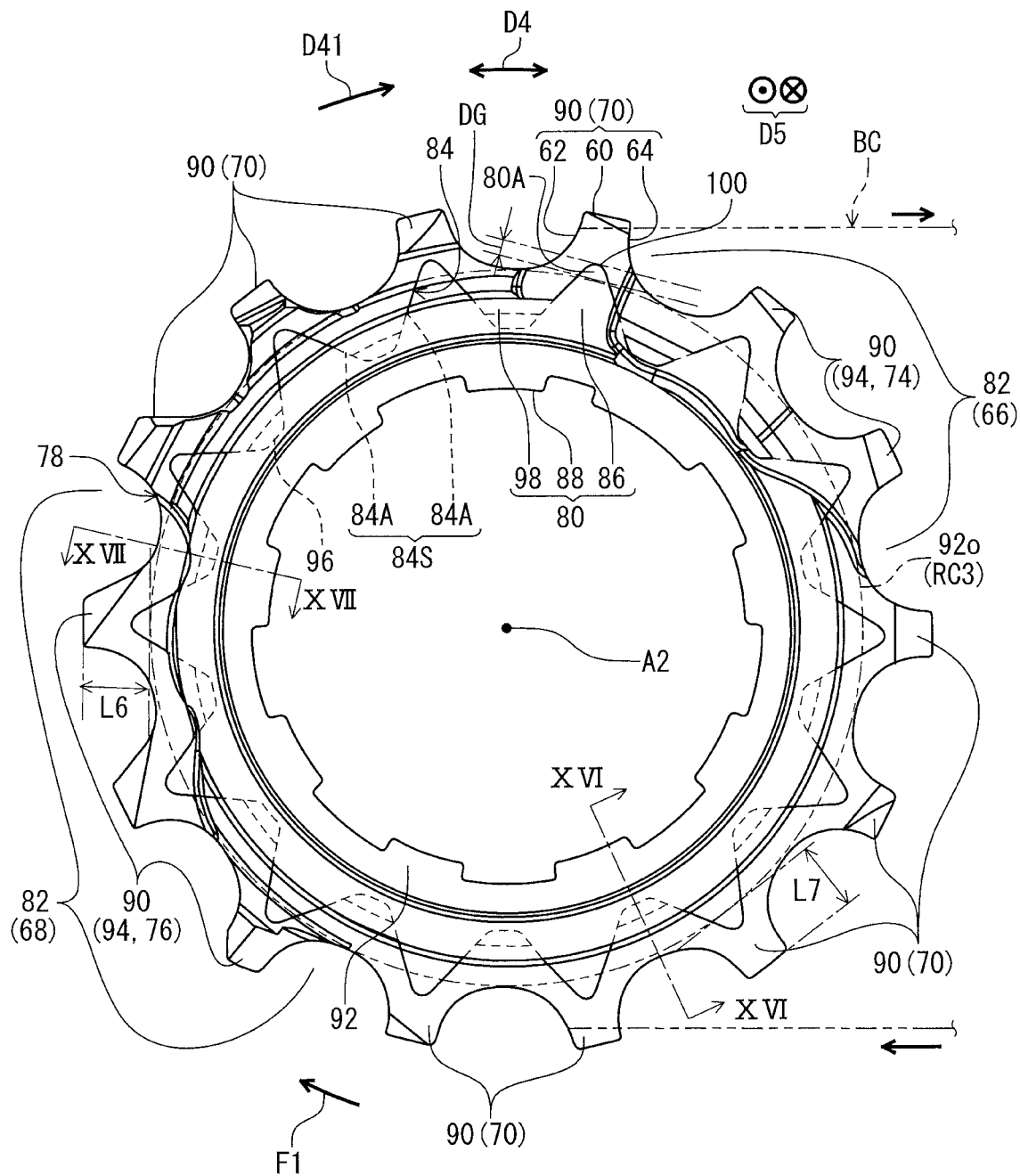
FIG. 15 is a side elevational view of still another bicycle sprocket in accordance with the first embodiment.

FIG. 15 illustrates the bicycle sprocket RS10 as a bicycle sprocket 17. However, at least one of the other sprockets RS9, RS11, and RS12 may have substantially the same structure as the bicycle sprocket 17 except an individual size and a total number of tooth. As seen in FIG. 15, the bicycle sprocket 17 comprises at least one chain engaging member 78 and at least one bicycle attachment member 80. The at least one chain engaging member 78 has substantially the same structure as the at least one chain engaging member 44 except at least one shifting facilitation area 82 and a first torque transmitting profile 84. The at least one bicycle attachment member 80 has substantially the same structure as the at least one bicycle attachment member 46 except the at least one shifting facilitation area 82, a second torque transmitting profile 86, and a hub engagement profile 88. Thus, elements in the at least one chain engaging member 78 and the at least one bicycle attachment member 80 having substantially the same functions as those in at least one chain engaging member 44 and the at least one bicycle attachment member 46, respectively will be numbered the same here, and will not be described and/or illustrated again in detail here for the sake of brevity.

In the illustrated embodiment, the bicycle sprocket 17 includes one chain engaging member 78 and one bicycle attachment member 80. However, the illustrated one chain engaging member 78 may be divided into several pieces to constitute the at least one chain engaging member 78, and the illustrated one bicycle attachment member 80 may be divided into several pieces to constitute the at least one bicycle attachment member 80. Therefore, the at least one chain engaging member 78 has at least a part of an annular shape. In the illustrated embodiment, the at least one chain engaging member 78 has an annular shape. Similarly, the at least one bicycle attachment member 80 has at least a part of an annular shape. In the illustrated embodiment, the at least one bicycle attachment member 80 has an annular shape. The bicycle sprocket 17 includes at least one sprocket tooth 90 and a sprocket body 92. The at least one sprocket tooth 90 of the bicycle sprocket 17 is circumferentially arranged on an outer periphery 92o of the sprocket body 92. The outer periphery 92o of the sprocket body 92 can be identical to a root circle RC3 of the at least one sprocket tooth 90.

As with the at least one sprocket tooth 48 of the bicycle sprocket 16, each of the at least one sprocket tooth 90 has same elements as the tooth tip 60, the driving surface 62, and the non-driving surface 64. The at least one chain engaging member 78 constitutes at least a part of the at least one sprocket tooth 90 of the bicycle sprocket 17. Specifically, the at least one chain engaging member 78 constitutes the at least the tooth tip 60 and the driving surface 62 of the at least one sprocket tooth 90 of the bicycle sprocket 17. The at least one chain engaging member 78 is configured to contact the bicycle chain BC in a state where the bicycle chain BC engages with the bicycle sprocket 17.

The at least one bicycle attachment member 80 constitutes at least a part of the sprocket body 92 of the bicycle sprocket 17 and is configured to be coupled to the bicycle 1. The at least one bicycle attachment member 80 is disposed radially inwardly from the tooth tip 60 of the at least one sprocket tooth 90 of the bicycle sprocket 17. In the illustrated embodiment, the at least one chain engaging member 78 further constitutes the non-driving surface 64 of the at least one sprocket tooth 90 of the bicycle sprocket 17. However, the at least one bicycle attachment member 80 may further constitute the non-driving surface 64 of the at least one sprocket tooth 90 of the bicycle sprocket 17. As seen in FIG. 15, the sprocket body 92 has a hub engagement profile 88 to which the bicycle hub BH is attached. That is, the at least one bicycle attachment member 80 has the hub engagement profile 88 to engage with the bicycle hub BH. In the illustrated embodiment, the hub engagement profile 88 has a spline to engage with the spline of the bicycle hub BH.

As seen in FIG. 15, the bicycle sprocket 17 comprises the at least one shifting facilitation area 82 provided in the at least one chain engaging member 78 to facilitate a shifting operation of the bicycle chain BC. The at least one shifting facilitation area 82 includes the at least one upshifting facilitation area 66. The at least one shifting facilitation area 82 includes at least one downshifting facilitation area 68. In the illustrated embodiment, the at least one shifting facilitation area 82 includes both of the at least one upshifting facilitation area 66 and the at least one downshifting facilitation area 68. The at least one shifting facilitation area 82 extends between the at least one chain engaging member 78 and the at least one bicycle attachment member 80, Specifically, the at least one shifting facilitation area 82 is constituted by both the at least one chain engaging member 78 and the at least one bicycle attachment member 80.

In this embodiment, the at least one sprocket tooth 90 includes at least one regular tooth 70. Further, the at least one sprocket tooth 90 includes at least one facilitation tooth 94 in the at least one shifting facilitation area 82. Specifically, the bicycle sprocket 17 includes a plurality of sprocket teeth 90, and the plurality of the sprocket teeth 90 include a plurality of facilitation teeth 94. The plurality of facilitation teeth 94 includes at least one upshifting facilitation tooth 74 and at least one downshifting facilitation tooth 76. Preferably, the at least one upshifting facilitation tooth 74, the at least one downshifting facilitation tooth 76 (the plurality of facilitation teeth 94) and the at least one regular tooth 70 are arranged in the circumferential direction D4 of the bicycle sprocket 17. The at least one facilitation tooth 94 facilitates upshifting. Specifically, the at least one upshifting facilitation tooth 74 facilitates upshifting. The at least one facilitation tooth 94 facilitates downshifting. Specifically, the at least one downshifting facilitation tooth 76 facilitates downshifting.

Figure 16:
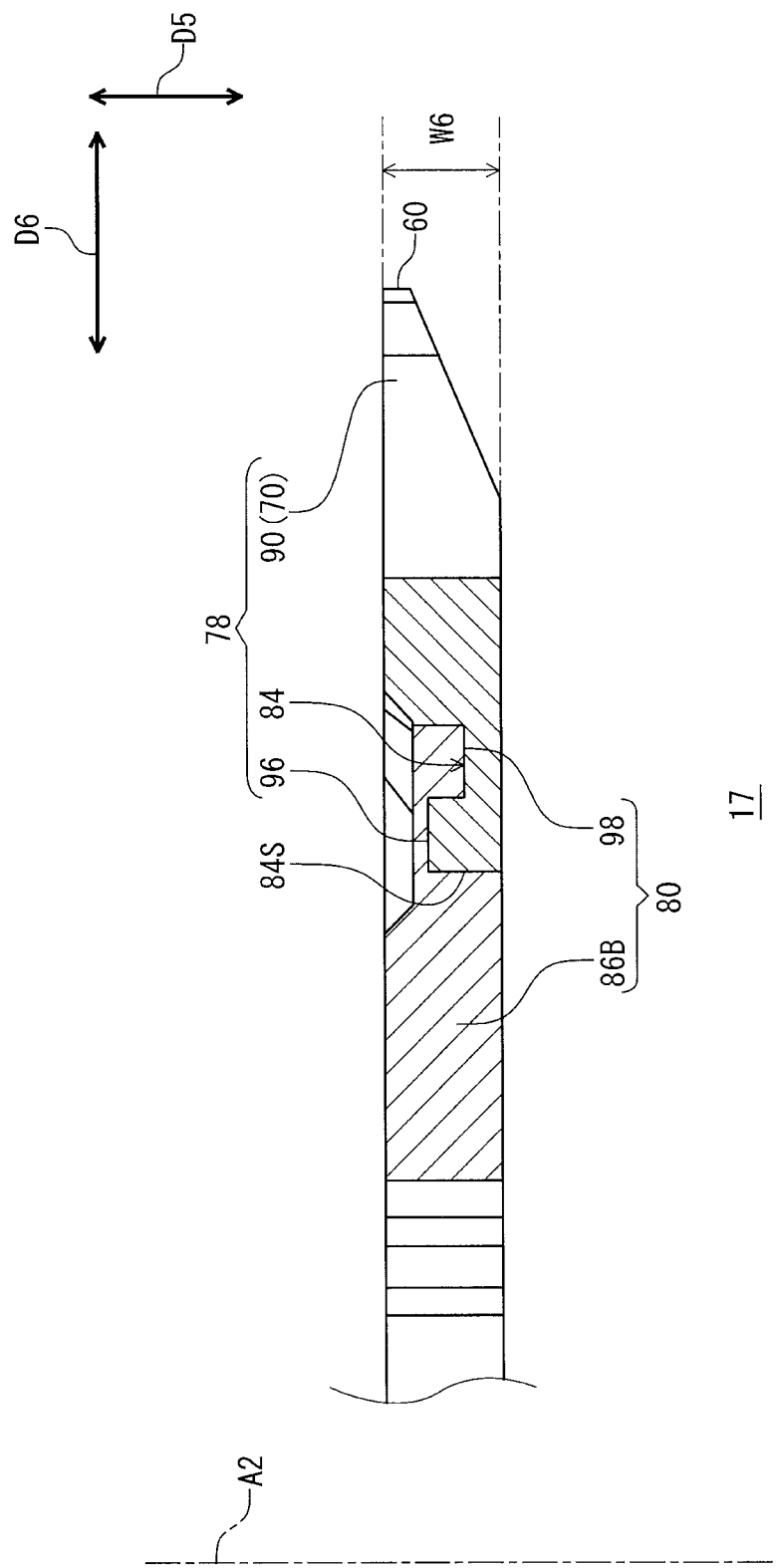
FIG. 16 is a cross-sectional view of the bicycle sprocket taken along line XVI-XVI of FIG. 15.
Figure 17:
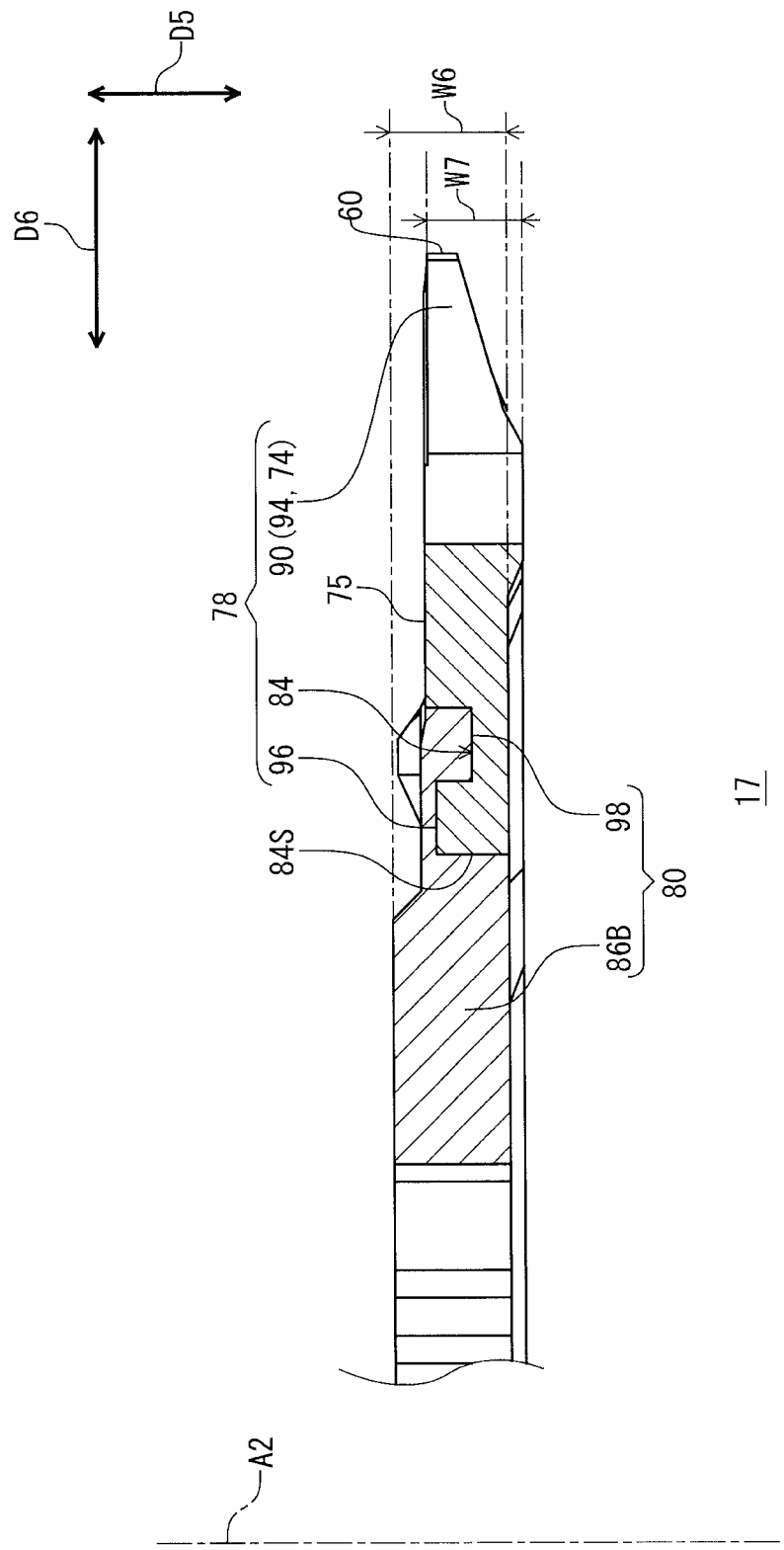
FIG. 17 is a cross-sectional view of the bicycle sprocket taken along line XVII-XVII of FIG. 15.

As seen in FIG. 16, the at least one regular tooth 70 has a sixth chain engaging width W6. As seen in FIG. 17, the at least one upshifting facilitation tooth 74 has the recess 75 in the axial direction D5. Accordingly, the at least one upshifting facilitation tooth 74 has a seventh chain engaging width W7 shorter than the sixth chain engaging width W6. Therefore, the at least one facilitation tooth 94 includes the at least one axially recessed tooth 74 with respect to the rotational center axis A2 of the bicycle sprocket 17.

Further, as seen in FIGS. 15 and 16, a radial tooth length L6 between the root circle RC3 and the tooth tip 60 of the at least one sprocket tooth 90 (the at least one regular tooth 70) in the radial direction D6 with respect to the rotational center axis A2 of the bicycle sprocket 17 is longer than an axial tooth length W6 of the at least one sprocket tooth 90 (the at least one regular tooth 70) in the axial direction D5 parallel to the rotational center axis A2 of the bicycle sprocket 17. As seen in FIGS. 15 and 17, a radial tooth length L7 between the root circle RC3 and the tooth tip 60 of the at least one sprocket tooth 90 (the at least one facilitation tooth 94, the at least one upshifting facilitation tooth 74) in the radial direction D6 with respect to the rotational center axis A2 of the bicycle sprocket 17 is longer than an axial tooth length W7 of the at least one sprocket tooth 90 (the at least one facilitation tooth 94, the at least one upshifting facilitation tooth 74) in the axial direction D5 parallel to the rotational center axis A2 of the bicycle sprocket 17.

Figure 18:
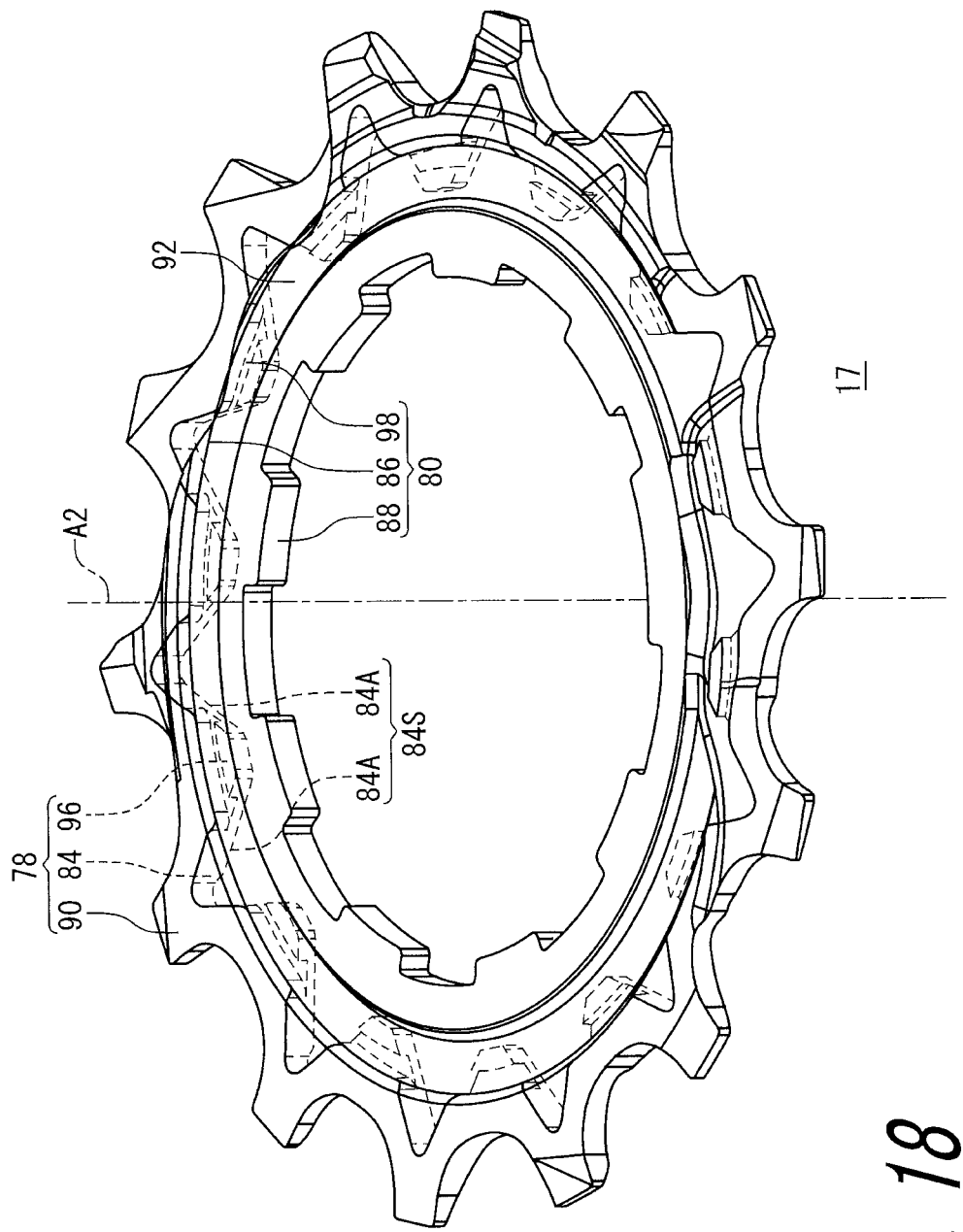
FIG. 18 is a perspective view of the still another bicycle sprocket illustrated in FIG. 15.

As seen in FIG. 18, the at least one chain engaging member 78 has the first torque transmitting profile 84. In the illustrated embodiment, the chain engaging member 78 has a plurality of first torque transmitting profiles 84, but the chain engaging member 78 can have only one first torque transmitting profile 84. When the illustrated one chain engaging member 78 is divided into several pieces to constitute the at least one chain engaging member 78, at least one of the several pieces can have an individual first torque transmitting profile 84.

Figure 19:
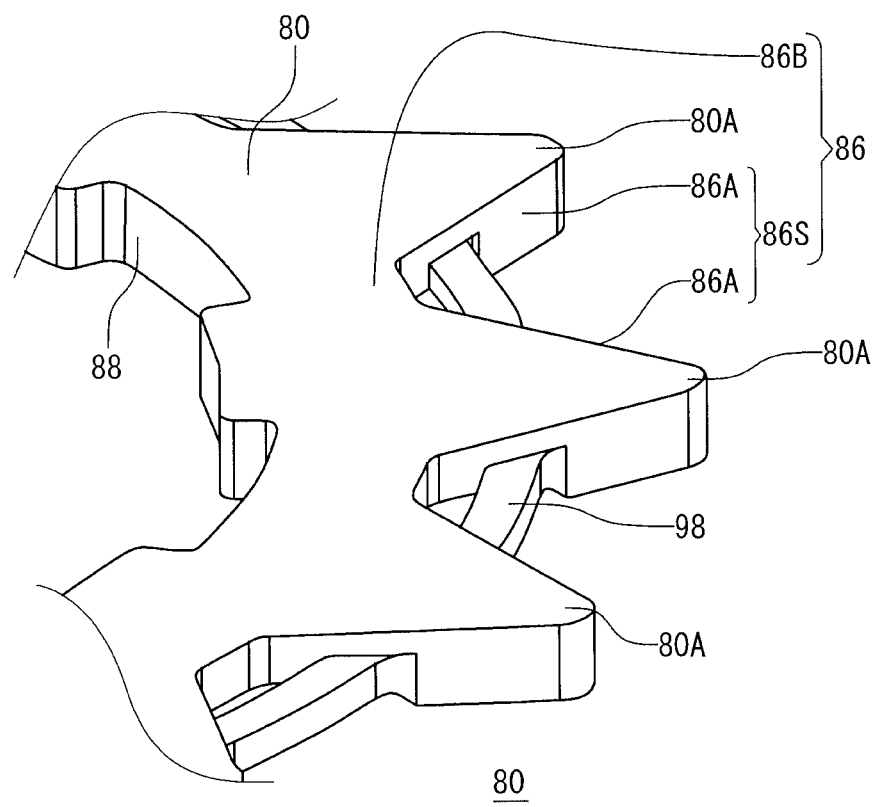
FIG. 19 is a partial perspective view of the bicycle attachment member illustrated in FIG. 15 viewed in an opposite direction to a direction to which the still another bicycle sprocket in FIG. 18 is viewed.

As seen in FIGS. 18 and 19, the at least one bicycle attachment member 80 has the second torque transmitting profile 86 to engage with the first torque transmitting profile 84. In the illustrated embodiment, the bicycle attachment member 80 has a plurality of second torque transmitting profiles 86, but the bicycle attachment member 80 can have only one second torque transmitting profile 86. When the illustrated one bicycle attachment member 80 is divided into several pieces to constitute the at least one bicycle attachment member 80, at least one of the several pieces can have an individual second torque transmitting profile 86.

As seen in FIG. 15, the first torque transmitting profile 84 does not overlap with the second torque transmitting profile 86 as viewed in the axial direction D5 parallel to the rotational center axis A2 of the bicycle sprocket 17. The first torque transmitting profile 84 has a first surface 84A non-parallel to a rotational direction D41 of the bicycle sprocket 17 around the rotational center axis A2.

As seen in FIGS. 16 to 18, the first torque transmitting profile 84 includes a first spline 84S along the rotational center axis A2. The first spline 84S includes the first surfaces 84A. The first surfaces 84A are different from the first surfaces 38A of the bicycle sprockets 12 and 16 in that the first surfaces 84A extend outwardly from the root circle RC3 of the at least one sprocket tooth 90 viewed in the axial direction D5.

As seen in FIGS. 15 and 19, the second torque transmitting profile 86 includes a second spline 86S along the rotational center axis A2. The second spline 86S is configured to engage with the first spline 84S. The second spline 86S includes second surfaces 86A to contact the first surfaces 84A. The second surfaces 86A are non-parallel to the rotational direction D41 of the bicycle sprocket 17 around the rotational center axis A2. That is, the second torque transmitting profile 86 has a second surface 86A non-parallel to the rotational direction D41 of the bicycle sprocket 17 around the rotational center axis A2. As seen in FIGS. 18 and 19, the second torque transmitting profile 86 includes an inner base 86B. The second surfaces 86A extend radially outwardly from the inner base 86B. The second surfaces 86A are different from the second surfaces 40A of the bicycle sprockets 12 and 16 in that the second surfaces 86A extend outwardly from the root circle RC3 of the at least one sprocket tooth 90 viewed in the axial direction D5 in a state where the at least one chain engaging member 78 is secured with the at least one bicycle attachment member 80.

As seen in FIG. 15, the at least one bicycle attachment member 80 partly extends radially outwardly from the root circle RC3 of the at least one sprocket tooth 90. For convenience of explanation, a part of the at least one bicycle attachment member 80 which extends radially outwardly from the root circle RC3 of the at least one sprocket tooth 90 is referred to as a radial extension 80A. The at least one bicycle attachment member 80 has a tip end 100. The tip end 100 is a farthest point of the radial extension 80A from the rotational center axis A2 of the bicycle sprocket 17 viewed in the axial direction D5. The tip end 100 is disposed radially outwardly from the root circle RC3 of the sprocket teeth 90 by a distance DG that is equal to or larger than 0.1 mm. Preferably, the tip end 100 is disposed radially outwardly from the root circle RC3 of the sprocket teeth 90 by the distance DG that is equal to or larger than 1.1 mm.

As seen in FIGS. 15 to 18, the at least one chain engaging member 78 includes a first axial engagement profile 96. As seen in FIGS. 15 to 19, the at least one bicycle attachment member 80 includes a second axial engagement profile 98 to engage with the first axial engagement profile 96 in the axial direction D5 of the bicycle sprocket 17. Therefore, the at least one chain engaging member 78 is secured with the at least one bicycle attachment member 80 in the radial direction D6 and the circumferential direction D4 of the bicycle sprocket 17.

As seen in FIGS. 16 and 17, the at least one chain engaging member 78 is made of a first material. The at least one bicycle attachment member 80 is made of a second material that is different from the first material. Preferably, the first material includes a metallic material, and the second material includes a non-metallic material. However, the second material can include a metallic material. In this case, the first material can include a first metallic material, and the second material can include a second metallic material that is different from the first metallic material. That is, the at least one chain engaging member 78 is made of a first metallic material, and the at least one bicycle attachment member 80 is made of a second metallic material.

Preferably, the second material has a second specific gravity smaller than a first specific gravity that the first material has. More preferably, the first material has a first abrasion resistance larger than a second abrasion resistance that the second material has. Even more preferably, the first material has a first rigidity larger than a second rigidity that the second material has. Therefore, preferably, the first material includes at least one of stainless steel, titanium, and aluminum. Further, the second material includes at least one of titanium, aluminum, and resin. If the second material includes resin, preferably, the second material includes a fiber reinforced plastic material. If the second material includes a metallic material, the first material and the second material can include same kinds of material components and can have different metallic compositions. For example, the first material can be a first aluminum alloy which is 7000 series aluminum alloy. The second material can be a second aluminum alloy which is 6000 series aluminum alloy. Both the first aluminum alloy and the second aluminum alloy have comparatively high rigidity as compared to other aluminum alloys. The first aluminum alloy has a higher rigidity than the second aluminum alloy has. However, the second aluminum alloy is lighter than the first aluminum alloy. When the bicycle sprocket 17 is manufactured, the at least one chain engaging member 78 and the at least one bicycle attachment member 80 are bonded. Alternatively, if the second material includes resin, the at least one bicycle attachment member 80 is made by hot-pressing prepreg sheets which are piled on the at least one chain engaging member 78.

With the bicycle sprocket 16, it is possible to provide a lightweight bicycle sprocket which facilitates the shifting operation, because the bicycle sprocket 16 comprises at least one chain engaging member 44, at least one bicycle attachment member 46, and at least one shifting facilitation area 50. With the bicycle sprockets 12 and 16, it is possible to provide a lightweight bicycle sprocket, because the bicycle sprocket 16 comprises at least one chain engaging member 44 made of a metallic material and at least one bicycle attachment member 46 made of a non-metallic material. With the bicycle sprocket 17, in addition to the features of the bicycle sprockets 12 and 16, it is possible to securely transmit driving torque from or to the bicycle chain, because the at least one bicycle attachment member 80 partly extends radially outwardly from the root circle RC3 of the at least one sprocket tooth 90.

Modification of First Embodiment

As described above, the first material includes a metallic material. However, the first material can include a first non-metallic material. For example, the first material can be a carbon-fiber-reinforced plastic (CFRP) in which carbon fibers are woven into an epoxy resin. In this case, the second material can include a second non-metallic material that is different from the first non-metallic material. For example, the second material can be an epoxy resin. Alternatively, the first material and the second material can have different resin compositions. For example, the first material can be a carbon-fiber-reinforced plastic (CFRP) in which carbon fibers are woven into an epoxy resin. The second material can be a nylon resin. The nylon resin can be used in injection molding, thereby at least one bicycle attachment members 20, 46 and 80 can be flexibly molded into various shapes using the nylon resin.

Further, the bicycle attachment members 20 and 46 may further include the radial extension 80A. In this case, the chain engaging member 18 and 44 may have shapes corresponding to shapes of the bicycle attachment members 20 and 46.

Second Embodiment

Figure 20:
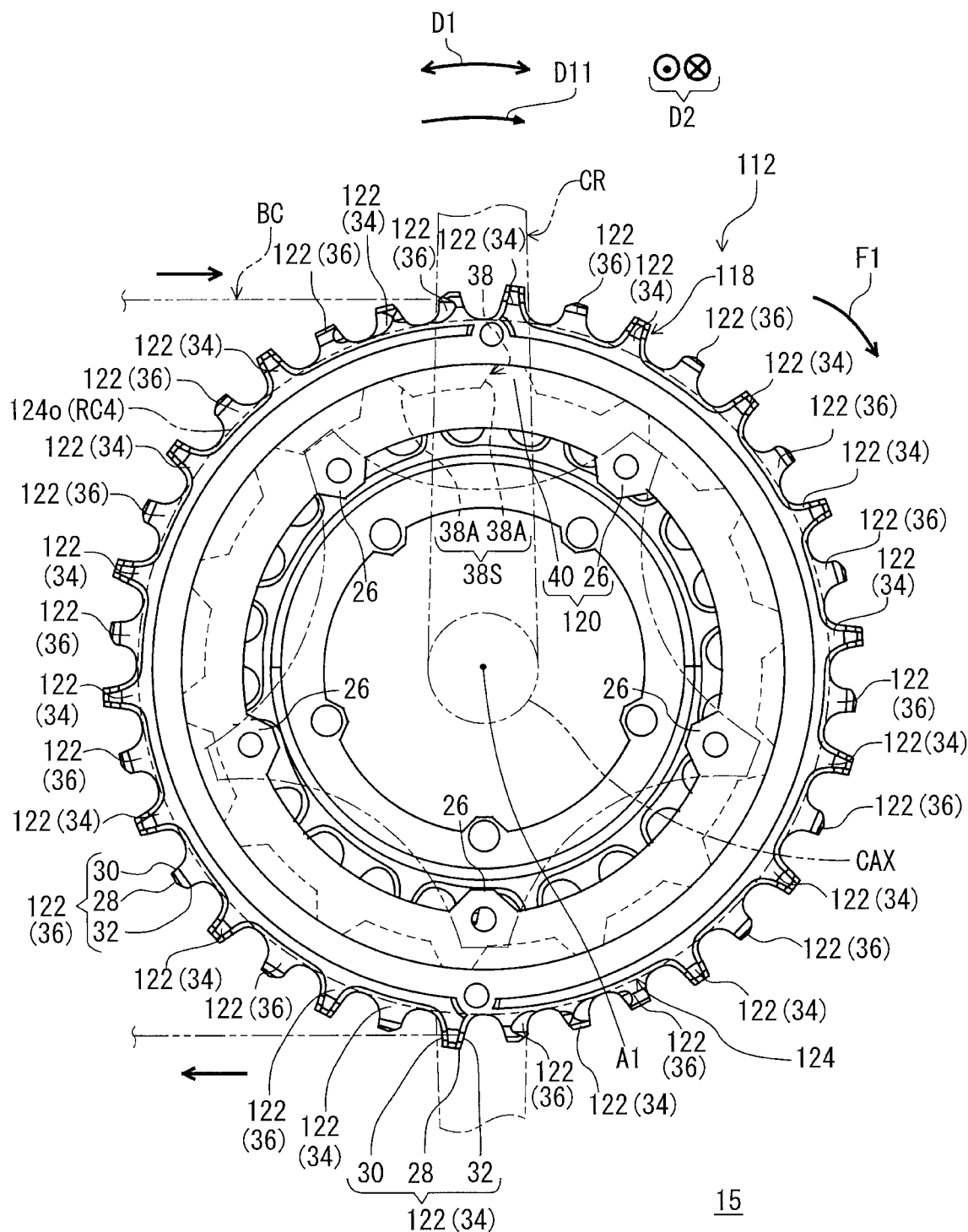
FIG. 20 is a side elevational view of a bicycle sprocket assembly in accordance with a second embodiment.
Figure 21:
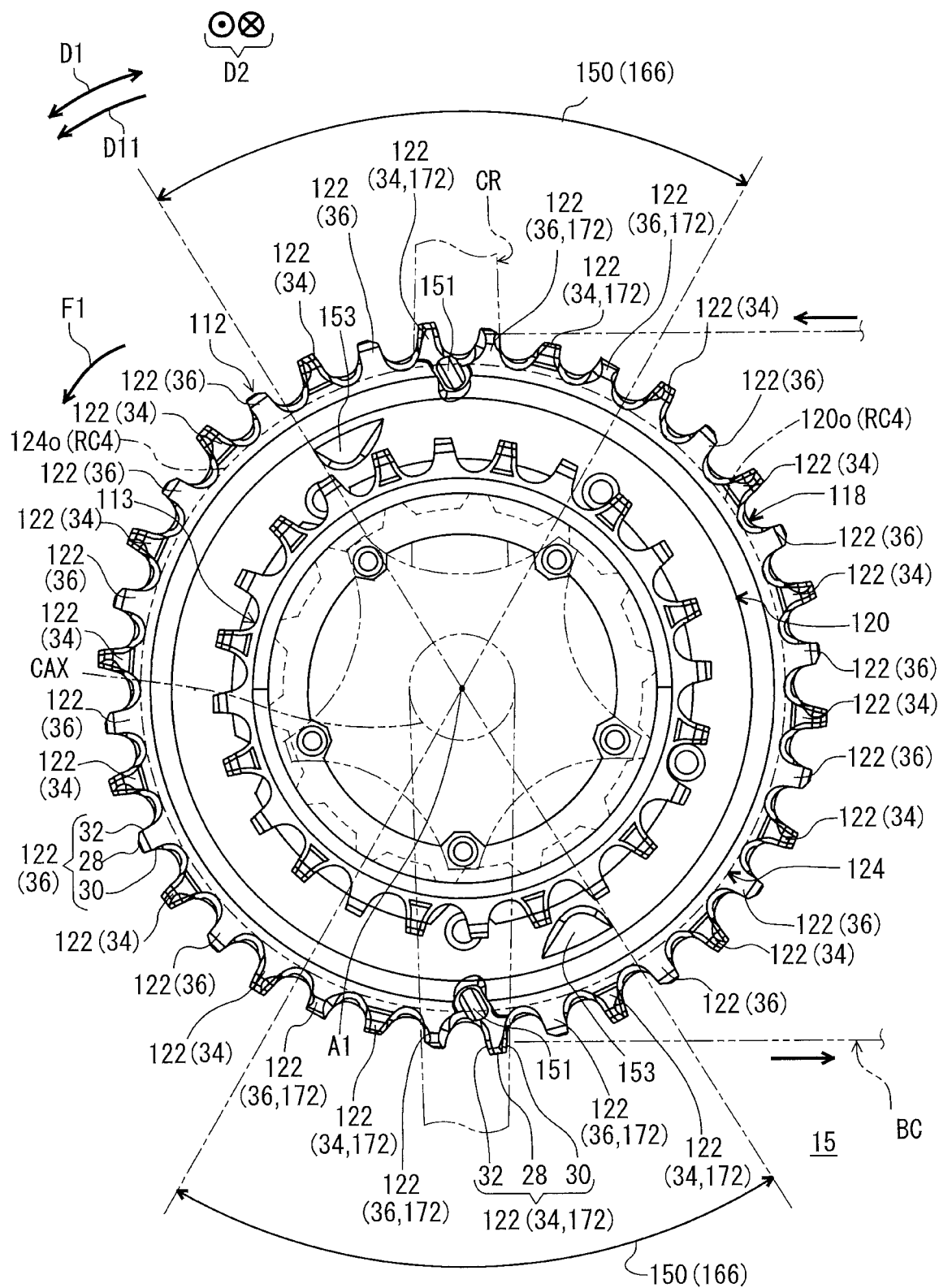
FIG. 21 is another side elevational view of a bicycle sprocket assembly illustrated in FIG. 20.

A sprocket assembly 15 in accordance with a second embodiment will be described below referring to FIGS. 20 and 21. The sprocket assembly 15 is one example of the front sprocket assembly FSA in the first embodiment. As seen in FIGS. 20 and 21, the sprocket assembly 15 comprises a bicycle sprocket 112 and a bicycle sprocket 113. The bicycle sprocket 113 has the same configuration as the bicycle sprocket 112 except for its size and a total number of sprocket teeth. Therefore, explanation of the structure of the bicycle sprocket 113 is omitted. The bicycle sprocket 112 has the same configuration as the bicycle sprocket 12 except for at least one shifting facilitation area 150. Thus, elements having substantially the same function as those in the first embodiment will be numbered the same here, and will not be described and/or illustrated again in detail here for the sake of brevity.

As seen in FIGS. 20 and 21, the bicycle sprocket 112 comprises at least one chain engaging member 118 and at least one bicycle attachment member 120. In the illustrated embodiment, the bicycle sprocket 112 includes one chain engaging member 118 and one bicycle attachment member 120. However, the illustrated one chain engaging member 118 may be divided into several pieces to constitute the at least one chain engaging member 118, and the illustrated one bicycle attachment member 120 may be divided into several pieces to constitute the at least one bicycle attachment member 120. Therefore, the at least one chain engaging member 118 has at least a part of an annular shape. In the illustrated embodiment, the at least one chain engaging member 118 has an annular shape. The bicycle sprocket 112 includes at least one sprocket tooth 122 and a sprocket body 124. The at least one sprocket tooth 122 of the bicycle sprocket 112 is circumferentially arranged on an outer periphery 124o of the sprocket body 124. The outer periphery 124o of the sprocket body 124 can be identical to a root circle RC4 of the at least one sprocket tooth 122. The sprocket body 124 has the crank attachment portion 26 to which the bicycle crank CR is attached. Specifically, the at least one bicycle attachment member 120 has the crank attachment portion 26 to which the bicycle crank CR is attached. In this embodiment, the at least one chain engaging member 118 is made of the first material that the at least one chain engaging member 18 is made of. The at least one bicycle attachment member 120 is made of the second material that the at least one bicycle attachment member 20 is made of.

Each of the at least one sprocket tooth 122 includes the tooth tip 28, the driving surface 30, and the non-driving surface 32. The at least one chain engaging member 118 constitutes at least a part of the at least one sprocket tooth 122 of the bicycle sprocket 112. Specifically, the at least one chain engaging member 118 constitutes at least the tooth tip 28 and the driving surface 30 of the at least one sprocket tooth 122 of the bicycle sprocket 112. The at least one chain engaging member 118 is configured to contact the bicycle chain BC in a state where the bicycle chain BC engages with the bicycle sprocket 112. The at least one bicycle attachment member 120 constitutes at least a part of the sprocket body 124 of the bicycle sprocket 112 and is configured to be coupled to the bicycle 1. The at least one bicycle attachment member 120 is disposed radially inwardly from the tooth tip 28 of the at least one sprocket tooth 122 of the bicycle sprocket 12. In the illustrated embodiment, the at least one chain engaging member 118 further constitutes the non-driving surface 32 of the at least one sprocket tooth 122 of the bicycle sprocket 112. However, the at least one bicycle attachment member 120 may further constitute the non-driving surface 32 of the at least one sprocket tooth 122 of the bicycle sprocket 112.

In addition, the bicycle sprocket 112 comprises at least one shifting facilitation area 150 provided in the at least one chain engaging member 118 to facilitate a shifting operation of the bicycle chain BC. The at least one shifting facilitation area 150 includes at least one upshifting facilitation area 166. In this embodiment, an upshifting means the bicycle chain BC moves from a smaller bicycle sprocket to a large bicycle sprocket. In the illustrated embodiment, the bicycle sprocket 112 includes two upshifting facilitation areas 166.

In this embodiment, the at least one sprocket tooth 122 includes the at least one first tooth 34 and the at least one second tooth 36. Further, the at least one sprocket tooth 122 includes at least one facilitation tooth 172 in the at least one shifting facilitation area 150. Specifically, the bicycle sprocket 112 includes a plurality of sprocket teeth 122. The plurality of the sprocket teeth 122 include a plurality of first teeth 34 and a plurality of second teeth 36. The plurality of first teeth 34 include a plurality of facilitation teeth 172. The plurality of second teeth 36 include a plurality of facilitation teeth 172.

Figure 22:
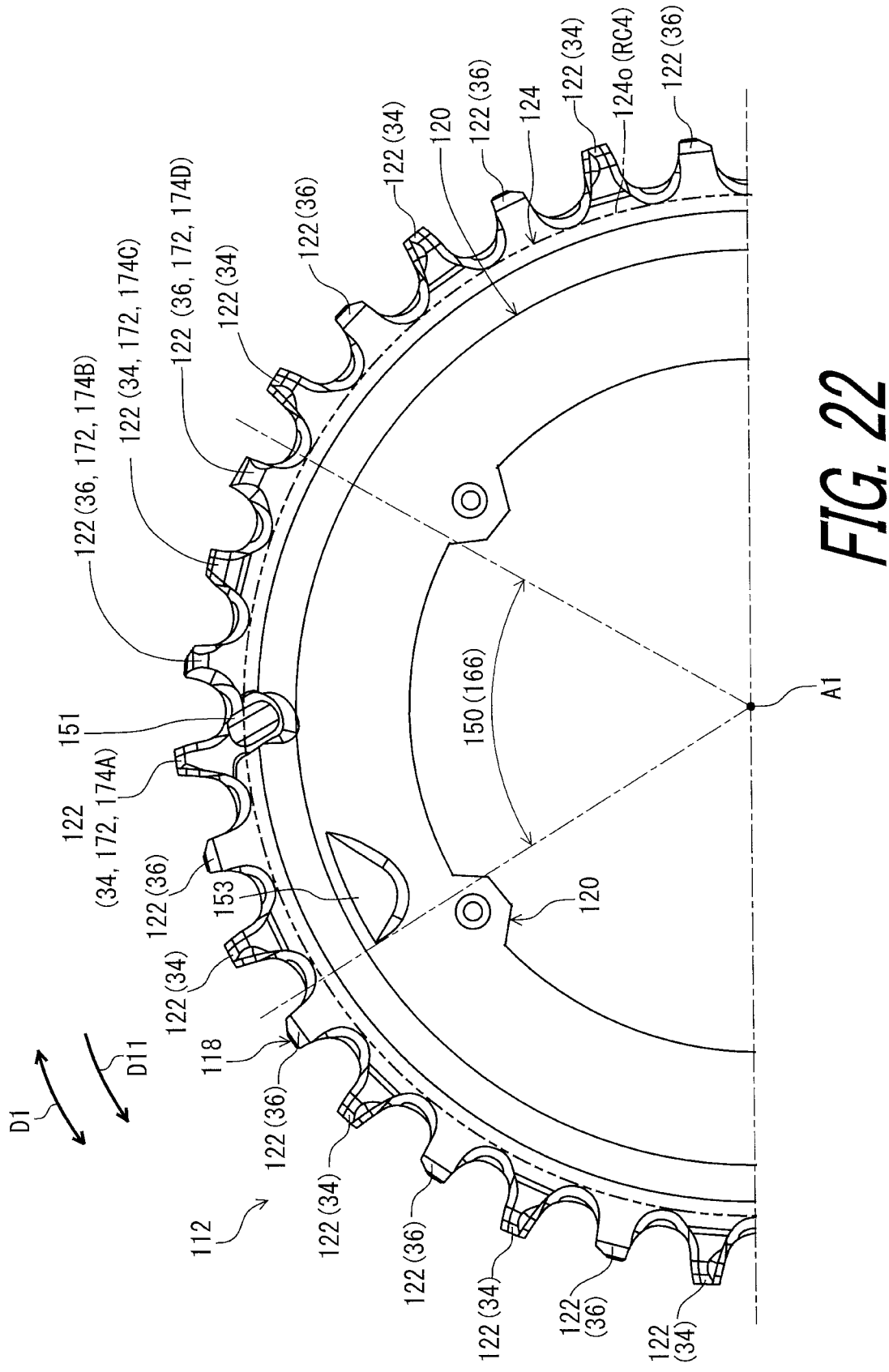
FIG. 22 is a partial side elevational view of the bicycle sprocket illustrated in FIGS. 20 and 21.

Specifically, as seen in FIG. 22, the plurality of facilitation teeth 172 include a plurality of upshifting facilitation teeth 174A, 174B, 174C, and 174D provided in each of the upshifting facilitation areas 166. The upshifting facilitation teeth 174A, 174B, 174C, and 174D are arranged in this order from a downstream side to an upstream side of the driving rotational direction D11.

Figure 23:
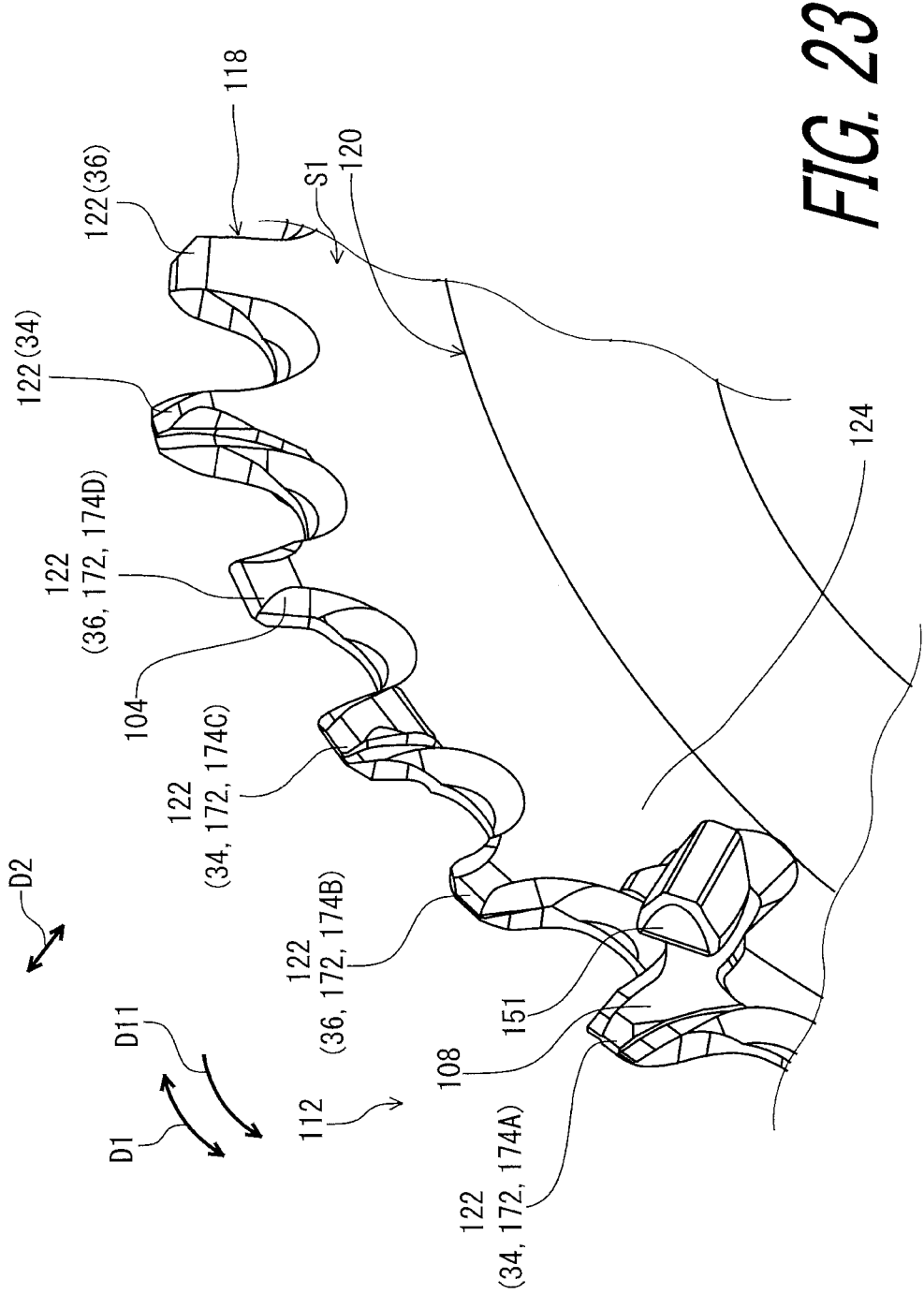
FIG. 23 is a partial perspective view of the bicycle sprocket illustrated in FIGS. 20 and 21.
Figure 24:
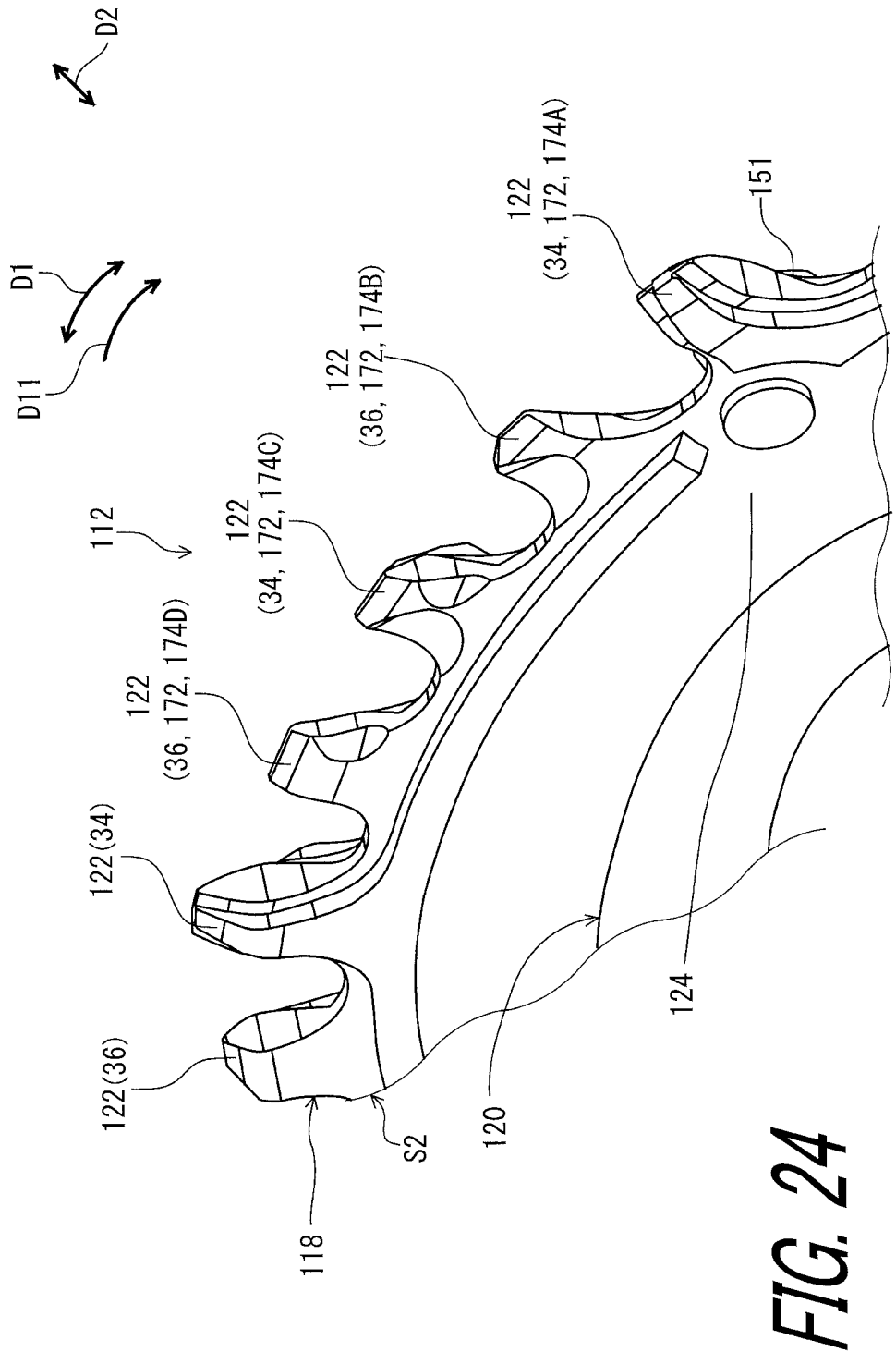
FIG. 24 is another partial perspective view of the bicycle sprocket illustrated in FIGS. 20 and 21.

As seen in FIG. 23, at least one of the upshifting facilitation teeth 174A, 174B, 174C, and 174D includes a first upshifting facilitation chamfer 104. The first upshifting facilitation chamfer 104 is provided on one of the first axial side S1 and the second axial side S2 to facilitate the upshifting operation from the bicycle sprocket 113 to the bicycle sprocket 112 which is larger than the bicycle sprocket 113.

In the above described manner, at least one of the upshifting facilitation teeth 174A, 174B, 174C, and 174D facilitate upshifting. That is, the at least one facilitation tooth 172 facilitates upshifting.

As seen in FIGS. 21 to 24, the bicycle sprocket 112 further comprises at least one shifting facilitation projection 151 disposed in the at least one shifting facilitation area 150. The at least one shifting facilitation projection 151 facilitates upshifting. Specifically, the at least one shifting facilitation projection 151 is configured to engage with the bicycle chain BC when the bicycle chain BC shifts from the smaller bicycle sprocket 113 toward the bicycle sprocket 112. In this embodiment, the bicycle sprocket 112 includes a plurality of shifting facilitation projections 151 disposed in the upshifting facilitation areas 166 to engage with the bicycle chain BC when the bicycle chain BC shifts from the smaller bicycle sprocket 113 toward the bicycle sprocket 112. The shifting facilitation projections 151 are secured to the sprocket body 124 via a fastening structure such as a rivet. As seen in FIGS. 21 to 24, the shifting facilitation projections 151 are secured to the at least one chain engaging member 118. However, the shifting facilitation projections 151 can be secured to the at least one bicycle attachment member 120.

The shifting facilitation projection 151 is disposed between the upshifting facilitation teeth 174A and the upshifting facilitation teeth 174B in the circumferential direction D1 of the bicycle sprocket 112. The upshifting facilitation tooth 174A is the first tooth 34 closest to the shifting facilitation projection 151 among the first teeth 34. While the shifting facilitation projections 151 are separate members from the at least one chain engaging member 118 or the at least one bicycle attachment member 120 in this embodiment, at least one of the shifting facilitation projections 151 can be integrally provided with the at least one chain engaging member 118 or the at least one bicycle attachment member 120 as a one-piece unitary member.

In the above description, the at least one shifting facilitation projection 151 facilitates upshifting. However, the at least one shifting facilitation projection 151 can facilitate downshifting. The at least one shifting facilitation projection 151 can include a projection to engage with the bicycle chain BC when the bicycle chain BC shifts from the bicycle sprocket 112 toward the smaller bicycle sprocket 113 so as to facilitate the downshifting operation from the bicycle sprocket 112 to the smaller bicycle sprocket 113.

The bicycle sprocket 112 further comprises at least one side recess 153 disposed in the at least one shifting facilitation area 150. In this embodiment, the bicycle sprocket 112 includes a plurality of side recesses 153 disposed in the upshifting facilitation areas 166 to reduce interference between the sprocket body 124 and the bicycle chain BC and to guide the bicycle chain BC toward sprocket teeth of the bicycle sprocket 112 during the upshifting operation. In the illustrated embodiment, the at least one side recess 153 is disposed in the at least one bicycle attachment member 120, but the at least one side recess 153 can be disposed in both the at least one chain engaging member 118 and the at least one bicycle attachment member 120 or only in the at least one chain engaging member 118. The at least one shifting facilitation projection 151 is secured to the at least one chain engaging member 118. At least part of the at least one facilitation tooth 172 is provided in the at least one chain engaging member 118, and the at least one side recess 153 is disposed in the at least one bicycle attachment member 120. Accordingly, the at least one shifting facilitation area 150 extends between the at least one chain engaging member 118 and the at least one bicycle attachment member 120. Specifically, the at least one shifting facilitation area 150 is constituted by both the at least one chain engaging member 118 and the at least one bicycle attachment member 120.

In the second embodiment, with the bicycle sprockets 112 and 113, it is possible to improve chain-holding performance of the bicycle sprocket 112 and 113 with facilitating the shifting operation, because the second chain engaging width W2 of the at least one second tooth 36 is smaller than the first chain engaging width W1 of the at least one first tooth 34 and the bicycle sprocket 112 and 113 comprise at least one shifting facilitation area 150.

Third Embodiment

Figure 25:
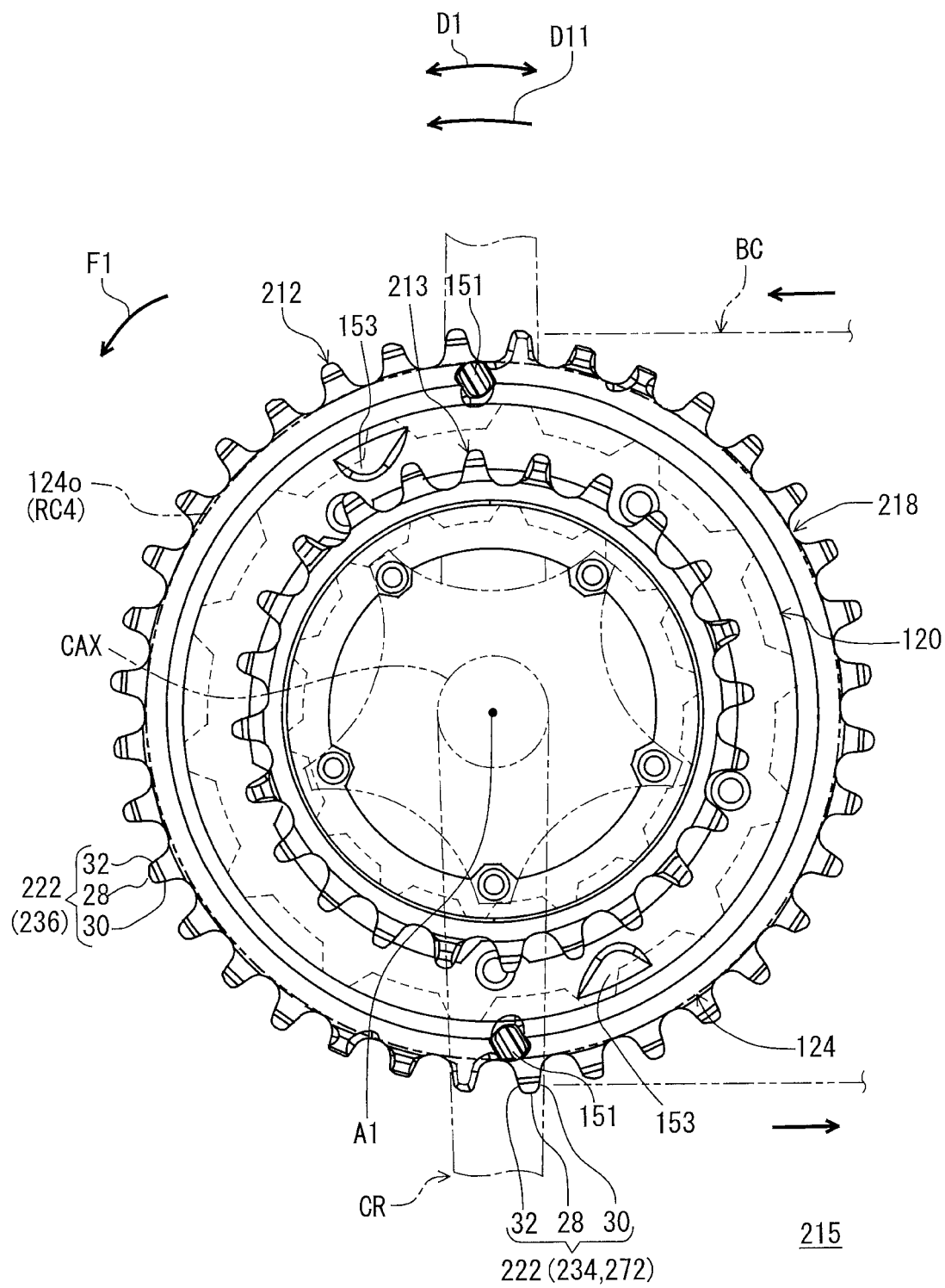
FIG. 25 is a side elevational view of a sprocket assembly including a bicycle sprocket and a smaller bicycle sprocket in accordance with a third embodiment.
Figure 26:
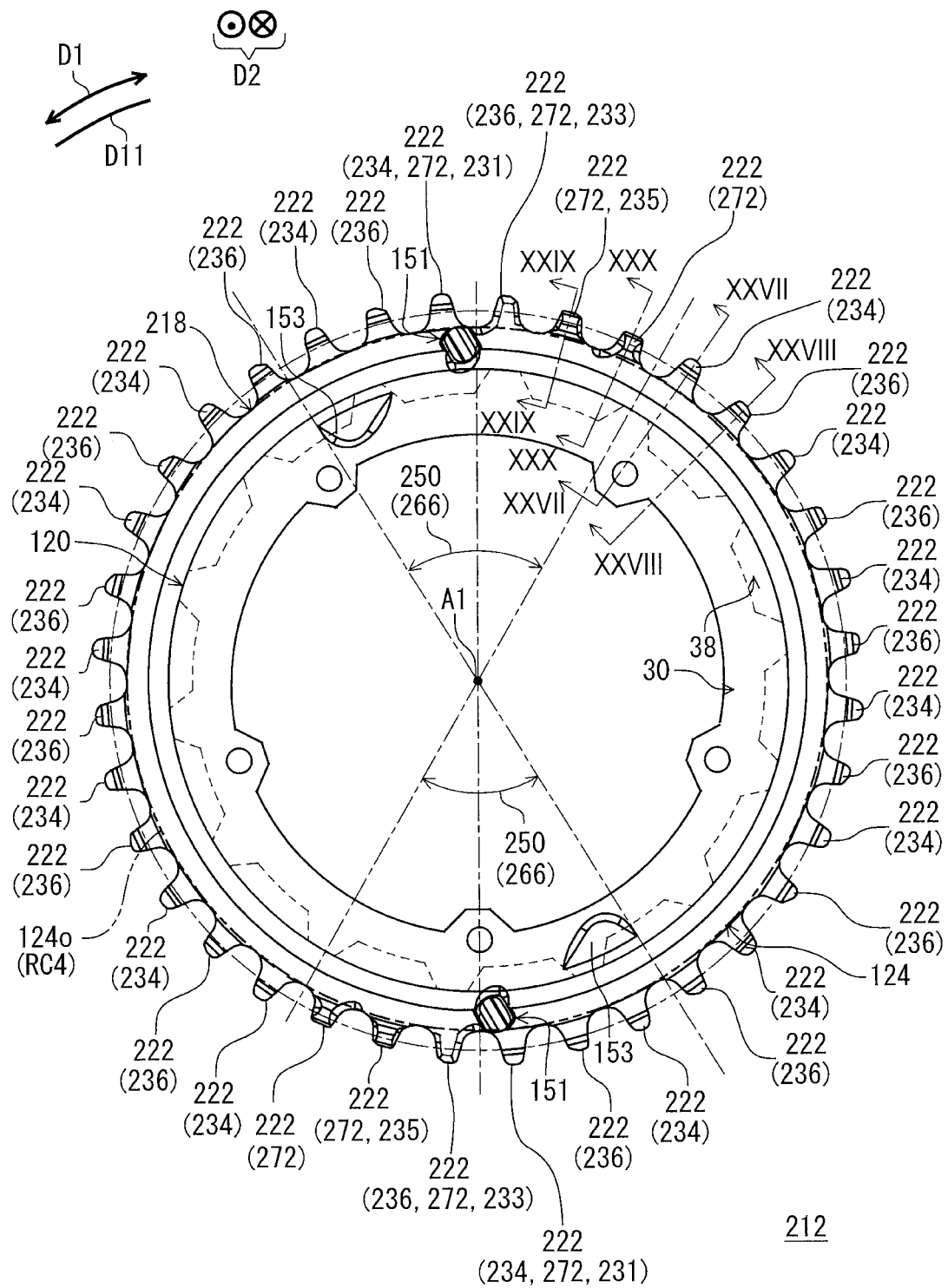
FIG. 26 is a side elevational view of the bicycle sprocket of the sprocket assembly illustrated in FIG. 25.

A sprocket assembly 215 in accordance with a third embodiment will be described below referring to FIGS. 25 and 26. The sprocket assembly 215 has the same configuration as the sprocket assembly 15 except for a shape of at least one sprocket tooth 222. As seen in FIGS. 25 and 26, the sprocket assembly 215 comprises a bicycle sprocket 212 and a bicycle sprocket 213 which is smaller than the bicycle sprocket 212. The smaller bicycle sprocket 213 has substantially the same configuration as the bicycle sprocket 212 except for its size and a total number of sprocket teeth. Therefore, explanation of the structure of the smaller bicycle sprocket 213 is omitted. The bicycle sprocket 212 has the same configuration as the bicycle sprocket 112 except for the at least one sprocket tooth 222. Thus, elements having substantially the same function as those in the second embodiment will be numbered the same here, and will not be described and/or illustrated again in detail here for the sake of brevity.

As seen in FIGS. 25 and 26, the bicycle sprocket 212 comprises at least one chain engaging member 218 and the at least one bicycle attachment member 120. In the illustrated embodiment, the bicycle sprocket 212 includes one chain engaging member 218 and one bicycle attachment member 120. However, the illustrated one chain engaging member 218 may be divided into several pieces to constitute the at least one chain engaging member 218. Therefore, the at least one chain engaging member 218 has at least a part of an annular shape. In the illustrated embodiment, the at least one chain engaging member 218 has an annular shape. The bicycle sprocket 212 includes at least one sprocket tooth 222 and the sprocket body 124. The at least one sprocket tooth 222 of the bicycle sprocket 212 is circumferentially arranged on the outer periphery 124o of the sprocket body 124. The outer periphery 124o of the sprocket body 124 can be identical to the root circle RC4 of the at least one sprocket tooth 222. In this embodiment, the at least one chain engaging member 218 is made of the first material that the at least one chain engaging member 18 is made of.

As seen in FIG. 25, each of the at least one sprocket tooth 222 includes the tooth tip 28, the driving surface 30, and the non-driving surface 32. The at least one chain engaging member 218 constitutes at least a part of the at least one sprocket tooth 222 of the bicycle sprocket 212. Specifically, the at least one chain engaging member 218 constitutes at least the tooth tip 28 and the driving surface 30 of the at least one sprocket tooth 222 of the bicycle sprocket 212. The at least one chain engaging member 218 is configured to contact the bicycle chain BC in a state where the bicycle chain BC engages with the bicycle sprocket 212. In the illustrated embodiment, the at least one chain engaging member 218 further constitutes the non-driving surface 32 of the at least one sprocket tooth 222 of the bicycle sprocket 212. However, the at least one bicycle attachment member 120 may further constitute the non-driving surface 32 of the at least one sprocket tooth 222 of the bicycle sprocket 212.

In this embodiment, the at least one sprocket tooth 222 includes at least one first tooth 234 and at least one second tooth 236. As seen in FIG. 26, the at least one sprocket tooth 222 includes a plurality of first teeth 234 and a plurality of second teeth 236. The plurality of first teeth 234 and the plurality of second teeth 236 are alternatingly arranged in the circumferential direction D1.

Figure 27:
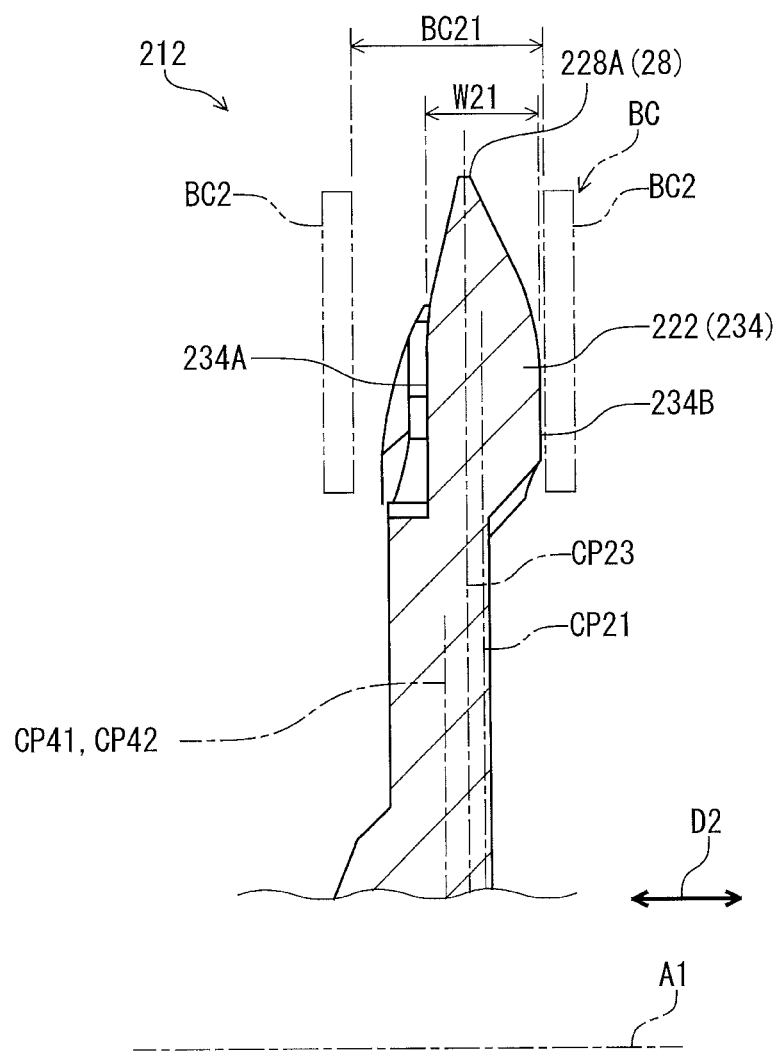
FIG. 27 is a cross-sectional view of the bicycle sprocket taken along line XXVII-XXVII of FIG. 26.

As seen in FIGS. 26 and 27, the at least one first tooth 234 is arranged on the outer periphery 124o to be received within the outer link space BC21 defined between the pair of outer link plates BC2 of the bicycle chain BC. The at least one first tooth 234 has a first chain engaging width W21 defined in the axial direction D2. In this embodiment, the first tooth 234 includes a first tooth axial surface 234A and a first chain-engagement surface 234B. The first tooth axial surface 234A faces in the axial direction D2. The first chain-engagement surface 234B faces in the axial direction D2 and is provided on a reverse side of the first tooth axial surface 234A in the axial direction D2. The first chain-engagement surface 234B is contactable with the bicycle chain BC (the outer link plate BC2). The first chain engaging width W21 is defined between the first tooth axial surface 234A and the first chain-engagement surface 234B in the axial direction D2.

The first tooth 234 has a first center plane CP21 defined to bisect the first chain engaging width W21 in the axial direction D2. The first center plane CP21 is perpendicular to the rotational center axis A1. The first tooth 234 includes a first tooth-tip 228A having a first axially tooth center plane CP23. The first tooth-tip 228A is the tooth tip 28 of the first tooth 234. That is, the at least one first tooth 234 has the first axially tooth center plane CP23. The first axially tooth center plane CP23 is perpendicular to the rotational center axis A1. The first axially tooth center plane CP23 is offset from the first center plane CP21 in the axial direction D2. However, the first axially tooth center plane CP23 can coincide with the first center plane CP21 in the axial direction D2. The first tooth 234 has an asymmetrical shape with respect to the first center plane CP21 in the axial direction D2. However, the first tooth 234 can have a symmetrical shape with respect to the first center plane CP21 in the axial direction D2.

Figure 28:
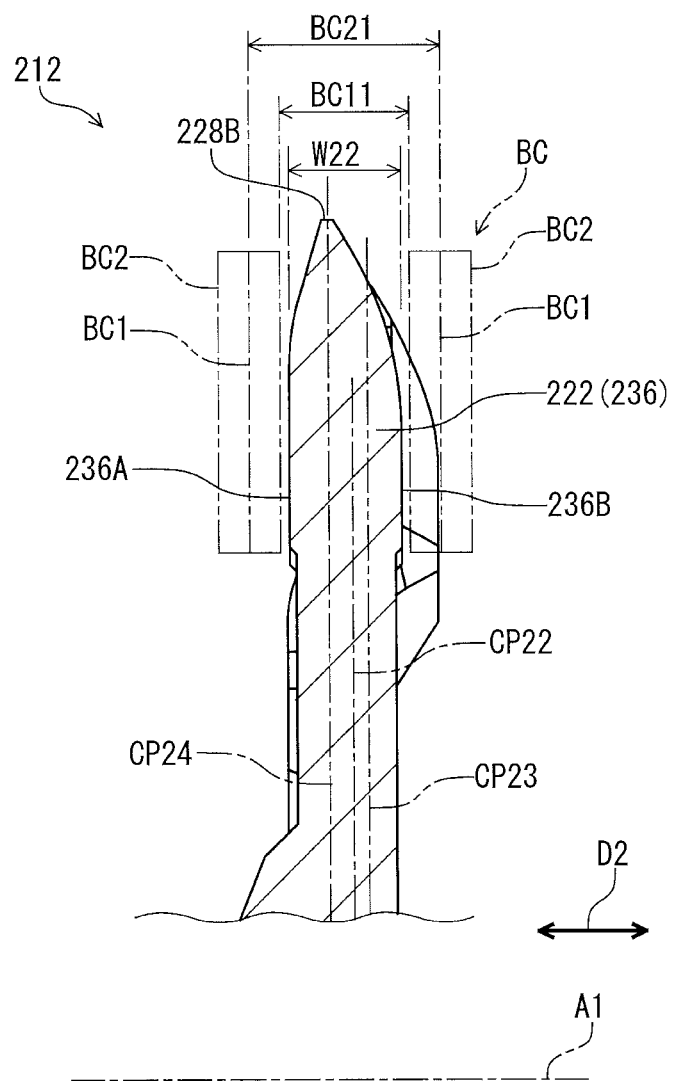
FIG. 28 is a cross-sectional view of the bicycle sprocket taken along line XXVIII-XXVIII of FIG. 26.

As seen in FIGS. 26 and 28, the at least one second tooth 236 is arranged on the outer periphery 124o to be received within the inner link space BC11 defined between the pair of inner link plates BC1 of the bicycle chain BC. The at least one second tooth 236 has a second chain engaging width W22 defined in the axial direction D2. In this embodiment, the second tooth 236 includes a second chain-engagement surface 236A and a second additional chain-engagement surface 236B. The second chain-engagement surface 236A faces in the axial direction D2 and is contactable with the bicycle chain BC (the inner link plate BC1). The second additional chain-engagement surface 236B faces in the axial direction D2 and is provided on a reverse side of the second chain-engagement surface 236A in the axial direction D2. The second additional chain-engagement surface 236B is contactable with the bicycle chain BC (the inner link plate BC1). The second chain engaging width W22 is defined between the second chain-engagement surface 236A and the second additional chain-engagement surface 236B in the axial direction D2. The second tooth 236 has a second center plane CP22 defined to bisect the second chain engaging width W22 in the axial direction D2. The second center plane CP22 is perpendicular to the rotational center axis A1.

The second tooth 236 includes a second tooth-tip 228B having a second axially tooth center plane CP24. The second tooth-tip 228B is the tooth tip 28 of the second tooth 236. That is, the at least one second tooth 236 has the second axially tooth center plane CP24. The second axially tooth center plane CP24 is perpendicular to the rotational center axis A1. The second axially tooth center plane CP24 is offset from the second center plane CP22 in the axial direction D2. However, the second axially tooth center plane CP24 can coincide with the second center plane CP22 in the axial direction D2. The second tooth 236 has an asymmetrical shape with respect to the second center plane CP22 in the axial direction D2. However, the second tooth 236 can have a symmetrical shape with respect to the second center plane CP22 in the axial direction D2. As seen in FIG. 28, the first axially tooth center plane CP23 is offset from the second axially tooth center plane CP24 in the axial direction D2 parallel to the rotational center axis A1 of the bicycle sprocket 212.

In this embodiment, the second chain engaging width W22 is equal to the first chain engaging width W21. The first chain engaging width W21 and the second chain engaging width W22 are smaller than the inner link space BC11. However, the second chain engaging width W22 can be different from the first chain engaging width W21. One of the first chain engaging width W21 and the second chain engaging width W22 can be equal to or larger than the inner link space BC11.

As seen in FIG. 26, the bicycle sprocket 212 comprises at least one shifting facilitation area 250 provided in the at least one chain engaging member 218 to facilitate a shifting operation of the bicycle chain BC. The at least one shifting facilitation area 250 includes at least one upshifting facilitation area 266. In the illustrated embodiment, the bicycle sprocket 212 includes two upshifting facilitation areas 266.

As seen in FIGS. 25 and 26, the bicycle sprocket 212 further comprises the at least one shifting facilitation projection 151 which is disposed in the at least one shifting facilitation area 250 and which is described in the second embodiment. The at least one shifting facilitation projection 151 facilitates upshifting. In this embodiment, the bicycle sprocket 212 includes a plurality of shifting facilitation projections 151 disposed in the upshifting facilitation area 266. The shifting facilitation projections 151 are secured to the at least one chain engaging member 218. The bicycle sprocket 112 further comprises the at least one side recess 153 which is disposed in the at least one shifting facilitation area 150 and which is described in the second embodiment. In this embodiment, the bicycle sprocket 212 includes a plurality of side recesses 153 disposed in the upshifting facilitation area 266. The at least one side recess 153 is disposed in the at least one bicycle attachment member 120. Accordingly, the at least one shifting facilitation area 250 extends between the at least one chain engaging member 218 and the at least one bicycle attachment member 120. Specifically, the at least one shifting facilitation area 250 is constituted by both the at least one chain engaging member 218 and the at least one bicycle attachment member 120.

As seen in FIG. 26, the at least one sprocket tooth 222 includes at least one facilitation tooth 272 in the at least one shifting facilitation area 250. Specifically, the bicycle sprocket 212 includes a plurality of sprocket teeth 222. The plurality of the sprocket teeth 222 include a plurality of facilitation teeth 272.

The plurality of facilitation teeth 272 includes at least one first adjacent tooth 231 and at least one second adjacent tooth 233. Specifically, the plurality of facilitation teeth 272 includes a plurality of first adjacent teeth 231 and a plurality of second adjacent teeth 233. The at least one first adjacent tooth 231 is at least one of the first teeth 234 which is closest to the at least one shifting facilitation projection 151 among the first teeth 234. The at least one shifting facilitation projection 151 is at least partly closer to the rotational center axis A1 than the at least one first adjacent tooth 231. The at least one second adjacent tooth 233 is at least one of the second teeth 236 which is closest to the at least one shifting facilitation projection 151 among the second teeth 236. The plurality of facilitation teeth 272 further includes at least one receiving tooth 235. Specifically, the plurality of facilitation teeth 272 further includes a plurality of receiving teeth 235. The receiving tooth 235 is adjacent to the second adjacent tooth 233 without another tooth between the receiving tooth 235 and the second adjacent tooth 233 in the driving rotational direction D11. The second adjacent tooth 233 is provided between the receiving tooth 235 and the first adjacent tooth 231 in the circumferential direction D1. However, the positional relationship among the first adjacent tooth 231, the second adjacent tooth 233, the receiving tooth 235, and the shifting facilitation projection 151 is not limited to this embodiment. Further, total numbers of the first adjacent teeth 231, the second adjacent teeth 233, and the receiving teeth 235 are not limited to this embodiment.

In this embodiment, the at least one receiving tooth 235 is configured to first receive the bicycle chain BC in the upshifting operation. Specifically, the receiving tooth 235 first receives the opposed pair of outer link plates BC2 of the bicycle chain BC in the upshifting operation.

Figure 29:
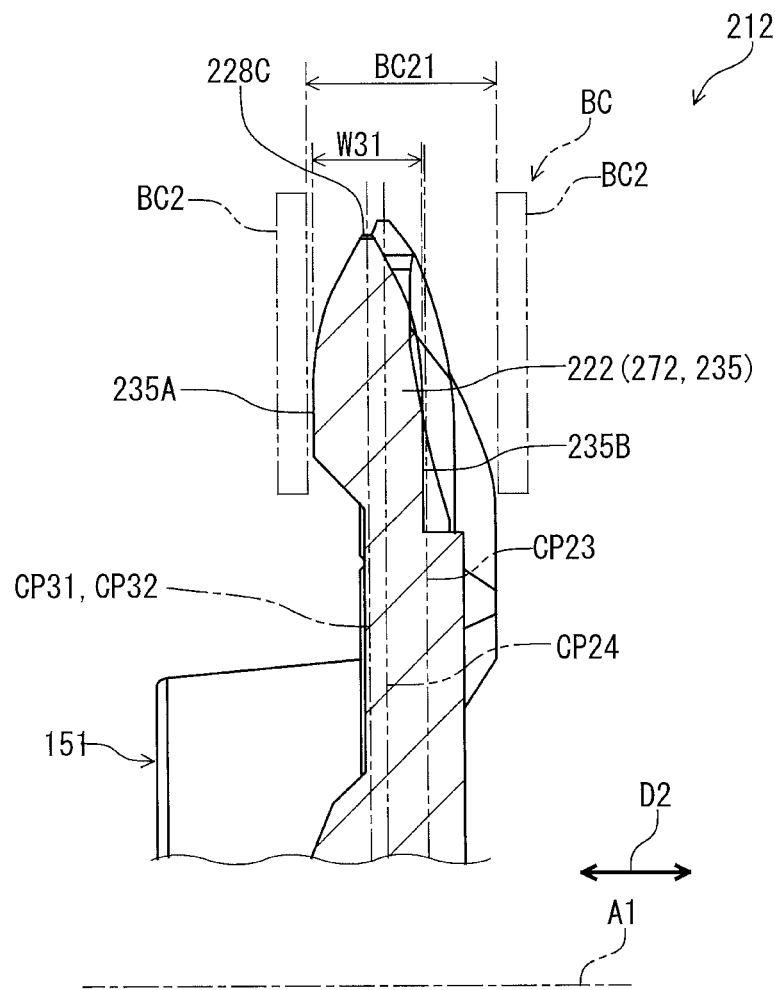
FIG. 29 is a cross-sectional view of the bicycle sprocket taken along line XXIX-XXIX of FIG. 26.

As seen in FIG. 29, the at least one receiving tooth 235 has a third chain engaging width W31 defined in the axial direction D2. In this embodiment, the receiving tooth 235 includes a third chain-engagement surface 235A and a reverse surface 235B. The third chain-engagement surface 235A faces in the axial direction D2 and is contactable with the bicycle chain BC (the outer link plate BC2). The reverse surface 235B faces in the axial direction D2 and is provided on a reverse side of the third chain-engagement surface 235A in the axial direction D2. The third chain engaging width W31 is defined between the third chain-engagement surface 235A and the reverse surface 235B in the axial direction D2.

The receiving tooth 235 has a third center plane CP31 defined to bisect the third chain engaging width W31 in the axial direction D2. The third center plane CP31 is perpendicular to the rotational center axis A1. The receiving tooth 235 includes a third tooth-tip 228C having a third axially tooth center plane CP32. The third axially tooth center plane CP32 is perpendicular to the rotational center axis A1. The third axially tooth center plane CP32 coincides with the third center plane CP31 in the axial direction D2. Further, the third axially tooth center plane CP32 can be offset from the second axially tooth center plane CP24 in the axial direction D2 toward the smaller bicycle sprocket 213. However, the third axially tooth center plane CP32 can be offset from the third center plane CP31 in the axial direction D2. The receiving tooth 235 has a symmetrical shape with respect to the third center plane CP31 in the axial direction D2. However, the receiving tooth 235 can have an asymmetrical shape with respect to the third center plane CP31 in the axial direction D2.

In the third embodiment, with the bicycle sprockets 212 and 213, it is also possible to improve chain-holding performance of the bicycle sprocket 212 and 213 with facilitating the shifting operation, because the first axially tooth center plane CP23 is offset from the second axially tooth center plane CP24 in the axial direction D2 parallel to a rotational center axis A1 of the bicycle sprocket 212 and 213 and the bicycle sprocket 212 and 213 comprise at least one shifting facilitation area 250.

Modification of Third Embodiment

In the third embodiment, the bicycle sprocket 212 can be applied to a single front sprocket. In this case, the at least one shifting facilitation projection 151 and the at least one side recess 153 can be removed and the at least one facilitation tooth 272 can be replaced with the at least one first tooth 234 and/or the at least one second tooth 236.

Fourth Embodiment

A sprocket assembly 314 in accordance with a fourth embodiment will be described below referring to FIGS. 30 and 31. The sprocket assembly 314 has the same configuration as the rear sprocket assembly 14 except for a number of the sprockets, a sprocket carrier 342, and bicycle attachment members of the sprockets. Thus, elements having substantially the same function as those in the first embodiment will be numbered the same here, and will not be described and/or illustrated again in detail here for the sake of brevity.

Figure 30:
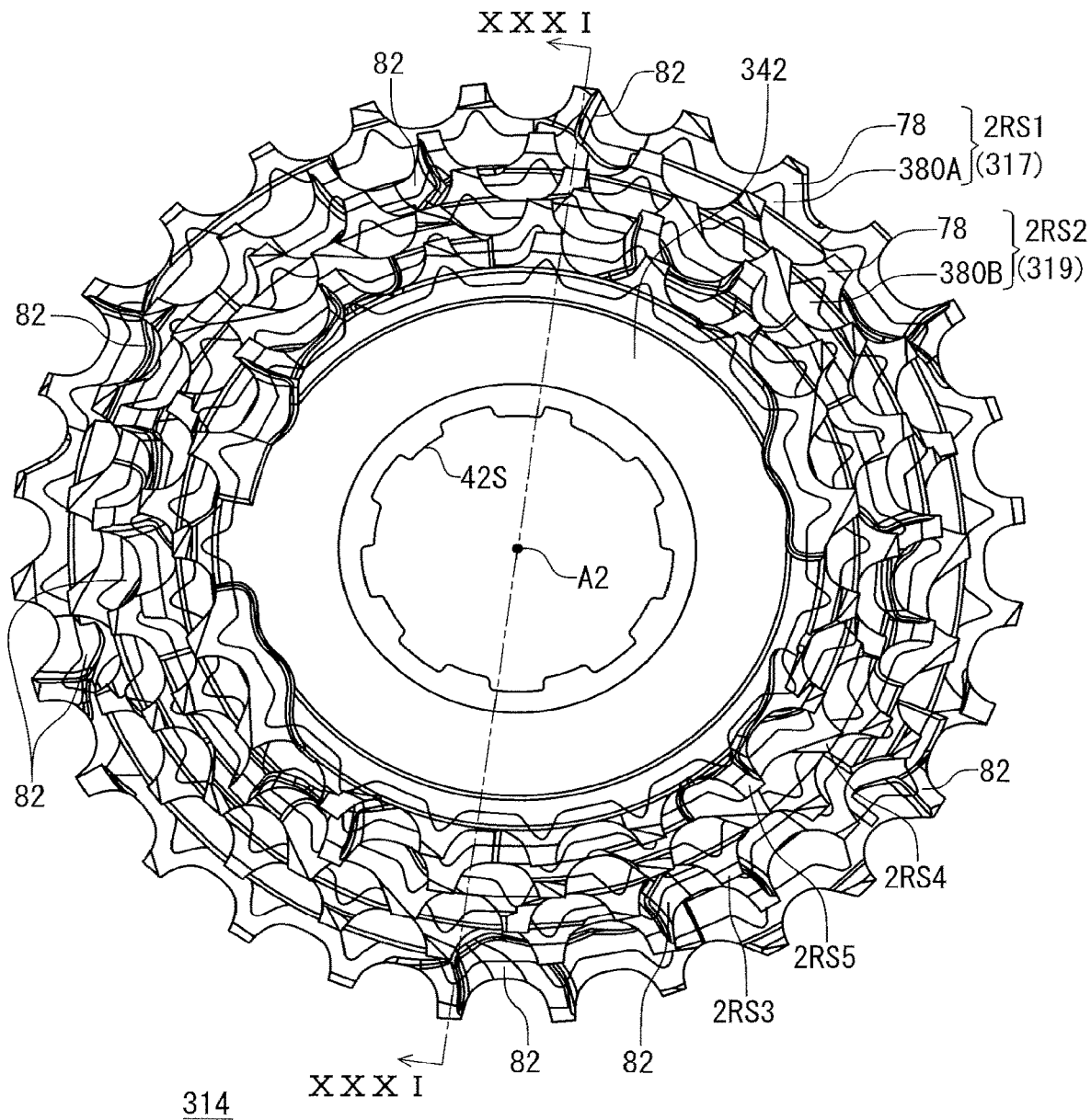
FIG. 30 is a side elevational view of a sprocket assembly in accordance with a fourth embodiment.
Figure 31:
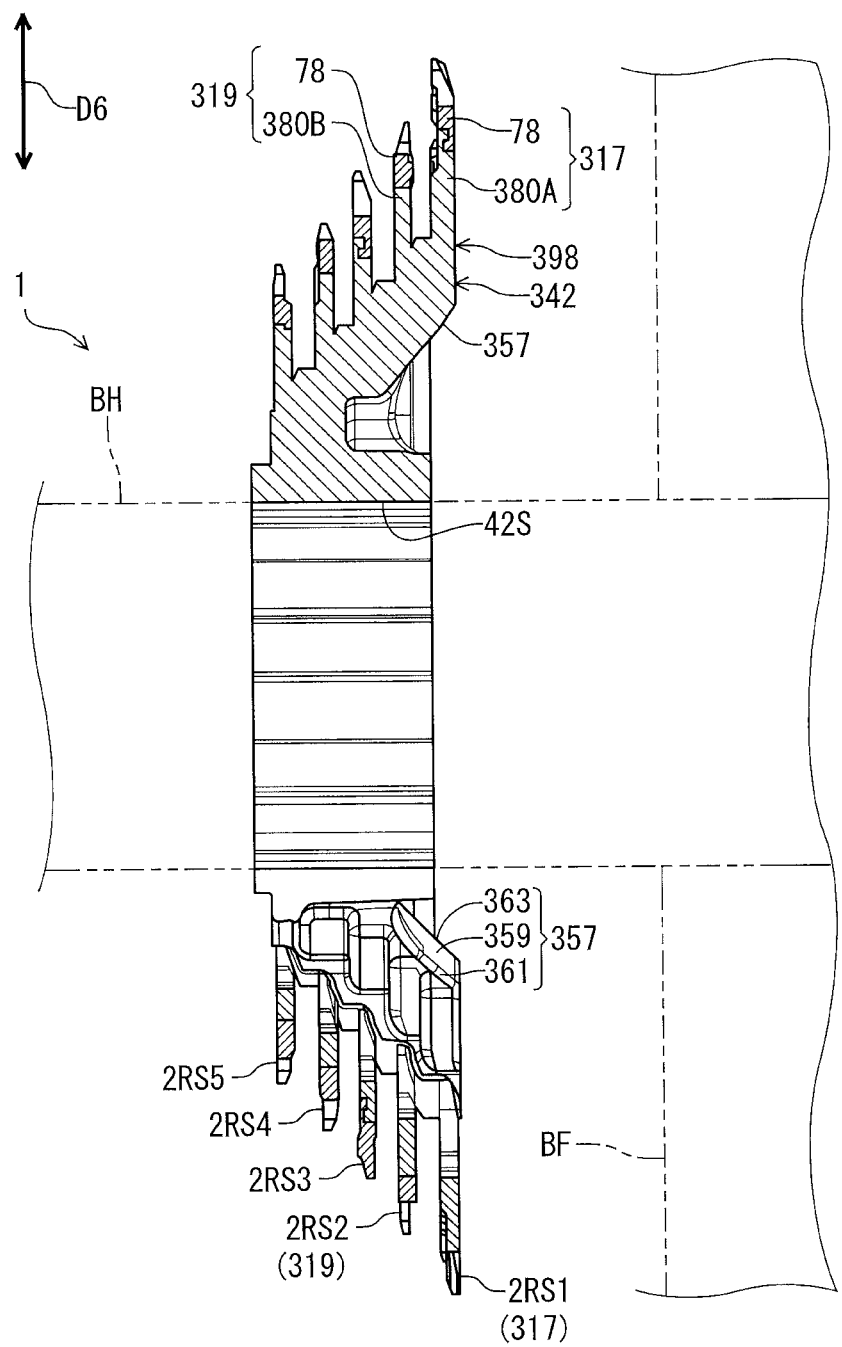
FIG. 31 is a cross-sectional view of the sprocket assembly taken along line XXXI-XXXI of FIG. 30.

As seen in FIGS. 30 and 31, the sprocket assembly 314 comprises a first bicycle sprocket 317 and a second bicycle sprocket 319. In the illustrated embodiment, the sprocket assembly 314 includes sprockets 2RS1 to 2RS5 which are similar to sprockets RS4 to RS12 in the first embodiment, respectively. The first bicycle sprocket 317 is a sprocket 2RS1 which has substantially the same configuration as the bicycle sprocket 17 (RS10) in the first embodiment except for the at least one bicycle attachment member 380A. The second bicycle sprocket 319 is a bicycle sprocket smaller than the first bicycle sprocket 317 and has the same configuration as the bicycle sprocket 16 except for its size and a total number of sprocket teeth. Accordingly, the second bicycle sprocket 319 has substantially the same configuration as the bicycle sprocket 17 (RS10) in the first embodiment except for the at least one bicycle attachment member 380B. Thus, elements having substantially the same function as the bicycle sprocket 317 and the bicycle sprocket 319 will be numbered the same here, and will not be described and/or illustrated again in detail here for the sake of brevity.

The first bicycle sprocket 317 has a first total number of teeth. The second bicycle sprocket 319 has a second total number of teeth. The second total number is different from the first total number. In the illustrated embodiment, the first total number of teeth is twenty-eight, and the second total number of teeth is twenty-five.

The first bicycle sprocket 317 comprises the at least one chain engaging member 78 and at least one bicycle attachment member 380A. The second bicycle sprocket 319 comprises the at least one chain engaging member 78 and at least one bicycle attachment member 380B. As seen in FIG. 30, the first bicycle sprocket 317 and the second bicycle sprocket 319 comprise the at least one shifting facilitation area 82 provided in the at least one chain engaging member 78 configured to facilitate a shifting operation of the bicycle chain BC.

As seen in FIG. 31, the at least one bicycle attachment member 380A and the at least one bicycle attachment member 380B constitute at least a part of a sprocket body 398 of the bicycle sprockets 317 and 319. The at least one bicycle attachment member 380A and the at least one bicycle attachment member 380B are configured to be coupled to the bicycle 1. As seen in FIGS. 30 and 31, the sprocket assembly 314 includes a sprocket carrier 342.

Figure 32:
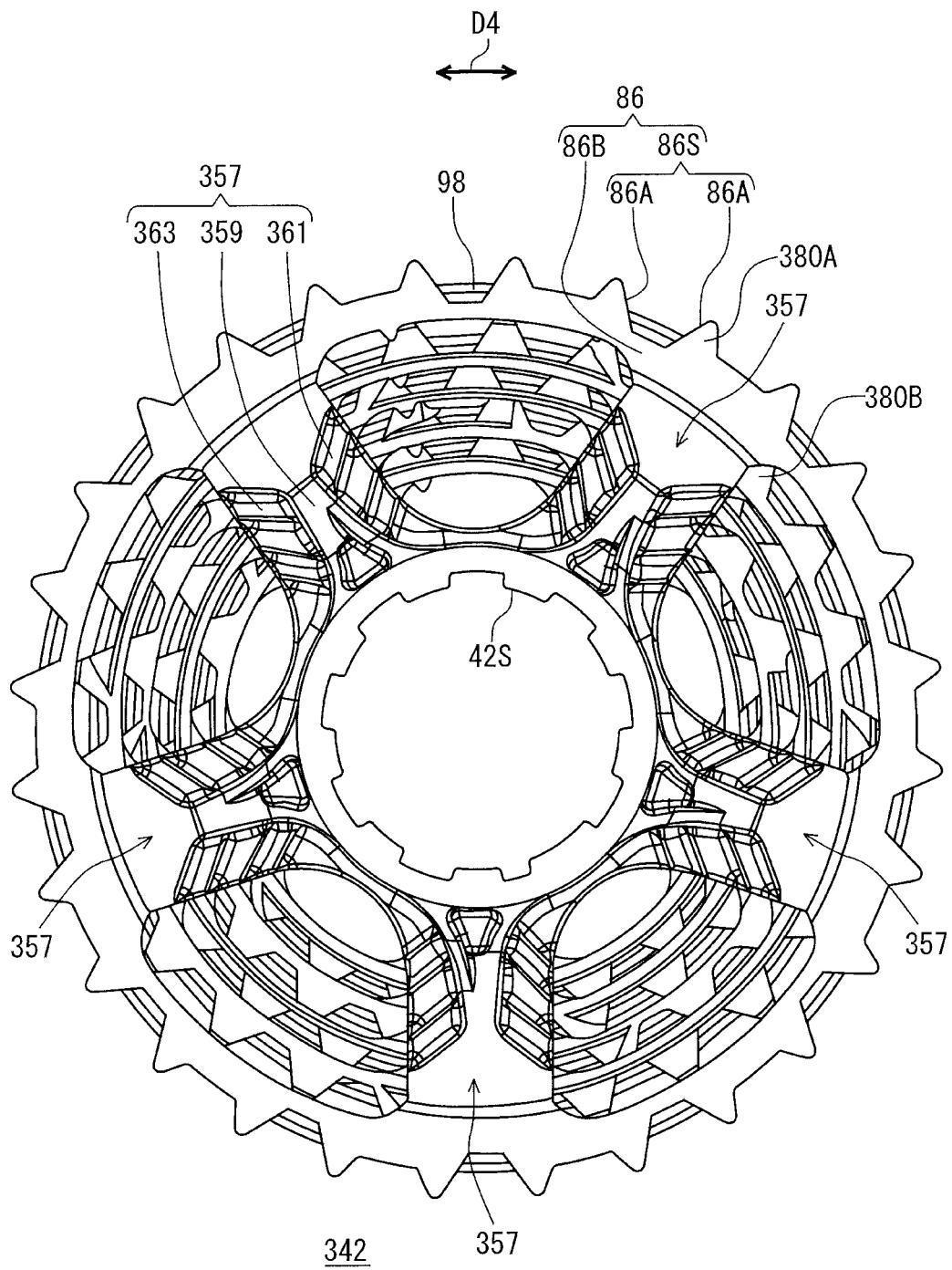
FIG. 32 is another side elevational view of a sprocket carrier including at least one bicycle attachment member in accordance with the fourth embodiment.

The sprocket carrier 342 includes a plurality of supporting arms 357. Each of the supporting arms 357 connects the at least one bicycle attachment member 380A and the at least one bicycle attachment member 380B. In other words, each of the supporting arms 357 connects the bicycle sprockets 317 and 319. In the illustrated embodiment, each of the supporting arms 357 connects all of the bicycle sprockets which are connected to the sprocket carrier 342. Each of the supporting arms 357 includes a reinforcing part 359. As seen in FIG. 31, the reinforcing part 359 protrudes radially inwardly from the at least one bicycle attachment member 380A and the at least one bicycle attachment member 380B in the radial direction D6. As seen in FIG. 32, each of the supporting arms 357 includes a first edge part 361 and a second edge part 363 opposite to the first edge part 361 in the circumferential direction D4. The reinforcing part 359 is arranged between the first edge part 361 and the second edge part 363 in the circumferential direction D4. The first edge part 361 is inclined outwardly from the reinforcing part 359 in the radial direction D6. The second edge part 363 is inclined outwardly from the reinforcing part 359 in the radial direction D6.

Figure 33:
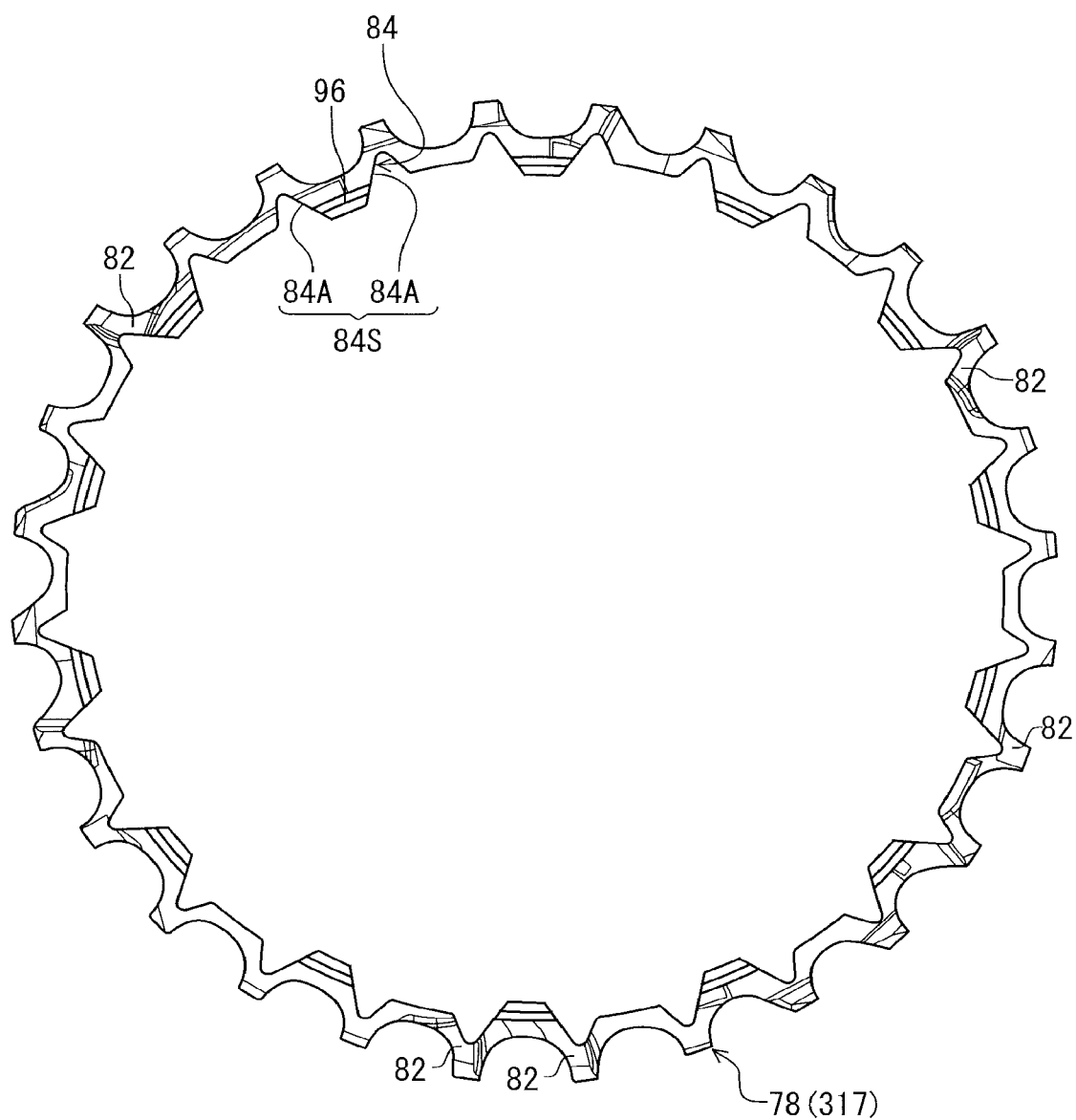
FIG. 33 is a side elevational view of at least one chain engaging member in accordance with the fourth embodiment.
Figure 34:
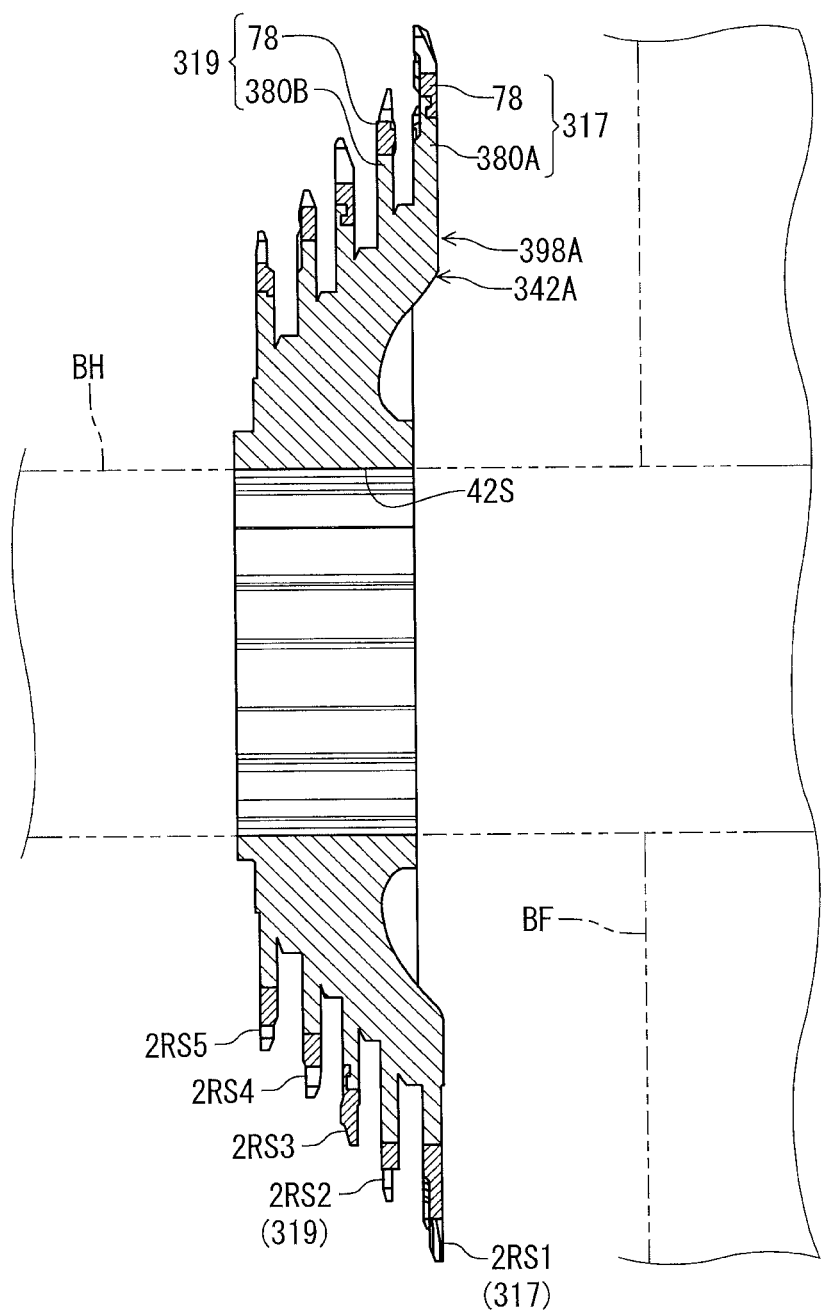
FIG. 34 is a modification example of a cross-sectional view of a sprocket assembly in the fourth embodiment.

The at least one bicycle attachment member 380A and the at least one bicycle attachment member 380B have substantially the same configuration as the at least one bicycle attachment member 80 except that the at least one bicycle attachment member 380A, the at least one bicycle attachment member 380B, and the sprocket carrier 342 are integrated into a one-piece unitary member. For example, as seen in FIG. 32, the at least one bicycle attachment member 380A and the at least one bicycle attachment member 380B have the second torque transmitting profile 86 to engage with the first torque transmitting profile 84 of the at least one chain engaging member 78 which is illustrated in FIG. 33. Accordingly, the at least one bicycle attachment member 380A and the sprocket carrier 342 are integrated into a one-piece unitary member. The at least one bicycle attachment member 380B and the sprocket carrier 342 are integrated into a one-piece unitary member. The at least one bicycle attachment member 380A of the first bicycle sprocket 317 and the at least one bicycle attachment member 380B of the second bicycle sprocket 319 are integrated into a one-piece unitary member. Further as seen in FIG. 34, the sprocket body 398 includes the sprocket carrier 342 to be coupled to the bicycle 1.

Preferably, the sprocket carrier 342 is made of a non-metallic material. More preferably, the sprocket carrier 342 is made of a fiber reinforced plastic material. Accordingly, preferably, the at least one bicycle attachment member 380A and 380B are made of a second material including a non-metallic material. More preferably, the second material includes a fiber reinforced plastic material. The at least one chain engaging member 78 is made of a first material different from the second material as explained in the first embodiment.

In the fourth embodiment, with the sprocket assembly 314, it is possible to provide a lightweight sprocket assembly, because the at least one bicycle attachment member 380A of the first bicycle sprocket 317 and the at least one bicycle attachment member 380B of the second bicycle sprocket 319 are integrated into a one-piece unitary member.

Modification of Fourth Embodiment

Figure 35:
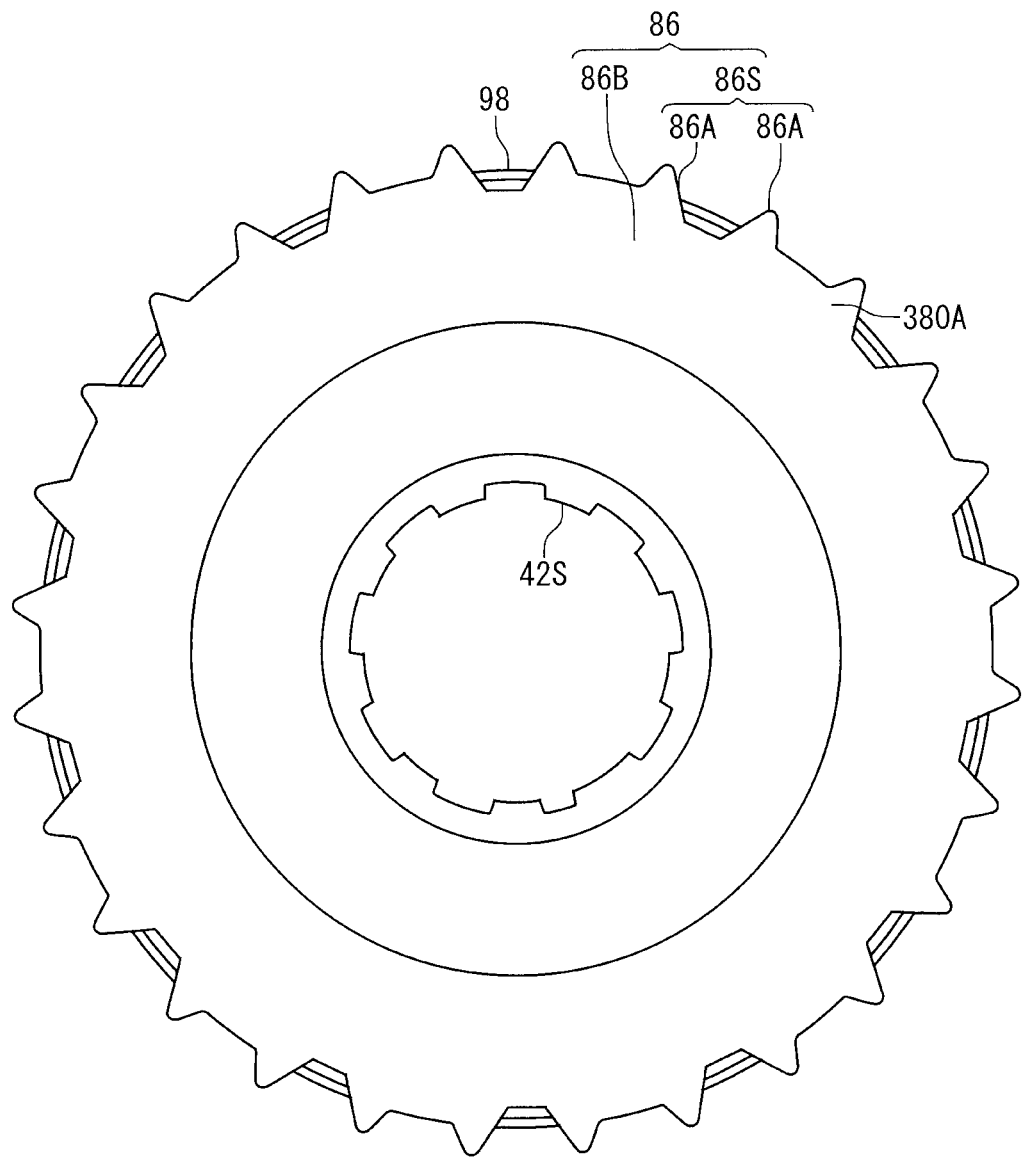
FIG. 35 is a side elevational view of a sprocket carrier including at least one bicycle attachment member of the modification example in accordance with the fourth embodiment.

In the fourth embodiment, the sprocket carrier 342 can have a shape like a dome. FIGS. 34 and 35 illustrate a sprocket assembly 314A including a sprocket carrier 342A having a shape like a dome. Further, the sprocket assembly 314 can have the torque transmitting profiles 38 and 40 in place of the torque transmitting profiles 84 and 86.

Fifth Embodiment

A bicycle sprocket 416 in accordance with a fifth embodiment will be described below referring to FIG. 36. The bicycle sprocket 416 has the same configuration as the bicycle sprocket 16 except for at least one concavo-convex portion 55. Thus, elements having substantially the same function as those in the bicycle sprocket 16 will be numbered the same here, and will not be described and/or illustrated again in detail here for the sake of brevity.

Figure 36:
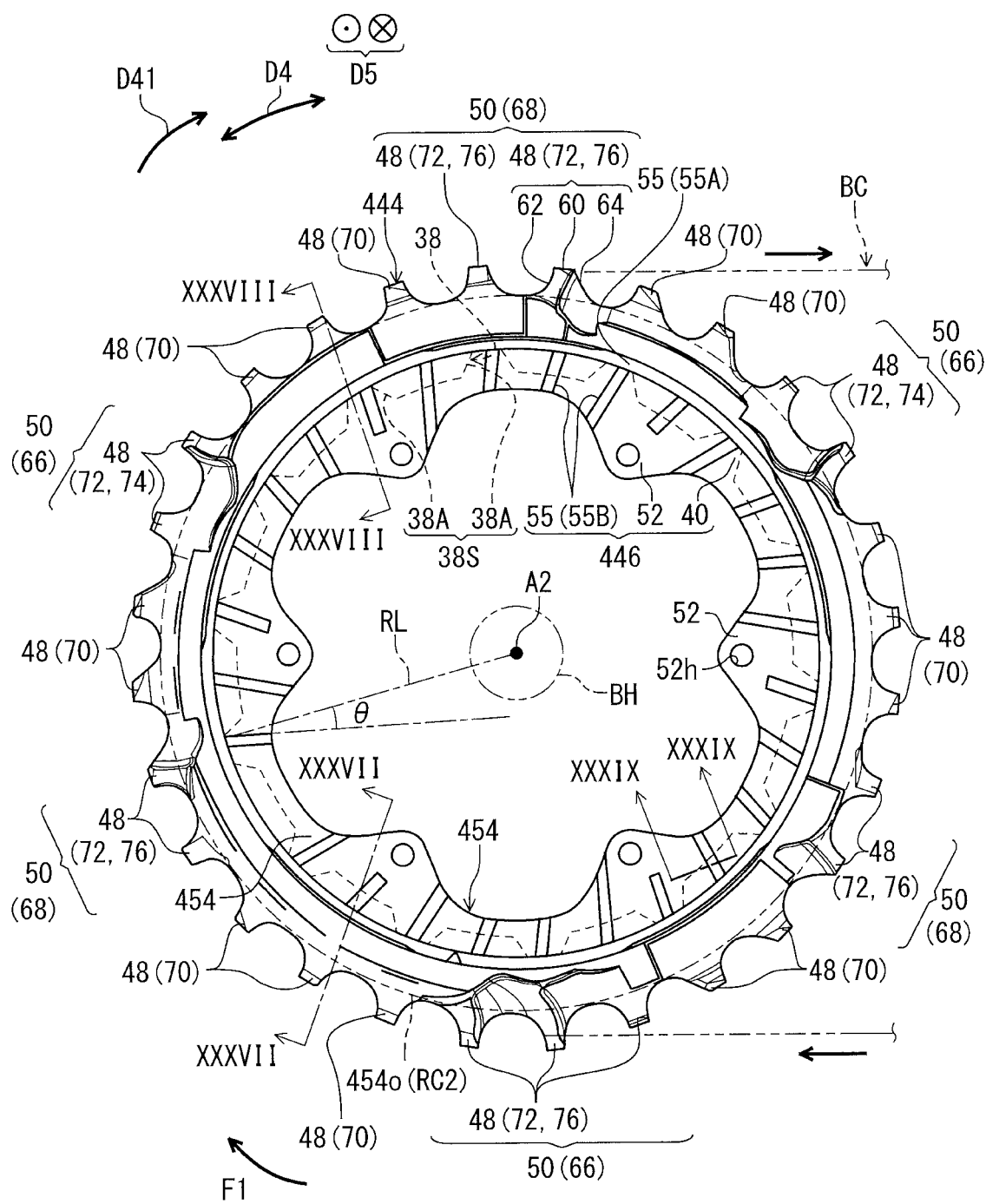
FIG. 36 is a side elevational view of a bicycle sprocket in accordance with a fifth embodiment.

As seen in FIG. 36, the bicycle sprocket 416 comprises at least one chain engaging member 444, at least one bicycle attachment member 446, and the at least one shifting facilitation area 50. The at least one chain engaging member 444 constitutes at least the part of at least one sprocket tooth 48 of the bicycle sprocket 416 and is configured to contact the bicycle chain BC in a state where the bicycle chain BC engages with the bicycle sprocket 416. The at least one chain engaging member 444 is made of the first material same as that of the at least one chain engaging member 44 described in the first embodiment. The at least one bicycle attachment member 446 constitutes at least a part of a sprocket body 454 of the bicycle sprocket 416 and is configured to be coupled to the bicycle 1. The at least one bicycle attachment member 446 is made of the second material that is different from the first material same as that of the at least one bicycle attachment member 46 described in the first embodiment.

In this embodiment, the bicycle sprocket 416 includes at least one concavo-convex portion 55. The at least one concavo-convex portion 55 includes at least one first concavo-convex portion 55A. The at least one concavo-convex portion 55 includes at least one second concavo-convex portion 55B. However, the at least one concavo-convex portion 55 may not include one of the at least one first concavo-convex portion 55A and the at least one second concavo-convex portion 55B. In the illustrated embodiment, the at least one chain engaging member 444 includes at least one first concavo-convex portion 55A, and at least one bicycle attachment member 446 includes at least one second concavo-convex portion 55B. However, the at least one chain engaging member 444 can include at least part of the at least one second concavo-convex portion 55B. Alternatively, the at least one bicycle attachment member 446 can include at least part of the at least one first concavo-convex portion 55A. The at least one chain engaging member 444 and the at least one bicycle attachment member 446 have substantially the same configuration as the at least one chain engaging member 44 and the at least one bicycle attachment member 46, respectively except that a combination of all the at least one chain engaging member 444 and all the at least one bicycle attachment member 446 includes the at least one first concavo-convex portion 55A and the at least one second concavo-convex portion 55B.

The concavo-convex portions 55A and 55B are provided only along the sprocket body 454 so as to not interfere with the bicycle chain BC engaging the sprocket teeth 48. In other words, the concavo-convex portions 55A and 55B are positioned radially inwardly from each of the sprocket teeth 48. Accordingly, the at least one bicycle attachment member 446 constitutes at least a part of the at least one concavo-convex portion 55 positioned radially inwardly from the at least one sprocket tooth 48. The at least one concavo-convex portion 55 is provided radially inwardly from an outer periphery 454o of the sprocket body 454 of the bicycle sprocket 416 with respect to the rotational center axis A2 of the bicycle sprocket 416. The outer periphery 454o of the sprocket body 454 can be identical to the root circle RC2 of the at least one sprocket tooth 48.

Figure 37:
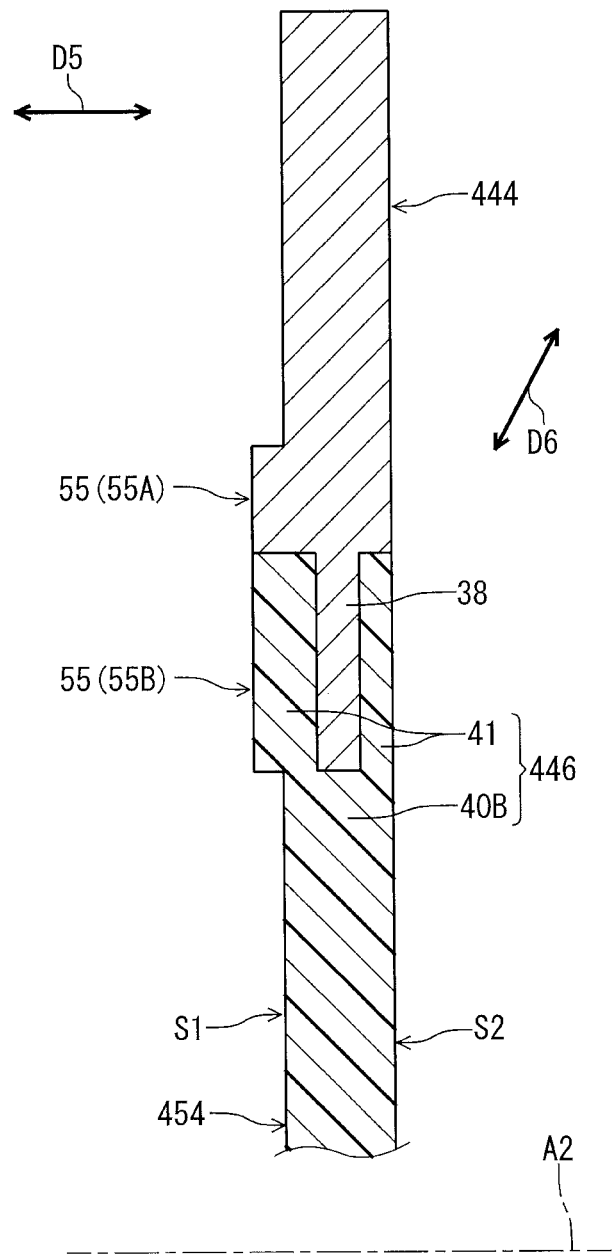
FIG. 37 is a partial cross sectional view of a portion of the bicycle sprocket illustrated in FIG. 36 as seen along section line XXXVII-XXXVII of FIG. 36.
Figure 38:
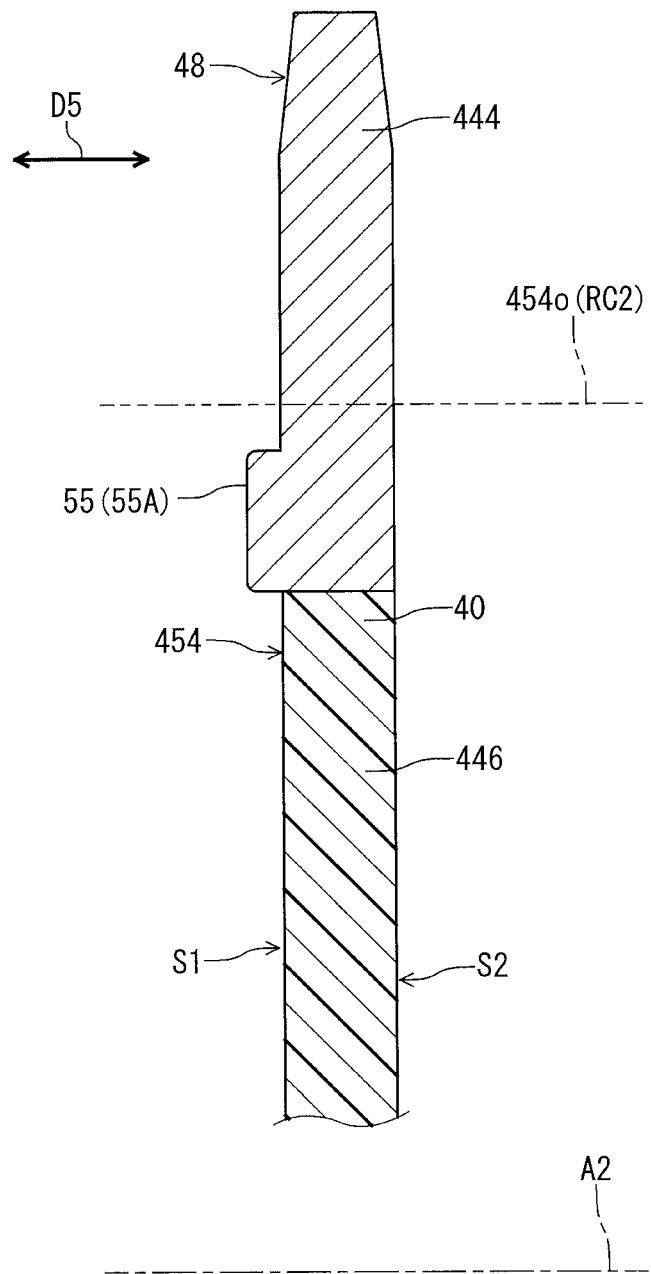
FIG. 38 is a partial cross sectional view of a portion of the bicycle sprocket illustrated in FIG. 36 as seen along section line XXXVIII-XXXVIII of FIG. 36.

Specifically, the at least one first concavo-convex portion 55A extends in the circumferential direction D4 with respect to the rotational center axis A2 of the bicycle sprocket 416. In the illustrated embodiment, the number of the at least one first concavo-convex portion 55A is one, and the first concavo-convex portion 55A has an annular shape. Preferably, the first concavo-convex portion 55A is circular with a center coinciding with the rotational center axis A2 of the sprocket body 454. However, when the illustrated one chain engaging member 444 (the illustrated one bicycle attachment member 446) is divided into several pieces to constitute the at least one chain engaging member 444 (the at least one bicycle attachment member 446), at least one of the several pieces can have the at least one first concavo-convex portion 55A. In such case, the first concavo-convex portion 55A can have a part of an annular shape. Accordingly, the first concavo-convex portion 55A has at least a part of an annular shape. As seen in FIGS. 37 and 38, the first concavo-convex portion 55A extends from the sprocket body 454 in the axial direction D5 parallel to the rotational center axis A2 of the bicycle sprocket 416. That is, at least one concavo-convex portion 55 extends from the sprocket body 454 in the axial direction D5 parallel to the rotational center axis A2 of the bicycle sprocket 416. In other words, the first concavo-convex portion 55A defines an annular projection on an exterior axial surface (a first axial side S1) of the sprocket body 454. However, alternatively or additionally, the first concavo-convex portion 55A can extend from an opposite exterior axial surface (a second axial side S2) of the sprocket body 454 in the axial direction D5.

Figure 39:
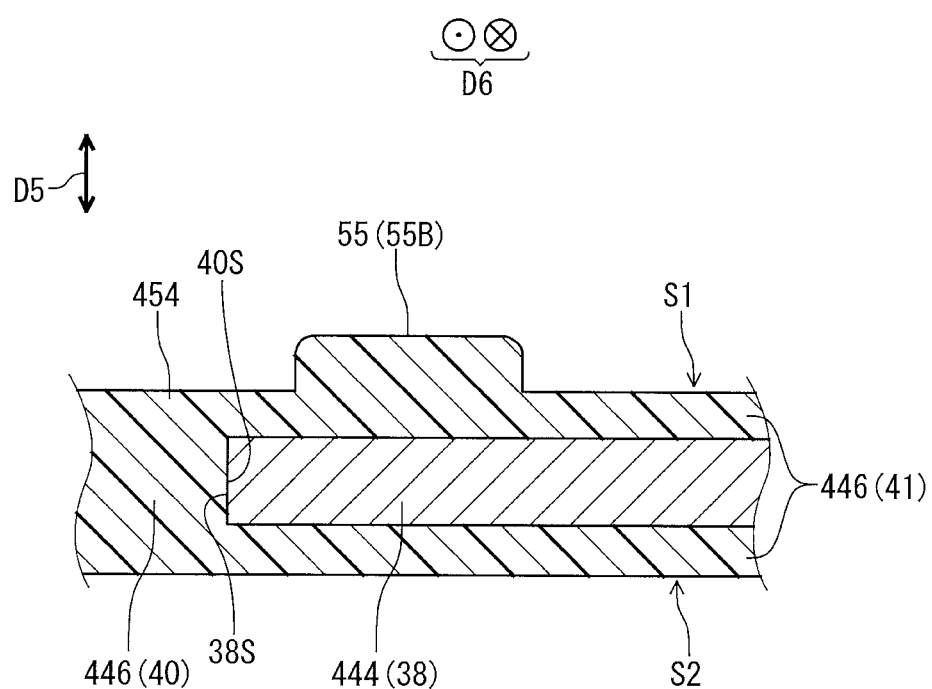
FIG. 39 is a partial cross sectional view of a portion of the bicycle sprocket illustrated in FIG. 36 as seen along section line XXXIX-XXXIX of FIG. 36.
Figure 40:
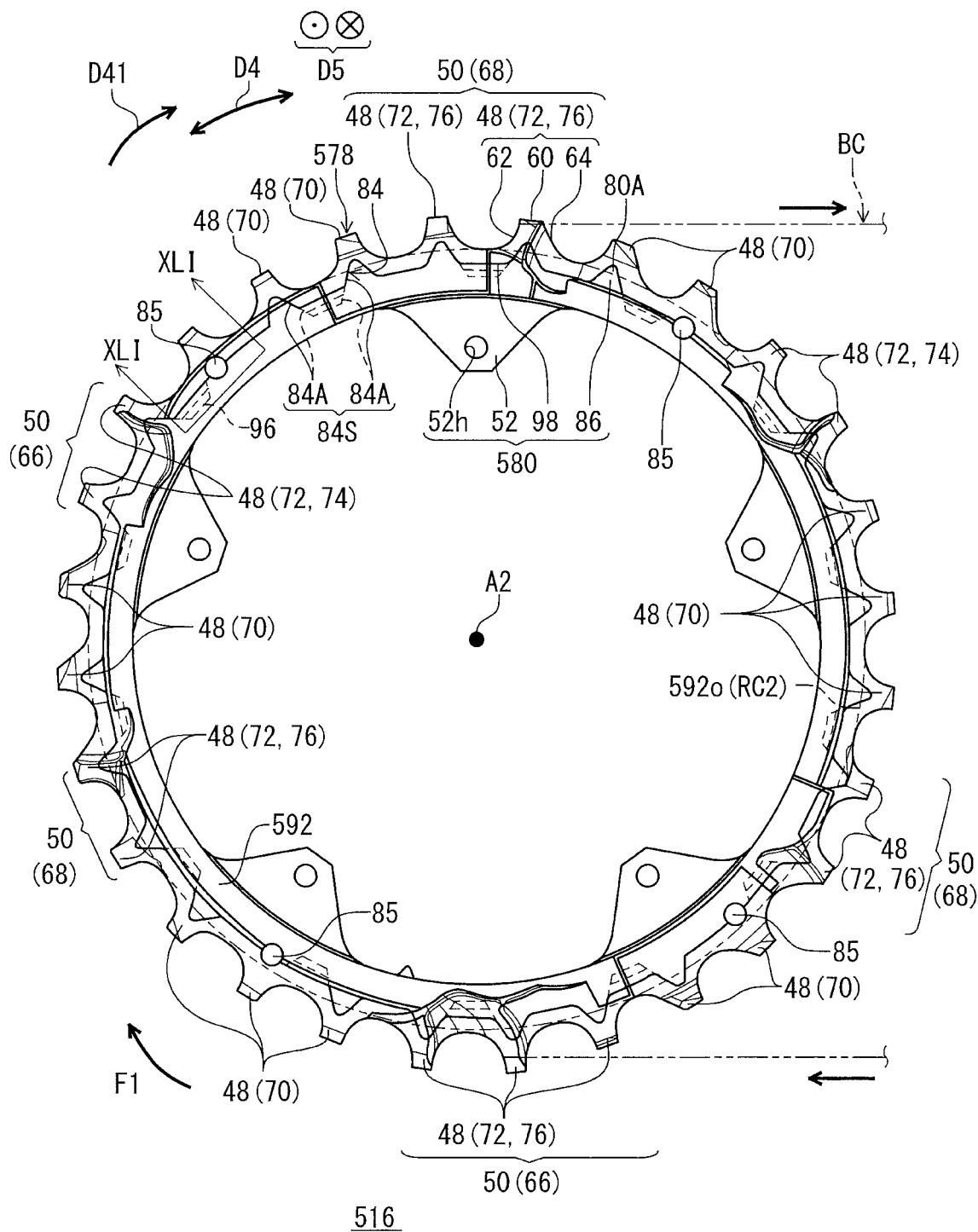
FIG. 40 is a side elevational view of a bicycle sprocket in accordance with a sixth embodiment.

As seen in FIGS. 36 and 39, the at least one second concavo-convex portion 55B extends generally in the radial direction D6 with respect to the rotational center axis A2 of the bicycle sprocket 416. Each of the second concavo-convex portions 55B has a straight shape viewed in the axial direction D5, but each of the second concavo-convex portions 55B can have a curved shape viewed in the axial direction D5. As seen in FIGS. 40 and 42, the second concavo-convex portion 55B extends from the sprocket body 454 in the axial direction D5 parallel to the rotational center axis A2 of the bicycle sprocket 416. That is, at least one concavo-convex portion 55 extends from the sprocket body 454 in the axial direction D5 parallel to the rotational center axis A2 of the bicycle sprocket 416. In other words, the second concavo-convex portion 55B defines a straight elongated projection on the exterior axial surface (the first axial side S1) of the sprocket body 454. However, alternatively or additionally, the second concavo-convex portion 55B can extend from the opposite exterior axial surface (the second axial side S2) of the sprocket body 454 in the axial direction D5. Preferably, the at least one concavo-convex portion 55 includes second concavo-convex portions 55B, and a number of the second concavo-convex portions 55B is preferably equal to a total number of the at least one sprocket teeth 48. The second concavo-convex portions 55B interconnect with the first concavo-convex portion 55A. As described above, each of the second concavo-convex portions 55B extends generally in the radial direction D6 (see FIGS. 12 to 14 for an example of the radial direction D6) with respect to the rotational center axis A2 of the sprocket body 454. As seen in FIG. 36, the phrase "extends generally in the radial direction D6" as used herein refers to an inclination θ in a range of zero degrees to thirty-five degrees with respect to a radial line RL from the rotational center axis A2. That is, the at least one second concavo-convex portion 55B inclines in a range of zero degrees to thirty-five degrees with respect to the radial line RL from the rotational center axis A2 of the bicycle sprocket 416. In the illustrated embodiment, each of the second concavo-convex portions 55B is inclined with respect to the radial direction D6 with respect to the rotational center axis A2 of the sprocket body 454.

In the fifth embodiment, with the bicycle sprocket 416, it is possible to enhance rigidity of the at least one bicycle attachment member as well as to further lighten the at least one bicycle attachment member, because the at least one bicycle attachment member 446 constitutes at least a part of at least one concavo-convex portion 55.

Modification of Fifth Embodiment

The aforementioned bicycle sprockets 12, 112, 113, 212, 213, 17, 317, and 319 can have the at least one concavo-convex portion 55 on their sprocket bodies. The at least one first concavo-convex portion 55A and the at least one second concavo-convex portion 55B can have different shapes from those described above as long as the at least one first concavo-convex portion 55A and the at least one second concavo-convex portion 55B enhances rigidity of the at least one bicycle attachment member 446.

Sixth Embodiment

A bicycle sprocket 516 in accordance with a sixth embodiment will be described below referring to FIGS. 40 and 41. The bicycle sprocket 516 has the same configuration as a part of the bicycle sprocket 16 and a part of the bicycle sprocket 17 except for at least one rivet 85. Thus, elements having substantially the same function as those in the bicycle sprockets 16 and 17 will be numbered the same here, and will not be described and/or illustrated again in detail here for the sake of brevity.

As seen in FIG. 40, the bicycle sprocket 516 comprises at least one chain engaging member 578, at least one bicycle attachment member 580, and the at least one shifting facilitation area 50. The at least one chain engaging member 578 constitutes at least the part of at least one sprocket tooth 48 of the bicycle sprocket 516 and is configured to contact the bicycle chain BC in a state where the bicycle chain BC engages with the bicycle sprocket 516. Specifically, the at least one chain engaging member 578 includes the sprocket teeth 48 in place of the sprocket teeth 90 and has the first torque transmitting profiles 84 radially inwardly from every other sprocket tooth 48 in the circumferential direction D4 with respect to the rotational center axis A2 of the bicycle sprocket 516. Other features of the at least one chain engaging member 578 is the same as those of the at least one chain engaging member 78. The at least one chain engaging member 578 is made of the first material as same as that of the at least one chain engaging member 78 described in the first embodiment.

The at least one bicycle attachment member 580 constitutes at least a part of a sprocket body 592 of the bicycle sprocket 516 and is configured to be coupled to the bicycle 1. Specifically, the at least one bicycle attachment member 580 has the second torque transmitting profiles 86 radially inwardly from every other sprocket tooth 48 in the circumferential direction D4 with respect to the rotational center axis A2 of the bicycle sprocket 516. The second torque transmitting profiles 86 are configured to engage with the first torque transmitting profiles 84. Further, the at least one chain engaging member 578 and the at least one bicycle attachment member 580 include first axial engagement profiles 96 and second axial engagement profiles 98, respectively. Each of the first axial engagement profiles 96 is configured to engage with each of the second axial engagement profiles 98. Further, the at least one bicycle attachment member 580 has the sprocket carrier attachment portion 52 in place of the hub engagement profile 88. Other features of the at least one bicycle attachment member 580 is the same as those of the at least one bicycle attachment member 80. The at least one bicycle attachment member 580 is made of the second material that is different from the first material same as that of the at least one bicycle attachment member 80 described in the first embodiment.

Figure 41:
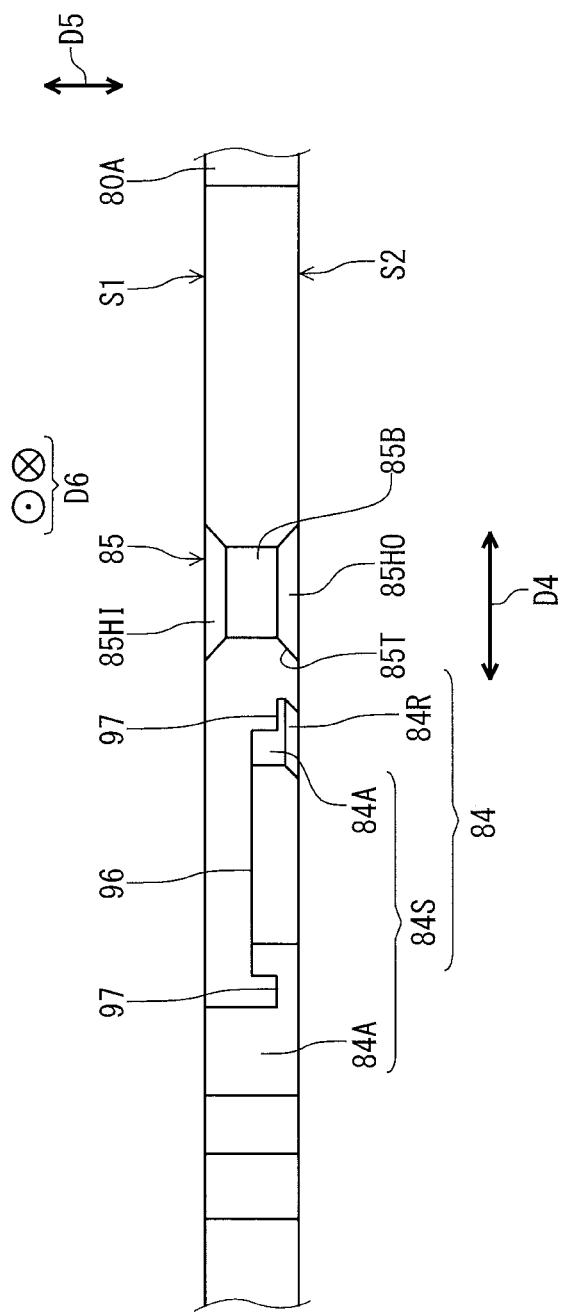
FIG. 41 is a partial cross sectional view of a portion of the bicycle sprocket illustrated in FIG. 40 excluding the bicycle attachment member as seen along section line XLI-XLI of FIG. 40.

As seen in FIGS. 40 and 41, in this embodiment, the bicycle sprocket 516 includes at least one rivet 85 between the at least one chain engaging member 578 and the at least one bicycle attachment member 580 in the radial direction D6 of the bicycle sprocket 516. Specifically, the bicycle sprocket 516 includes rivets 85 arranged between adjacent two first axial engagement profiles 96 (adjacent two second axial engagement profiles 98) in the circumferential direction D4 with respect to the rotational center axis A2 of the bicycle sprocket 516. More specifically, each rivet 85 is arranged between the second axial engagement profile 98 and the radial extension 80A that is second nearest to the second axial engagement profile 98 in the circumferential direction D4 with respect to the rotational center axis A2 of the bicycle sprocket 516. Preferably, the rivets 85 are arranged radially inwardly from the outer periphery 592o of the sprocket body 592. The outer periphery 592o of the sprocket body 592 can be identical to the root circle RC2 of the at least one sprocket tooth 48. However, the rivets 85 can be arranged radially inwardly from the outer periphery 592o of the sprocket body 592 so as to not interfere with the bicycle chain BC engaging the sprocket teeth 48. More preferably, the rivets 85 are not provided in the at least one shifting facilitation area 50 to avoid the interference with the bicycle chain BC in the upshifting and/or downshifting operation. Accordingly, the rivets 85 are preferably arranged radially inwardly from the regular teeth 70.

As seen in FIG. 41, each of the rivets 85 includes a main body 85B, an first head 85HI, and an second head 85HO. The second head 85HO is opposite to the first head 85HI in the axial direction D5. The first head 85HI is provided on the first axial side S1 on which the second axial engagement profiles 98 is provided. The second head 85HO is provided on the second axial side S2 on which the first axial engagement profiles 96 are provided. The second axial side S2 is a reverse side of the first axial side S1 in the axial direction D5. The first head 85HI and the second head 85HO have radially outward tapered surface 85T to tightly connect the at least one chain engaging member 578 and the at least one bicycle attachment member 580.

The first torque transmitting profile 84 includes a tapered recess 84R corresponding to the radially outward tapered surface 85T of the second head 85HO. More specifically, the tapered recess 84R is connected to the first surface 84A and opposite to the first axial engagement profile 96 and a recess 97 to engage with the second axial engagement profile 98 of the at least one bicycle attachment member 580. The tapered recess 84R is configured to secure a gap between the radially outward tapered surface 85T and the first torque transmitting profile 84 to secure rigidity of the at least one bicycle attachment member 580.

In the sixth embodiment, with the bicycle sprocket 516, it is possible to enhance connection between the at least one chain engaging member 578 and the at least one bicycle attachment member 580 as well as to further lighten the at least one bicycle attachment member 580, because the at least one chain engaging member 578 and the at least one bicycle attachment member 580 are connected with the rivets 85.

Modification of Sixth Embodiment

The aforementioned bicycle sprockets 12, 112, 113, 212, 213, 17, 317, 319, and 416 can have the rivets 85.

It will be apparent to those skilled in the bicycle field from the present disclosure that the above embodiments can be at least partially combined with each other.

In the present application, the term "comprising" and its derivatives, as used herein, are intended to be open ended terms that specify the presence of the stated features, elements, components, groups, integers, and/or step, but do not exclude the presence of other unstated features, elements, components, groups, integers and/or step. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
at least one chain engaging member constituting at least a part of at least one sprocket tooth of the bicycle sprocket and being configured to contact a bicycle chain in a state where the bicycle chain engages with the bicycle sprocket, the at least one chain engaging member being made of a first material, the at least one chain engaging member has a first torque transmitting profile with a first surface on a circumferential end thereof, the first surface extending along a line inclined relative to a radial direction with respect to a rotational center axis of the bicycle sprocket when viewed in an axial direction with respect to the rotational center axis;
at least one bicycle attachment member constituting at least a part of a sprocket body of the bicycle sprocket and being configured to be coupled to a bicycle, the at least one bicycle attachment member being made of a second material that is different from the first material, the at least one bicycle attachment member has a second torque transmitting profile to engage the first surface; and
at least one shifting facilitation area provided in the at least one chain engaging member to facilitate a shifting operation of a bicycle chain.

2. The bicycle sprocket according to claim 1, wherein the at least one shifting facilitation area extends between the at least one chain engaging member and the at least one bicycle attachment member.

3. The bicycle sprocket according to claim 1, wherein the at least one shifting facilitation area is constituted by both the at least one chain engaging member and the at least one bicycle attachment member.

4. The bicycle sprocket according to claim 1, wherein the at least one chain engaging member has at least a part of an annular shape.

5. The bicycle sprocket according to claim 4, wherein the at least one chain engaging member has an annular shape.

6. The bicycle sprocket according to claim 1, wherein the second material has a second specific gravity smaller than a first specific gravity that the first material has.

7. The bicycle sprocket according to claim 1, wherein the first material has a first abrasion resistance larger than a second abrasion resistance that the second material has.

8. The bicycle sprocket according to claim 1, wherein the first material has a first rigidity larger than a second rigidity that the second material has.

9. The bicycle sprocket according to claim 1, wherein the first material includes at least one of stainless steel, titanium, and aluminum.

10. The bicycle sprocket according to claim 1, wherein the second material includes at least one of titanium, aluminum, and resin.

11. The bicycle sprocket according to claim 1, wherein the first material includes a metallic material; and
the second material includes a non-metallic material.

12. The bicycle sprocket according to claim 11, wherein the second material includes a fiber reinforced plastic material.

13. The bicycle sprocket according to claim 1, wherein the first material includes a first metallic material; and
the second material includes a second metallic material that is different from the first metallic material.

14. The bicycle sprocket according to claim 1, wherein the first material and the second material include same kinds of material components and have different metallic compositions.

15. The bicycle sprocket according to claim 1, wherein the first material includes a first non-metallic material, and
the second material includes a second non-metallic material that is different from the first non-metallic material.

16. The bicycle sprocket according to claim 1, wherein the first material and the second material have different resin compositions.

17. The bicycle sprocket according to claim 1, wherein the at least one shifting facilitation area includes at least one downshifting facilitation area.

18. The bicycle sprocket according to claim 1, wherein the at least one shifting facilitation area includes at least one upshifting facilitation area.

19. The bicycle sprocket according to claim 1, wherein the at least one shifting facilitation area includes both of at least one downshifting facilitation area and at least one upshifting facilitation area.

20. The bicycle sprocket according to claim 1, wherein the at least one sprocket tooth includes at least one facilitation tooth in the at least one shifting facilitation area.

21. The bicycle sprocket according to claim 20, wherein the at least one facilitation tooth includes at least one axially recessed tooth with respect to the rotational center axis of the bicycle sprocket.

22. The bicycle sprocket according to claim 20, wherein the at least one facilitation tooth facilitates downshifting.

23. The bicycle sprocket according to claim 20, wherein the at least one facilitation tooth facilitates upshifting.

24. The bicycle sprocket according to claim 1, further comprising:
at least one shifting facilitation projection in the at least one shifting facilitation area.

25. The bicycle sprocket according to claim 24, wherein the at least one shifting facilitation projection facilitates upshifting.

26. The bicycle sprocket according to claim 1, wherein the at least one sprocket tooth includes at least one first tooth and at least one second tooth,
the at least one first tooth has a first chain engaging width, and
the at least one second tooth has a second chain engaging width that is smaller than the first chain engaging width.

27. The bicycle sprocket according to claim 26, wherein the first chain engaging width is larger than an inner link space defined between an opposed pair of inner link plates of the bicycle chain in the axial direction parallel to the rotational center axis of the bicycle sprocket and is smaller than an outer link space defined between an opposed pair of outer link plates of the bicycle chain in the axial direction, and
the second chain engaging width is smaller than the inner link space.

28. The bicycle sprocket according to claim 1, wherein the at least one sprocket tooth is circumferentially arranged on an outer periphery of the sprocket body,
the at least one sprocket tooth includes at least one first tooth and at least one second tooth,
the at least one first tooth is arranged on the outer periphery to be received within an outer link space defined between a pair of outer link plates of the bicycle chain and has a first axially tooth center plane,
the at least one second tooth is arranged on the outer periphery to be received within an inner link space defined between a pair of inner link plates of the bicycle chain and has a second axially tooth center plane, and
the first axially tooth center plane is offset from the second axially tooth center plane in the axial direction parallel to the rotational center axis of the bicycle sprocket.

29. The bicycle sprocket according to claim 1, wherein the sprocket body includes a sprocket carrier to be coupled to the bicycle.

30. The bicycle sprocket according to claim 29, wherein the sprocket carrier is made of a non-metallic material.

31. The bicycle sprocket according to claim 29, wherein the at least one bicycle attachment member and the sprocket carrier are integrated into a one-piece unitary member.

32. The bicycle sprocket according to claim 29, wherein the sprocket carrier includes a plurality of supporting arms.

33. The bicycle sprocket according to claim 32, wherein each of the plurality of supporting arms includes a reinforcing part.

34. The bicycle sprocket according to claim 33, wherein each of the supporting arms includes a first edge part and a second edge part opposite to the first edge part in the circumferential direction, and
the reinforcing part is arranged between the first edge part and the second edge part in the circumferential direction.

35. A rear sprocket assembly comprising:
sprockets at least one of which is the bicycle sprocket according to claim 1.

36. The rear sprocket assembly according to claim 35, wherein
a total number of the sprockets is equal to or larger than nine.

37. The rear sprocket assembly according to claim 35, wherein
a tooth-number difference between a smallest sprocket and a largest sprocket of the sprockets is equal to or larger than twenty-five.

38. The rear sprocket assembly according to claim 35, wherein
a tooth-number difference between a smallest sprocket and a largest sprocket of the sprockets is equal to or larger than thirty-five.

39. The rear sprocket assembly according to claim 35, wherein
a total number of tooth that a largest sprocket of the sprockets has is equal to or larger than forty-four.

40. The rear sprocket assembly according to claim 35, wherein
a total number of tooth that a smallest sprocket of the sprockets has is equal to or smaller than ten.

41. A drive train of a bicycle, comprising:
a single front sprocket; and
the rear sprocket assembly according to claim 35.

42. The drive train according to claim 41, wherein
the at least one sprocket tooth of the single front sprocket is circumferentially arranged on an outer periphery of the sprocket body of the single front sprocket,
the at least one sprocket tooth of the single front sprocket includes at least one first tooth and at least one second tooth, the at least one first tooth has a first chain engaging width, and the at least one second tooth has a second chain engaging width that is smaller than the first chain engaging width.

43. The drive train according to claim 42, wherein the at least one first tooth is configured to be received within an outer link space defined between a pair of outer link plates of the bicycle chain, and the at least one second tooth is configured to be received within an inner link space defined between a pair of inner link plates of the bicycle chain.

44. The drive train according to claim 42, wherein the first chain engaging width is larger than an inner link space defined between an opposed pair of inner link plates of the bicycle chain in the axial direction parallel to the rotational center axis of the bicycle sprocket and is smaller than an outer link space defined between an opposed pair of outer link plates of the bicycle chain in the axial direction, and the second chain engaging width is smaller than the inner link space.

45. The bicycle sprocket according to claim 1, wherein a radial tooth length between a root circle and a tooth tip of the at least one sprocket tooth in the radial direction with respect to the rotational center axis of the bicycle sprocket is longer than an axial tooth length of the at least one sprocket tooth in the axial direction parallel to the rotational center axis of the bicycle sprocket.

46. The bicycle sprocket according to claim 1, wherein the at least one bicycle attachment member has a hub engagement profile to engage with a bicycle hub.

47. The bicycle sprocket according to claim 1, wherein the at least one bicycle attachment member has a crank attachment portion to which a bicycle crank is attached.

48. The bicycle sprocket according to claim 1, wherein the at least one bicycle attachment member constituting at least a part of at least one concavo-convex portion positioned radially inwardly from the at least one sprocket tooth and extending from the sprocket body in the axial direction parallel to the rotational center axis of the bicycle sprocket.

49. The bicycle sprocket according to claim 48, wherein the at least one concavo-convex portion includes at least one first concavo-convex portion extending in a circumferential direction with respect to the rotational center axis of the bicycle sprocket.

50. The bicycle sprocket according to claim 49, wherein the at least one concavo-convex portion includes at least one second concavo-convex portion extending generally in the radial direction with respect to the rotational center axis of the bicycle sprocket.

51. The bicycle sprocket according to claim 50, wherein the at least one concavo-convex portion includes second concavo-convex portions, a number of which is equal to a total number of the at least one sprocket tooth of the bicycle sprocket.

52. The bicycle sprocket according to claim 48, wherein the at least one second concavo-convex portion inclines in a range of zero degrees to thirty-five degrees with respect to a radial line from the rotational center axis of the bicycle sprocket.

53. A sprocket assembly comprising:

a first bicycle sprocket which is the bicycle sprocket according to claim 1, the first bicycle sprocket having a first total number of teeth; and a second bicycle sprocket which is the bicycle sprocket according to claim 1, the second bicycle sprocket having a second total number of teeth, the second total number being different from the first total number, the at least one bicycle attachment member of the first bicycle sprocket and the at least one bicycle attachment member of the second bicycle sprocket being integrated into a one-piece unitary member.

\* \* \* \* \*